(12) United States Patent
Bhatia et al.

(10) Patent No.: US 12,448,418 B2
(45) Date of Patent: Oct. 21, 2025

(54) ACTIVATABLE THERAPEUTIC PEPTIDES AND USES THEREOF

(71) Applicant: Massachusetts Institute of Technology, Cambridge, MA (US)

(72) Inventors: Sangeeta N. Bhatia, Cambridge, MA (US); Chayanon Ngambenjawong, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 68 days.

(21) Appl. No.: 18/181,942

(22) Filed: Mar. 10, 2023

(65) Prior Publication Data

US 2023/0365635 A1    Nov. 16, 2023

Related U.S. Application Data

(60) Provisional application No. 63/341,061, filed on May 12, 2022.

(51) Int. Cl.
  *C07K 14/46* (2006.01)
  *A61K 38/00* (2006.01)
  *A61P 31/04* (2006.01)

(52) U.S. Cl.
  CPC ............ *C07K 14/463* (2013.01); *A61P 31/04* (2018.01); *A61K 38/00* (2013.01); *C07K 2319/31* (2013.01)

(58) Field of Classification Search
  None
  See application file for complete search history.

(56) References Cited

U.S. PATENT DOCUMENTS 5,792,831 A * 8/1998 Maloy ............... C07K 14/46
                                                530/326
2017/0029466 A1    2/2017 Jiang et al.

FOREIGN PATENT DOCUMENTS

WO    WO-2012125808 A1 *  9/2012  ........... C07K 14/001
WO    2021202678 A1   10/2021

OTHER PUBLICATIONS

Fjell et al. Designing antimicrobial peptides: form follows function. Nat. Rev. Drug Discov. 11, 37-51 (2011).
Gan et al. The multifaceted nature of antimicrobial peptides: current synthetic chemistry approaches and future directions. Chem. Soc. Rev. 50, 7820-7880 (2021).
Global burden of bacterial antimicrobial resistance in 2019: a systematic analysis. Lancet (London, England) (2022), doi:10.1016/S0140-6736(21)02724-0.
Lei et al. Engineering Selectively Targeting Antimicrobial Peptides. Annu. Rev. Biomed. Eng. 23, 339-357 (2021).
Mookherjee et al. Antimicrobial host defence peptides: functions and clinical potential. Nat. Rev. Drug Discov. 19, 311-332 (2020).
Schellenberger et al. A recombinant polypeptide extends the in vivo half-life of peptides and proteins in a tunable manner. Nature Biotechnol. 27(12): 1186-1190 (2009).
International Search Report and Written Opinion to PCT/US2023/64114 mailed Jun. 27, 2023.

* cited by examiner

*Primary Examiner* — Melissa L Fisher
*Assistant Examiner* — Zachary J Miknis
(74) *Attorney, Agent, or Firm* — MCDONNELL BOEHNEN HULBERT & BERGHOFF LLP

(57) ABSTRACT

Disclosed herein are fusion protein, comprising (a) at least one X1 domain comprising a half-life extension compound, including but not limited to a half-life extension polypeptide; (b) at least one X2 domain comprising an anionic block; (c) at least one X3 domain comprising a linker susceptible to cleavage at a site of disease, including but not limited to a microbial infection site or tumor site; and (d) at least one X4 domain comprising a therapeutic peptide; wherein the at least one X1, X2, X3, and X4 domains are covalently linked, and each X4 domain is linked to an X3 domain without an intervening X1 or X2 domain; compositions containing such fusion proteins, and methods for their use.

10 Claims, 6 Drawing Sheets

Specification includes a Sequence Listing.

ACTIVATABLE THERAPEUTIC PEPTIDES AND USES THEREOF

RELATED APPLICATIONS

This application claims priority to U.S. Provisional Patent Application Ser. No. 63/341,061 filed May 12, 2022, incorporated by reference herein in its entirety.

STATEMENT OF GOVERNMENT SUPPORT

This invention was made with government support under AI142780 and AI132413 awarded by the National Institutes of Health. The government has certain rights in the invention.

SEQUENCE LISTING STATEMENT

A computer readable form of the Sequence Listing is filed with this application by electronic submission and is incorporated into this application by reference in its entirety. The Sequence Listing is contained in the file created on Mar. 1, 2023 having the file name "22-0288-US.xml" and is 445,171 bytes in size.

BACKGROUND

Peptides represent an important class of therapeutics due to their diverse functionalities, ease of synthesis, and improved screening/design technologies. Nonetheless, when administered systemically, peptide therapeutics often face the challenges of short circulation half-life and insufficient bioavailability at the target diseased site. Further, membranolytic peptide therapeutics such as antimicrobial peptides (AMPs) and anticancer peptides (ACPs), which disrupt bacteria membrane and cancer cell membrane respectively, tend to elicit off-target toxicity, limiting their utility beyond local administration. To unleash clinical potential of these therapeutics, there is a great need in development of formulations to overcome these barriers to systemic administration of therapeutic peptides.

SUMMARY

In one aspect, the disclosure provides fusion proteins, comprising:
(a) at least one X1 domain comprising a half-life extension compound, including but not limited to a half-life extension polypeptide;
(b) at least one X2 domain comprising an anionic block;
(c) at least one X3 domain comprising a linker susceptible to cleavage at a site of disease, including but not limited to a microbial infection site or tumor site; and
(d) at least one X4 domain comprising a therapeutic peptide;
wherein the at least one X1, X2, X3, and X4 domains are covalently linked, and each X4 domain is linked to an X3 domain without an intervening X1 or X2 domain.

In one embodiment, the fusion protein comprises a linear fusion protein. In another embodiment, each X4 domain is linked to at least one X3 domain without an intervening X1 or X2 domain. In another embodiment, an X4 domain is present at one terminus of the fusion protein. In one embodiment, the fusion protein includes only 1 X2 domain. In another embodiment, the fusion protein includes only 1 X4 domain. In another embodiment, the fusion protein comprises 1, 2, or 3 X1 domains. In a further embodiment, the fusion protein comprises 2 or 3 X1 domains, and wherein at least 2 X1 domains are linked without an intervening X2, X3, or X4 domain. In one embodiment, the fusion protein comprises 1, 2, 3, or 4 X3 domains. In another embodiment, the fusion protein comprises 2, 3, or 4 X3 domains, and wherein at least 2 X3 domains are linked without an intervening X1, X2, or X4 domain, and optionally wherein at least one X1 domain is linked to an X2 domain without an intervening X3 or X4 domain. In a further embodiment, the fusion protein further comprises at least one X5 domain comprising a targeting polypeptide.

In another embodiment, the fusion protein comprises a branched fusion protein. In one embodiment, an X4 domain is present at a terminus of the fusion protein. In a further embodiment, a branch of the fusion protein comprises at least one X3 domain. In another embodiment, a branch of the fusion protein comprises at least one X3 domain linked to an X4 domain. In one embodiment, the branched fusion protein further comprises at least one X5 domain comprising a targeting polypeptide. In another embodiment, a branch of the fusion protein is linked to the primary fusion protein backbone at a location between an X2 domain and one of an X1, X2, X3, or X5 domain. In various embodiments, the fusion protein includes only 1 X2 domain; the fusion protein includes only 1 X4 domain; and/or the fusion protein comprises 1 or 2 X1 domains. In one embodiment, the branched fusion protein comprises 2 X1 domains, and wherein the 2 X1 domains are linked without an intervening X2, X3, or X4 domain. In another embodiment, the branched fusion comprises 1, 2, 3, or 4 X3 domains.

In another embodiment of any of the fusion proteins herein, each X1 domain independently comprises a half-life extension compound selected from the group consisting of an albumin-binding polypeptide, an antibody/Fc domain (such as human Fc or mouse Fc), an unstructured XTEN polypeptide, a proline/alanine-rich sequence polypeptide (PAS), and poly(ethylene glycol). In another embodiment, each X1 domain independently comprises an albumin or albumin-binding polypeptide, including but not limited to human serum albumin, mouse serum albumin and albumin-binding domain. In a further embodiment, each X1 domain independently comprises the amino acid sequence each X1 domain independently comprises the amino acid sequence selected from the group consisting of SEQ ID NO:1-5.

In one embodiment, each X2 domain independently comprises an amino acid sequence selected from the group consisting of
(E/D)x, x=1-20;
(E/D)x(G/S/A)x, x=1-20;
((E/D)(E/D)(G/S/A))x, x=1-20;
((E/D)(G/S/A)(E/D))x, x=1-20;
(E/D)x(G/S/A)x(E/D)x, x=1-20; and
(E/D)x((E/D)K)x, x=1-20.

In another embodiment, each X2 domain independently comprises the amino acid sequence $(EEG)_x$, wherein "x" is 1-20, 2-16, 3-12, 4-10, 5-8, 1-15, 1-10, 2-10, 3-10, 4-10, 5-10, 2-8, 3-8, 4-8, 5-8, 5-7, 1, 2, 3, 4, 5, 6, 7, 8, 9, or 10.

In a further embodiment, each X3 domain independently comprises an amino acid sequence selected from the linker amino acid sequences selected from SEQ ID NO: 6-70, 171, and 173-187 and/or the non-peptide linkers shown in Table 4 (S86-S96).

In one embodiment, at least one, or each, X4 domain comprises a cationic therapeutic peptide, an anti-microbial peptide, an anti-cancer peptide, and/or a hydrophobic therapeutic peptide. In a further embodiment, at least one, or each, X4 domain comprises an amino acid sequence selected from the group consisting of SEQ ID NO:74-140.

In another embodiment,
(a) each X1 domain comprises the amino acid sequence of SEQ ID NO:4 or 5;
(b) each X2 domain comprises the amino acid sequence $(EEG)_x$, wherein "x" is 1-20, 2-16, 3-12, 4-10, 5-8, 1-15, 1-10, 2-10, 3-10, 4-10, 5-10, 2-8, 3-8, 4-8, 5-8, 5-7, 1, 2, 3, 4, 5, 6, 7, 8, 9, or 10;
(c) each X3 domain comprises the amino acid sequence of SEQ ID NO: 16; and
(d) each X4 domain comprises the amino acid sequence selected from the group consisting of SEQ ID NO:137-140.

In a further embodiment, the X5 domain, when present, comprises the amino acid sequence selected from the group consisting of SEQ ID NO:141-155 and 188-192. In a further embodiment, the fusion protein comprises a structure selected from SEQ ID NO:156-170 and 193-204, wherein any detectable labels are optional.

In another embodiment, the disclosure provides compositions, comprising a plurality of fusion proteins according to any embodiment herein. In some embodiments, the composition further comprises a pharmaceutically acceptable carrier.

In one embodiment, the fusion protein is genetically encodable. In other embodiments, the disclosure provides nucleic acids encoding a genetically encodable fusion protein herein, expression vectors comprising the nucleic acid operatively linked to a suitable regulatory sequence, and host cells comprising the nucleic acid and/or the expression vector.

The disclosure also provides methods for treating a microbial infection or cancer in a subject, comprising administering to the subject an amount effective to treat the microbial infection or cancer of the fusion protein, composition, nucleic acid, expression vector, or host cell of any embodiment herein.

DETAILED DESCRIPTION

Figure 1:
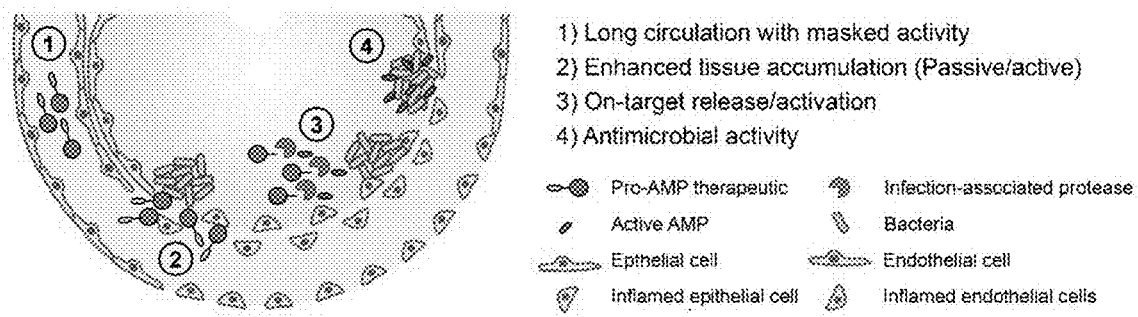
FIG. 1. Conceptual design of activatable antimicrobial peptides. Desirable features of pro-AMP therapeutics include (1) long circulation with masked activity, (2) accumulation at infection site either by passive or active targeting, (3) activation by diseased site microenvironmental trigger (e.g. infection site proteases), and (4) exhibition of on-target therapeutic activity.

As used herein, the amino acid residues are abbreviated as follows: alanine (Ala; A), asparagine (Asn; N), aspartic acid (Asp; D), arginine (Arg; R), cysteine (Cys; C), glutamic acid (Glu; E), glutamine (Gln; Q), glycine (Gly; G), histidine (His; H), isoleucine (Ile; I), leucine (Leu; L), lysine (Lys; K), methionine (Met; M), phenylalanine (Phe; F), proline (Pro; P), serine (Ser; S), threonine (Thr; T), tryptophan (Trp; W), tyrosine (Tyr; Y), and valine (Val; V).

In all embodiments of polypeptides disclosed herein, any N-terminal methionine residues are optional (i.e.: the N-terminal methionine residue may be present or may be absent).

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

All embodiments of any aspect of the invention can be used in combination, unless the context clearly dictates otherwise.

In one embodiment, the disclosure provides fusion protein, comprising:
(a) at least one X1 domain comprising a half-life extension compound, including but not limited to an albumin or albumin-binding polypeptide;

(b) at least one X2 domain comprising an anionic block
(c) at least one X3 domain comprising a linker susceptible to cleavage at a site of disease, including but not limited to a microbial infection site or tumor site;
(d) at least one X4 domain comprising a therapeutic peptide;
wherein the at least one X1, X2, X3, and X4 domains are covalently linked, and each X4 domain is linked to an X3 domain without an intervening X1 or X2 domain.

The fusion proteins disclosed herein comprise pro-therapeutic peptides based on a half-life extension compound-therapeutic peptide conjugate which is long-circulating and has a masked biological activity that can be activated upon cleavage of the linker.

As used herein, "fusion protein" requires at least some polypeptide components, but may include non-polypeptide components as well, as disclosed herein. The fusion protein may comprise one each of X1, X2, X3, and X4 domains, or may independently comprise 2, 3, 4, or more such domains.

In one embodiment, the fusion protein comprises a linear fusion protein (i.e., non-branched). In one embodiment, each X4 domain (therapeutic peptide) is linked to at least one X3 domain (cleavage-susceptible linker) without an intervening X1 or X2 domain. This embodiment enables activation of therapeutic peptide X4 from the fusion protein. In this embodiment, the X3-X4 linkage may be direct (with no linker), or may include a linker, such as an amino acid linker, between the X3 and X4 domains, but cannot include an X1 or X2 domain between the X3 and X4 domains. Other embodiments disclosed herein regarding such linkage between two domains without any intervening other domains can similarly be direct (with no linker), or may include a linker, such as an amino acid linker.

In another embodiment, an X4 domain (therapeutic peptide) is present at one terminus of the fusion protein. As used herein, "at one terminus" means that there are no X1, X2, X3, or X5 (discussed below) domains between the terminus and the X4 domain at the terminus. In this embodiment, there may be other moieties present between the X4 domain and the terminus, but none of the defined X1, X2, X3, or X5 domains. In one embodiment, the X4 domain may be present at an amino terminus of the linear fusion protein. In another embodiment, the X4 domain may be present at the carboxy terminus of the linear fusion protein. In a further embodiment, the fusion protein includes only 1 X4 domain.

In one embodiment, the linear fusion proteins comprise comprising 1, 2, or 3 X1 domains (half-life extension compounds). In another embodiment, the fusion protein comprises 2 or 3 X1 domains, wherein at least 2 X1 domains are linked without an intervening X2, X3, or X4 domain. This embodiment may be helpful in tuning biological activity masking and half-life of therapeutics.

In a further embodiment, the linear fusion proteins comprise 1, 2, 3, or 4 X3 domains (linkers susceptible to cleavage at a site of disease). In one embodiment, the linear fusion protein comprises 2, 3, or 4 X3 domains, wherein at least 2 X3 domains are linked without an intervening X1, X2, or X4 domain. Multiple X3 domains enable tuning of therapeutic peptide activation.

In another embodiment of the linear fusion proteins, at least one X1 domain is linked to an X2 domain without an intervening X3 or X4 domain.

The fusion proteins may further comprise at least one X5 domain comprising a targeting polypeptide. As used herein, a "targeting polypeptide" is any polypeptide that can serve to direct the fusion protein to a desired cell or tissue location.

In various non-limiting embodiments, the linear fusion proteins comprise a general formula selected from the group consisting of:

X1-X2-X3-X4;
X4-X3-X2-X1;
X1-X1-X2-X3-X4;
X4-X3-X2-X1-X1;
X1-X1-X2-X3-X3-X4;
X1-X1-X2-X3-X3-X3-X4;
X1-X3-X1-X2-X3-X4;
X1-X1-X3-X2-X3-X4;
X1-X3-X1-X3-X2-X3-X4;
X1-X3-X1-X2-X3-X3-X4;
X1-X1-X3-X2-X3-X3-X4;
X1-X3-X1-X3-X2-X3-X3-X4;
X5-X1-X2-X3-X4;
X1-X5-X2-X3-X4;
X4-X3-X2-X1-X5;
X4-X3-X2-X5-X1;
X1-X5-X1-X2-X3-X4;
X5-X1-X1-X2-X3-X4;
X5-X5-X1-X1-X2-X3-X4;
X5-X1-X5-X1-X2-X3-X4;
X1-X5-X1-X5-X2-X3-X4;
X1-X5-X1-X2-X3-X3-X4;
X5-X1-X1-X2-X3-X3-X4;
X5-X1-X1-X3-X2-X3-X3-X4;
X5-X5-X1-X1-X2-X3-X3-X4;
X5-X5-X1-X1-X2-X3-X3-X3-X4;
X1-X1-X5-X2-X3-X3-X4;
X1-X1-X5-X5-X3-X2-X3-X3-X4;
X1-X1-X3-X5-X5-X2-X3-X3-X4;
X1-X1-X3-X5-X5-X3-X2-X3-X3-X4;
X5-X5-X1-X1-X3-X2-X3-X3-X4;
X5-X5-X5-X1-X1-X2-X3-X3-X4;
X5-X5-X5-X1-X1-X3-X2-X3-X3-X4;
X5-X1-X5-X1-X2-X3-X3-X4;
X1-X5-X1-X5-X2-X3-X3-X4; and
X5-X1-X5-X1-X5-X1-X2-X3-X3-X4.

In another embodiment, the fusion protein comprises a branched fusion protein (i.e., at least one domain is covalently linked to a side chain of an amino acid along a protein backbone using a chemical crosslinker). The branched covalent linkage may be accomplished using any conjugation technique suitable for a specific branched fusion protein. In one non-limiting embodiment, the branched covalent linkage may be accomplished via chemical linkages between Cys-Maleimide and DBCO-azide, as exemplified herein.

All disclosure relative to linear fusion protein domains and linkages above are equally relevant to branched fusion proteins unless the context clearly indicates otherwise.

In one embodiment, an X4 domain is present at a terminus of the branched fusion protein. In another embodiment, a branch of the fusion protein comprises at least one X3 domain. In another embodiment, a branch of the fusion protein comprises at least one X3 domain linked to an X4 domain. Flexible positioning of X3 domains ensure optimal activation at the disease site. In another embodiment, the branched fusion protein further comprises at least one X5 domain comprising a targeting polypeptide.

In a further embodiment, a branch of the fusion protein is linked to the primary fusion protein backbone at a location between an X2 domain and one of an X1, X2, X3, or X5 domain. The embodiment ensures proximity of X2 to X4 for activity masking via electrostatic interaction.

In one embodiment, the branched fusion protein includes only 1 X2 domain. In another embodiment, the branched fusion protein includes only 1 X4 domain.

In a further embodiment, the branched fusion protein comprises 1 or 2 X1 domains. In another embodiment, the branched fusion protein comprises 2 X1 domains, wherein the 2 X1 domains are linked without an intervening X2, X3, or X4 domain. In one embodiment, the branched fusion protein comprises 1, 2, 3, or 4 X3 domains.

In various non-limiting embodiments, the branched fusion proteins comprise a general formula selected from the group consisting of formula 1-34 s shown in Table 1.

TABLE 1

Exemplary branched fusion protein formulae

| # | Formula |
|---|---------|
| 1 | X1—[X2 / X3—X4] |
| 2 | X1—[X2—X1 / X3—X4] |
| 3 | X1—X1—[X2 / X3—X4] |
| 4 | X1—X3—X1—[X2 / X3—X4] |
| 5 | X5—X5—X5—X1—[X2 / X3—X4] |
| 6 | [X2—X1 / X4—X3] |
| 7 | [X1—X2—X1 / X4—X3] |
| 8 | X1—X1—X3—[X2 / X3—X4] |
| 9 | X1—X3—X1—X3—[X2 / X3—X4] |
| 10 | X5—X5—X1—[X2 / X3—X4] |
| 11 | X1—X2—[X3—X4 / X3—X4] |
| 12 | X5—X1—X1—[X2 / X3—X4] |
| 13 | X5—X5—X1—X1—[X2 / X3—X4] |
| 14 | X5—X1—[X2 / X3—X4] |
| 15 | X5—X1—X5—X1—[X2 / X3—X4] |
| 16 | X5—X1—[X2—X1—X5 / X3—X4] |
| 17 | X5—X5—X1—[X2—X1—X5—X5 / X3—X4] |
| 18 | X5—X1—X2—[X1—X5 / X4—X3] |
| 19 | X5—X5—X1—X2—[X1—X5—X5 / X4—X3] |
| 20 | X1—X1—X2—[X3—X4 / X3—X4] |
| 21 | X5—X5—X5—X1—X1—[X2 / X3—X4] |
| 22 | X5—X5—X5—X1—X1—X3—[X2 / X3—X4] |
| 23 | X5—X5—X1—X1—X3—[X2 / X3—X4] |
| 24 | X5—X5—X1—X2—[X1—X5—X5 / X4—X3—X3] |
| 25 | X1—X1—X3—X5—X5—[X2 / X3—X4] |
| 26 | X1—X1—X3—X5—X5—[X2 / X3—X3—X4] |
| 27 | X1—X1—[X2 / X3—X3—X4] |
| 28 | X1—[X2—X2—[X3—X4 / X3—X4]] |
| 29 | X1—X1—[X2—X2—[X3—X4 / X3—X4]] |
| 30 | X5—X5—X1—X1—X3—[X2 / X3—X3—X3—X4] |
| 31 | X5—X5—X1—X1—X3—[X2 / X3—X3—X4] |
| 32 | X1—X1—X2—[X3 / X3]—X4 |
| 33 | X5—X5—X1—X1—X2—[X3 / X3]—X4 |

TABLE 1-continued

Exemplary branched fusion protein formulae

34  X1—X1—X3—X5—X5—X2—[X3 / X3]—X4

35  X5—X1—X2—[X3 / X3]—X4

The X1 domains may comprise any compound that can serve to increase the half-life of the fusion protein upon administration to a subject. In one embodiment, each X1 domain independently comprises a half-life extension compound selected from the group consisting of an albumin-binding polypeptide, an antibody/Fc domain (such as human Fc or mouse Fc), an unstructured XTEN polypeptide (see, for example, Nature Biotechnology volume 27, pages 1186-1190 (2009), incorporated herein by reference), a proline/alanine-rich sequence polypeptide (PAS), and/or poly(ethylene glycol). In one embodiment, the half-life extension compound is a half-life extension polypeptide. In embodiments where the fusion protein comprises more than one X1 domain, each X1 domain may independently be the same or different. In another embodiment, each X1 domain independently comprises an albumin or albumin-binding polypeptide, including but not limited to human serum albumin, mouse serum albumin and/or albumin-binding domain. In another embodiment, each X1 domain independently comprises the amino acid sequence selected from (ABD035): LAEAKVLANRELDKYGVSDFYKRLINKAKTVEGVEALKLHILAALP (SEQ ID NO: 1);
(ABD(DSA))-LAEAKVLANRELDKYGVSDYYKNLIDNAKSAEGVKALIDEILAALP (SEQ ID NO: 2);
Albumin-binding SSo7d M11.1.3; ATVKSTYRGEEKQVDISKIKWVIRWGQHLAFKYDEGGGAAGYGWVSEKDAPKELLQMLEKQGGGGSGGGGSATVKSTYRGEEKQVDISKIKWVIRWGQHLAFKYDEGGGAAGYGWVSEKDAPKELLQMLEKQ (SEQ ID NO: 3); and
(MG)LKEAKEKA IEELKKAGIT SDYYFDLINK AKTVEGVNAL KDEILKA (SEQ ID NO: 4), wherein the residues in parentheses are optional and may be present or absent. In one embodiment, each X1 domain independently comprises the amino acid sequence LKEAKEKA IEELKKAGIT SDYYFDLINK AKTVEGVNAL KDEILKA (SEQ ID NO: 5).

Any X2 domain can be used that provides an anionic block as suitable for an intended use. In one embodiment, the anionic block is may be combined with cationic therapeutic peptides (X4), including but not limited to antimicrobial peptides or anticancer peptides. In other embodiments, the anionic block may serve as a solubility enhancer for hydrophobic therapeutic peptides. In one embodiment, each X2 domain independently comprises an amino acid sequence selected from those in Table 2, wherein residues within parentheses are optional amino acids at that position.

TABLE 2

Exemplary anionic block formulae

| | Anionic block formula |
|---|---|
| A | (E/D)x, x = 1-20 |
| B | (E/D)x(G/S/A)x, x = 1-20 |
| C | ((E/D)(E/D)(G/S/A))x, x = 1-20 |
| D | ((E/D)(G/S/A)(E/D))x, x = 1-20 |
| E | (E/D)x(G/S/A)x(E/D)x, x = 1-20 |
| F | (E/D)x((E/D)K)x, x = 1-20 |

In one embodiment, each X2 domain independently comprises the amino acid sequence $(EEG)_x$, wherein "x" is 1-20, 2-16, 3-12, 4-10, 5-8, 1-15, 1-10, 2-10, 3-10, 4-10, 5-10, 2-8, 3-8, 4-8, 5-8, 5-7, 1, 2, 3, 4, 5, 6, 7, 8, 9, or 10.

Any linker susceptible to cleavage at a site of disease can be used as the X3 domain(s), as appropriate for an intended use. In one embodiment, each X3 domain independently comprises an amino acid sequence selected from the linker amino acid sequences listed in Table 3 (SEQ ID NO:6-70, 171, and 173-187), and/or the non-peptide linkers shown in Table 4 (S86-S96) In embodiments with more than one X3 domain, each X3 domain may be the same or different.

TABLE 3

Exemplary cleavable linkers

| Name | Sequence | Name | Sequence |
|---|---|---|---|
| S1 | PLGVRGKLVPR (SEQ ID NO: 171) | S36 | PLAQAVRSS (SEQ ID NO: 38) |
| S2 | PLG-(4-iodo-Phe)-GAR (SEQ ID NO: 6) | S37 | LAQAVRS (SEQ ID NO: 39) |
| S3 | RSLSRLTA (SEQ ID NO: 7) | S38 | LAQAFTS (SEQ ID NO: 40) |
| S4 | GLGRG (SEQ ID NO: 8) | S39 | LAAAVVS (SEQ ID NO: 41) |
| S5 | GAGLG (SEQ ID NO: 9) | S40 | KIEAVKS (SEQ ID NO: 42) |
| S6 | Nle(O-Bzl)-Met(O)2-Oic-Abu (SEQ ID NO: 10) | S41 | PRAEALKG (SEQ ID NO: 43) |
| S7 | LVPRG (SEQ ID NO: 11) | S42 | PRYEAYKMG (SEQ ID NO: 44) |
| S8 | PLGVRGK (SEQ ID NO: 12) | S43 | PRYEAYK (SEQ ID NO: 45) |
| S9 | P-(Cha)-G-Cys(Me)-HA (SEQ ID NO: 13) | S44 | PRAAAVKS (SEQ ID NO: 46) |

TABLE 3-continued

Exemplary cleavable linkers

| Name | Sequence | Name | Sequence |
| --- | --- | --- | --- |
| S10 | PVPLSLVM (SEQ ID NO: 14) | S45 | PTTSALKG (SEQ ID NO: 47) |
| S11 | PVGLIGG (SEQ ID NO: 15) | S46 | SLPVQDS (SEQ ID NO: 48) |
| S12 | PLGLRSW (SEQ ID NO: 16) | S47 | GLTLPVE (SEQ ID NO: 49) |
| S13 | VLK | S48 | YKIEAVK (SEQ ID NO: 50) |
| S14 | PQGIWGQ (SEQ ID NO: 17) | S49 | VHHQKLV (SEQ ID NO: 51) |
| S15 | KPISLISS (SEQ ID NO: 18) | S50 | TNMKHMA (SEQ ID NO: 52) |
| S16 | GGP | S51 | KTNMKHM (SEQ ID NO: 53) |
| S17 | ILSRIV (SEQ ID NO: 19) | S52 | VVSTQLI (SEQ ID NO: 54) |
| S18 | KPILFFRL (SEQ ID NO: 20) | S53 | QETNRSF (SEQ ID NO: 55) |
| S19 | KAFRRSG (SEQ ID NO: 21) | S54 | GPARQYY (SEQ ID NO: 56) |
| S20 | RQRRALEK (SEQ ID NO: 22) | S55 | YGSLPQK (SEQ ID NO: 57) |
| S21 | FSRPFR (SEQ ID NO: 23) | S56 | PPVAASS (SEQ ID NO: 58) |
| S22 | TTFYRRGA (SEQ ID NO: 24) | S57 | RSANAK (SEQ ID NO: 59) |
| S23 | ARLYSRG (SEQ ID NO: 25) | S58 | V-(Cit) |
| S24 | KLRSSKQ (SEQ ID NO: 26) | S59 | V-(Cit)-E |
| S25 | TSVLMAAPQ (SEQ ID NO: 27) | S60 | GFLG (SEQ ID NO: 60) |
| S26 | VGPSQG (SEQ ID NO: 28) | S61 | LPETG (SEQ ID NO: 61) |
| S27 | VRFRST (SEQ ID NO: 29) | S62 | RWARKK (SEQ ID NO: 62) |
| S28 | IQQRSL (SEQ ID NO: 30) | S63 | AAPV (SEQ ID NO: 63) |
| S29 | RQSRIV (SEQ ID NO: 31) | S64 | PLGLAR (SEQ ID NO: 64) |
| S30 | SQPRIV (SEQ ID NO: 32) | S65 | LSGRSDNH (SEQ ID NO: 65) |
| S31 | FPRS (SEQ ID NO: 33) | S66 | SGRSANAK (SEQ ID NO: 66) |
| S32 | LAQA-(homo-F)-RS (SEQ ID NO: 34) | S67 | VPLSLYSG (SEQ ID NO: 67) |
| S33 | LAQAFRS (SEQ ID NO: 35) | S68 | HPVGLLAR (SEQ ID NO: 68) |
| S34 | TRFYSR (SEQ ID NO: 36) | S69 | VHMPLGFLGP (SEQ ID NO: 69) |
| S35 | YVADAP (SEQ ID NO: 37) | S70 | PMAKK (SEQ ID NO: 70) |
| S71 | PRAEALK (SEQ ID NO: 173) | S79 | PRAEALY (SEQ ID NO: 181) |
| S72 | PRAEAL (SEQ ID NO: 174) | S80 | PRAAALK (SEQ ID NO: 182) |
| S73 | RAEALK (SEQ ID NO: 175) | S81 | PTTSALT (SEQ ID NO: 183) |
| S74 | PRAEALS (SEQ ID NO: 176) | S82 | SAQAVV (SEQ ID NO: 184) |
| S75 | PRAEALT (SEQ ID NO: 177) | S83 | VFRMLSV (SEQ ID NO: 185) |
| S76 | PRAEALA (SEQ ID NO: 178) | S84 | PYSARLA (SEQ ID NO: 186) |

TABLE 3-continued

Exemplary cleavable linkers

| Name | Sequence | Name | |
|---|---|---|---|
| S77 | PRAEALV (SEQ ID NO: 179) | S85 | QYAYLT (SEQ ID NO: 187) |
| S78 | PRAEALP (SEQ ID NO: 180) | | |

Amino acids are denoted by a single-letter code.
Upper case letters denote L amino acids.
4-iodo-Phe: 4-iodo-L-phenylalanine
Met (O) 2: L-methionine sulfone
Abu: L-2-aminobutyric acid
Cys (Me): S-methyl-L-cysteine
Nle (O-Bzl): 6-benzyloxy-L-norleucine
Oic: octahydroindole-2-carboxylic Acid
Cha: 3-cyclohexyl-L-alanine
Homo-F: L-homophenylalaine
Cit: L-citrulline

TABLE 4

Exemplary non-peptidic cleavable linkers

| S86 | [structure] |
| S87 | [structure] |
| S88 | [structure] |
| S89 | [structure] |
| S90 | [structure] |
| S91 | [structure] |
| S92 | [structure] |
| S93 | [structure] |
| S94 | [structure] |
| S95 | [structure] |
| S96 | [structure] |

In one embodiment, a spacing sequence may independently be inserted between different domains. In one embodiment, a spacing sequence is provided between each domain. In other embodiments, a spacing sequence is provided between some, but not all of the domains. Any spacing sequence may be used as appropriate for an intended use. In various embodiments, the spacing sequences independently comprise the amino acid sequence selected from $G_x$, $(GS)_x$, $(GGS)_x$, $(GSA)_x$, $(GGGS)_x$ (SEQ ID NO: 71), $(GGGGS)_x$ (SEQ ID NO: 72), where x=1-4, or SPSTPPTPSPSTPP (SEQ ID NO: 73)

Any therapeutic peptide may be used as an X4 domain as appropriate for an intended use. In one embodiment, the therapeutic peptide is a cationic therapeutic peptide. In another embodiment, the therapeutic peptide is an antimicrobial peptide. In additional embodiment, the therapeutic peptide is an anti-cancer peptide. In another embodiment, the therapeutic peptide is a cell-penetrating peptide fused to therapeutic peptide for intracellular targeting. In other embodiments, the therapeutic peptide may be a hydrophobic therapeutic peptide.

In various embodiments, each X4 domain comprises an amino acid sequence selected from the therapeutic peptide sequences listed in Table 5 SEQ ID NO:74-103).

TABLE 5

Exemplary therapeutic peptides

| Name | Sequence |
| --- | --- |
| (D)Pexiganan | GiGkflkkakkfGkafvkilkk-CONH2 (SEQ ID NO: 74) |
| (D)CAMEL0 | kwklfkkiGavlkvl-CONH2 (SEQ ID NO: 75) |
| Tachyplesin I | KWCFRVCYRGICYRRCR-CONH2, Disulfide bond: C3 & C16 and C7 & C12 (SEQ ID NO: 76) |
| (D)KLA | klaklakklaklaklak-CONH2 (SEQ ID NO: 77) |
| r9 | rrrrrrrrr-CONH2 (SEQ ID NO: 78) |
| Cyclic-r9 | Cyclo(rrrrrrrrr) (SEQ ID NO: 79) Amide-cyclized between N-terminal amine and C-terminal carboxylic acid |
| Tat | YGRKKRRQRRR-CONH2 (SEQ ID NO: 80) |
| (D)Tat | yGrkkrrqrrr-CONH2 (SEQ ID NO: 81) |
| Cyclic-(D)Tat | Cyclo(yGrkkrrqrrr) (SEQ ID NO: 82) Amide-cyclized between N-terminal amine and C-terminal carboxylic acid |
| (D)Transportan | GwtlnsaGyllGkinlkalaalakkil-CONH2 (SEQ ID NO: 83) |
| Colistin | 6-methyloctanoic acid-Dab-Thr-Dab-(Dab-Dab-(D-Leu)-Leu-Dab-Dab-Thr) (SEQ ID NO: 84) Amide-cyclized between C-terminal carboxylic acid and amine-side chain of Dab5 (Bold) 6-methyloctanoic acid can be replaced with 6-methylheptanoic acid |
| PMB | 6-methyloctanoic acid-Dab-Thr-Dab-(Dab-Dab-(D-Phe)-Leu-Dab-Dab-Thr) (SEQ ID NO: 85) Amide-cyclized between C-terminal carboxylic acid and amine-side chain of Dab5 (Bold) 6-methyloctanoic acid can be replaced with 6-methylheptanoic acid |
| Macolacin | 6-methyloctanoic acid-Dab-Thr-(D-Ser)-(Dab-Dab-(D-Leu)-Ile-Dab-Dab-Leu) (SEQ ID NO: 86) Amide-cyclized between C-terminal carboxylic acid and amine-side chain of Dab5 (Bold) |
| Biphenyl-Macolacin | Biphenyl-4-carboxylic acid-Dab-Thr-(D-Ser)-(Dab-Dab-(D-Leu-Ile-Dab-Dab-Leu) (SEQ ID NO: 87) Amide-cyclized between C-terminal carboxylic acid and amine-side chain of Dab5 (Bold) |
| POL7080 | Cyclo-(T-W-I-(Dab)-(Orn)-(Dab)-(Dab)-W-(Dab)-(Dab)-A-S-p-P) (SEQ ID NO: 88) Amide-cyclized between N-terminal amine and C-terminal carboxylic acid |
| LL-37 | LLGDFFRKSKEKIGKEFKRIVQRIKDFLRNLVPRTES (SEQ ID NO: 89) |
| (D)LL-37 | llGdffrkskekiGkefkrivqrikdflrnlvprtes (SEQ ID NO: 90) |
| LTX-315 | KKWWKK-Dip-K-CONH2 (SEQ ID NO: 91) |
| (D)LTX-315 | kkwwkk-(D-Dip)-k-CONH2 (SEQ ID NO: 92) |
| LfcinB | FKCRRWQWRMKKLGAPSITCVRRAF-CONH2 (SEQ ID NO: 93) Disulfide bond between Cys |
| (D)LfcinB | fkcrrwqwrmkklgapsitcvrraf-CONH2 (SEQ ID NO: 94) Disulfide bond between Cys |
| OLP-4 | Ac-ILKKWPWWPWRRK (SEQ ID NO: 95) |
| Magainin 2 | GIGKFLHSAKKFGKAFVGEIMNS (SEQ ID NO: 96) |
| (D)Magainin 2 | GiGkflhsakkfGkafvGeimns (SEQ ID NO: 97) |

TABLE 5-continued

Exemplary therapeutic peptides

| Name | Sequence |
| --- | --- |
| Buforin IIb | RAGLQFPVGRLLRRLLRRLLR (SEQ ID NO: 98) |
| (D)Buforin IIb | raGlqfpvGrllrrllrrllr (SEQ ID NO: 99) |
| PR-39 | RRRPRPPYLPRPRPPPFFPPRLPPRIPPGFPPRFPPRFP (SEQ ID NO: 100) |
| RP-182 | KERKAFKRFF (SEQ ID NO: 101) |
| P28 | TAADMQGVVTDGMASGLDKDYLKPDD (SEQ ID NO: 102) |
| Cyclorasin 9A5 | Cyclo(WTaRRR-(D-2-Nal)-R-(4-F-Phe)-(D-Nle)-Q) (SEQ ID NO: 103)<br>Amide-cyclized between N-terminal amine and C-terminal carboxylic acid |

Amino acids are denoted by either one or three-letter codes.
CONH2 denotes C-terminal amide.
Upper case letters denote L amino acids.
Lower case letters denote D-amino acids.
Dab: L-diaminobutyric acid
Orn: L-ornithine
Dip stands for diphenylalanine
(D-Dip) stands for D-diphenylalanine
D-2-Nal: D-2-naphthylalanine
4-F-Phe: L-4-fluorophenylalanine
D-Nle: D-norleucine In some embodiments, each X4 domains may comprise a detectable marker, including but not limited to Cy7, Cy5, AF647, AF680, or small molecule therapeutics (ciprofloxacin, LpxC inhibitors, aminoglycosides, rifampicin, linezolid, chemotherapeutics (doxorubicin, monomethyl auristatin E, monomethyl auristatin F, trabectedin, SN-38)). In one embodiment, the detectable marker may be located at the carboxy-terminus of a peptide X4 domain. In other embodiments, 1, 2, 3, or all X4 domains may comprise an azide linkage or other functional groups for conjugation, including but not limited to an Azidoacetyl linkage. In one embodiment, the azide linkage may be at the N-terminus of a peptide X4 domain. Non-limiting examples of such "functionalized" X4 domains are provided in Table 6 (SEQ ID NO:104-136).

TABLE 6

| Exemplary functionalized X4 domains | |
|---|---|
| (D)Pexiganan-azide | Azidoacetyl-GiGkflkkakkfGkafvkilkk-CONH2 (SEQ ID NO: 104) |
| (D)CAMEL0-azide | Azidoacetyl-GkwklfkkiGavlkvl-CONH2 (SEQ ID NO: 105) |
| Tachyplesin I-azide | Azidoacetyl-GKWCFRVCYRGICYRRCR-CONH2, Disulfide bond: C4 & C17 and C8 & C13 (SEQ ID NO: 106) |
| (D)KLA-azide | Azidoacetyl-klaklakklaklak-CONH2 (SEQ ID NO: 107) |
| r9-azide | Azidoacetyl-rrrrrrrrr-CONH2 (SEQ ID NO: 108) |
| Cyclic-r9-azide | Cyclo(K(N3)-rrrrrrrrr) (SEQ ID NO: 109) Amide-cyclized between N-terminal amine and C-terminal carboxylic acid |
| (D)Tat-azide | Azidoacetyl-yGrkkrrqrrr-CONH2 (SEQ ID NO: 110) |
| Cyclic-(D)Tat-azide | Cyclo(K(N3)-yGrkkrrqrrr) (SEQ ID NO: 111) Amide-cyclized between N-terminal amine and C-terminal carboxylic acid |
| (D)Transportan-azide | Azidoacetyl-GwtlnsaGyllGkinlkalaalakkil-CONH2 (SEQ ID NO: 112) |
| Colistin-azide | 6-methyloctanoic acid-K(N3)-Dab-Thr-Dab-(Dab-Dab-(D-Leu)-Leu-Dab-Dab-Thr) (SEQ ID NO: 113) Amide-cyclized between C-terminal carboxylic acid and amine-side chain of Dab5 (Bold) 6-methyloctanoic acid can be replaced with 6-methylheptanoic acid |

TABLE 6-continued

Exemplary functionalized X4 domains

| | |
|---|---|
| Colistin-X3-azide | 6-methyloctanoic acid-K(Azidoacetyl-X3-)-Dab-Thr-Dab-(Dab-Dab-(D-Leu)-Leu-Dab-Dab-Thr) (SEQ ID NO: 114)<br>Amide-cyclized between C-terminal carboxylic acid and amine-side chain of Dab5 (Bold)<br>X3 denotes cleavable linker<br>6-methyloctanoic acid can be replaced with 6-methylheptanoic acid |
| Colistin-(X3-NH)-azide | 6-methyloctanoic acid-Dab(Azidoacetyl-X3-)-Thr-Dab (Azidoacetyl-X3-)-(Dab-Dab (Azidoacetyl-X3-)-(D-Leu)-Leu-Dab (Azidoacetyl-X3-)-Dab(Azidoacetyl-X3-)-Thr) (SEQ ID NO: 115)<br>Amide-cyclized between C-terminal carboxylic acid and amine-side chain of Dab4 (Bold)<br>X3 denotes cleavable linker connected to one or more amino acid(s) with amine side chain<br>6-methyloctanoic acid can be replaced with 6-methylheptanoic acid |
| PMB-azide | 6-methyloctanoic acid-K(N3)-Dab-Thr-Dab-(Dab-Dab-(D-Phe)-Leu-Dab-Dab-Thr) (SEQ ID NO: 116)<br>Amide-cyclized between C-terminal carboxylic acid and amine-side chain of Dab5 (Bold)<br>6-methyloctanoic acid can be replaced with 6-methylheptanoic acid |
| PMB-X3-azide | 6-methyloctanoic acid-K(Azidoacetyl-X3-)-Dab-Thr-Dab-(Dab-Dab-(D-Phe)-Leu-Dab-Dab-Thr) (SEQ ID NO: 117)<br>Amide-cyclized between C-terminal carboxylic acid and amine-side chain of Dab5 (Bold)<br>X3 denotes cleavable linker<br>6-methyloctanoic acid can be replaced with 6-methylheptanoic acid |
| PMB-(X3-NH)-azide | 6-methyloctanoic acid-Dab(Azidoacetyl-X3-)-Thr-Dab(Azidoacetyl-X3-)-(Dab-Dab(Azidoacetyl-X3-)-(D-Phe)-Leu-Dab(Azidoacetyl-X3-)-Dab(Azidoacetyl-X3-)-Thr) (SEQ ID NO: 118)<br>Amide-cyclized between C-terminal carboxylic acid and amine-side chain of Dab4 (Bold)<br>X3 denotes cleavable linker connected to one or more amino acid(s) with amine side chain<br>6-methyloctanoic acid can be replaced with 6-methylheptanoic acid |
| Macolacin-azide | 6-methyloctanoic acid-K(N3)-Dab-Thr-(D-Ser)-(Dab-Dab-(D-Leu)-Ile-Dab-Dab-Leu) (SEQ ID NO: 119)<br>Amide-cyclized between C-terminal carboxylic acid and amine-side chain of Dab5 (Bold) |
| Macolacin-X3-azide | 6-methyloctanoic acid-K(Azidoacetyl-X3-)-Dab-Thr-(D-Ser)-(Dab-Dab-(D-Leu)-Ile-Dab-Dab-Leu) (SEQ ID NO: 120)<br>Amide-cyclized between C-terminal carboxylic acid and amine-side chain of Dab5 (Bold)<br>X3 denotes cleavable linker |
| Macolacin-(X3-NH)-azide | 6-methyloctanoic acid-Dab(Azidoacetyl-X3-)-Thr-(D-Ser)-(Dab-Dab(Azidoacetyl-X3-)-(D-Leu)-Ile-Dab(Azidoacetyl-X3-)-Dab(Azidoacetyl-X3-)-Leu) (SEQ ID NO: 121)<br>Amide-cyclized between C-terminal carboxylic acid and amine-side chain of Dab4 (Bold)<br>X3 denotes cleavable linker connected to one or more amino acid(s) with amine side chain |
| Biphenyl-Macolacin-azide | Biphenyl-4-carboxylic acid-K(N3)-Dab-Thr-(D-Ser)-(Dab-Dab-(D-Leu)-Ile-Dab-Dab-Leu) (SEQ ID NO: 122)<br>Amide-cyclized between C-terminal carboxylic acid and amine-side chain of Dab5 (Bold) |

TABLE 6-continued

Exemplary functionalized X4 domains

| | |
|---|---|
| Biphenyl-Macolacin-X3-azide | Biphenyl-4-carboxylic acid-K(Azidoacetyl-X3-)-Dab-Thr-(D-Ser)-(Dab-Dab-(D-Leu)-Ile-Dab-Dab-Leu) (SEQ ID NO: 123)<br>Amide-cyclized between C-terminal carboxylic acid and amine-side chain of Dab5 (Bold)<br>X3 denotes cleavable linker |
| Biphenyl-Macolacin-(X3-NH)-azide | Biphenyl-4-carboxylic acid-Dab(Azidoacetyl-X3-)-Thr-(D-Ser)-(Dab-Dab (Azidoacetyl-X3-)-(D-Leu)-Ile-Dab(Azidoacetyl-X3-)-Dab(Azidoacetyl-X3-)-Leu) (SEQ ID NO: 124)<br>Amide-cyclized between C-terminal carboxylic acid and amine-side chain of Dab5 (Bold)<br>X3 denotes cleavable linker connected to one or more amino acid(s) with amine side chain |
| POL7080-azide | Cyclo-(K(N3)-W-I-(Dab)-(Orn)-(Dab)-(Dab)-W-(Dab)-(Dab)-A-S-p-P) (SEQ ID NO: 125)<br>Amide-cyclized between N-terminal amine and C-terminal carboxylic acid |
| POL7080-X3-azide | Cyclo-(K(Azidoacetyl-X3-)-W-I-(Dab)-(Orn)-(Dab)-(Dab)-W-(Dab)-(Dab)-A-S-p-P) (SEQ ID NO: 126)<br>Amide-cyclized between N-terminal amine and C-terminal carboxylic acid<br>X3 denotes cleavable linker |
| POL7080-(X3-NH)-azide | Cyclo-(T-W-I-(Dab(Azidoacetyl-X3-))-(Orn(Azidoacetyl-X3-))-(Dab(Azidoacetyl-X3-))-(Dab(Azidoacetyl-X3-))-W-(Dab(Azidoacetyl-X3-))-(Dab(Azidoacetyl-X3-))-A-S-p-P) (SEQ ID NO: 127)<br>Amide-cyclized between N-terminal amine and C-terminal carboxylic acid<br>X3 denotes cleavable linker connected to one or more amino acid(s) with amine side chain |
| POL7080-Cy7 | Cyclo-(K(Cy7)-W-I-(Dab)-(Orn)-(Dab)-(Dab)-W-(Dab)-(Dab)-A-S-p-P) (SEQ ID NO: 128) |
| POL7080-Cy7-azide | Cyclo-(K(N3)-W-I-(Dab)-(Orn)-(Dab)-(Dab)-W-(Dab)-(Dab)-K(Cy7)-S-p-P) (SEQ ID NO: 129) |
| Colistin-Cy7-azide | 6-methyloctanoic acid-K(N3)-Dab-K(Cy7)-Dab-(Dab-Dab-(D-Leu)-Leu-Dab-Dab-Thr) (SEQ ID NO: 130)<br>Amide-cyclized between C-terminal carboxylic acid and amine-side chain of Dab5 (Bold)<br>6-methyloctanoic acid can be replaced with 6-methylheptanoic acid |
| PMB-Cy7-azide | 6-methyloctanoic acid-K(N3)-Dab-K(Cy7)-Dab-(Dab-Dab-(D-Phe)-Leu-Dab-Dab-Thr) (SEQ ID NO: 131)<br>Amide-cyclized between C-terminal carboxylic acid and amine-side chain of Dab5 (Bold)<br>6-methyloctanoic acid can be replaced with 6-methylheptanoic acid |
| Macolacin-Cy7-azide | 6-methyloctanoic acid-K(N3)-Dab-K(Cy7)-(D-Ser)-(Dab-Dab-(D-Leu)-Ile-Dab-Dab-Leu) (SEQ ID NO: 132)<br>Amide-cyclized between C-terminal carboxylic acid and amine-side chain of Dab5 (Bold) |
| (D)Pexiganan-Cy7-azide | Azidoacetyl-GiGkflkkakkfGkafvkilkk-K(Cy7)-CONH2 (SEQ ID NO: 133) |
| (D)KLA-Cy7-azide | Azidoacetyl-Gklaklakklaklak-K(Cy7)-CONH2 (SEQ ID NO: 134) |
| Tachyplesin I-Cy7-azide | Azidoacetyl-GKWCFRVCYRGICYRRCRG-K(Cy7)-CONH2, Disulfide bond: C4 & C17 and C8 & C13 (SEQ ID NO: 135) |

TABLE 6-continued

Exemplary functionalized X4 domains

| | |
|---|---|
| r9-Cy7-azide | Azidoacetyl-rrrrrrrrr-(Ahx)-K(Cy7)-CONH2 (SEQ ID NO: 136) |

Amino acids are denoted by either one or three-letter codes.
CONH2 denotes C-terminal amide.
Upper case letters denote L amino acids.
Lower case letters denote D-amino acids.
K(N3): L-azidolysine.
Dab: L-diaminobutyric acid.
Orn: L-ornithine.
Azide group can be replaced with other functional groups for conjugation
Cy7 can be replaced with other reporter molecules (e.g. Cy5, AF647, AF680) or small molecule antibiotics (ciprofloxacin, LpxC inhibitors, aminoglycosides)

In specific embodiments, each X4 domain may independently comprise the amino acid sequence selected from SEQ ID NO:136-139.

GiGkflkkakkfGkafvkilkk; (SEQ ID NO: 137)
and/or

GiGkflkkakkfGkafvkilkkK; (SEQ ID NO: 138)
and/or

Cyclo-(T-W-I-(Dab)-(Orn)-(Dab)-(Dab)-W-(Dab)-(Dab)-A-S-p-P); (SEQ ID NO: 139)
and/or 6-methyloctanoic acid-Dab-T-Dab-(Dab-Dab-1-L-Dab-Dab-T); (SEQ ID NO: 140)

wherein residues in lower case are D amino acids and residues in upper case are L amino acids or glycine (which is achiral) and Dab and Orn denote L-diaminobutyric acid and L-ornithine respectively.

In other specific embodiments, of the fusion proteins:
(a) each X1 domain comprises the amino acid sequence (MG)LKEAKEKA IEELKKAGIT SDYYFDLINK AKTVEGVNAL KDEILKA (SEQ ID NO: 4), wherein the residues in parentheses are optional and may be present or absent, or wherein each X1 domain independently comprises the amino acid sequence LKEAKEKA IEELKKAGIT SDYYFDLINK AKTVEGVNAL KDEILKA (SEQ ID NO: 5);
(b) each X2 domain comprises the amino acid sequence (EEG)x, wherein "x" is 1-20, 2-16, 3-12, 4-10, 5-8, 1-15, 1-10, 2-10, 3-10, 4-10, 5-10, 2-8, 3-8, 4-8, 5-8, 5-7, 1, 2, 3, 4, 5, 6, 7, 8, 9, or 10;
(c) each X3 domain comprises the amino acid sequence SPSTPPTPSPSTPP (SEQ ID NO: 73); and
(d) each X4 domain comprises the amino acid sequence GiGkflkkakkfGkafvkilkk (SEQ ID NO: 137); and/or GiGkflkkakkfGkafvkilkkK (SEQ ID NO: 138); and/or Cyclo-(T-W-I-(Dab)-(Orn)-(Dab)-(Dab)-W-(Dab)-(Dab)-A-S-p-P) (SEQ ID NO: 139); and/or 6-methyloctanoic acid-Dab-T-Dab-(Dab-Dab-1-L-Dab-Dab-T) (SEQ ID NO: 140);
wherein residues in lower case are D amino acids and residues in upper case are L amino acids or glycine (which is achiral) and Dab and Orn denote L-diaminobutyric acid and L-ornithine respectively.

In one such embodiment, the fusion protein comprises 1 X1 domain, 1 X2 domain, 1 X3 domain, and 1 X4 domain.

Any targeting domain may be used as the X5 domain(s), as deemed appropriate for an intended purpose. In various embodiments, the X5 domain comprises the amino acid sequence selected from the group consisting of those shown in Table 7 (SEQ ID NO:141-155 and 188-192).

TABLE 7

Exemplary Targeting domains

| Target | Sequence |
|---|---|
| ICAM1 | FEGFSFLAFEDFVSSI (SEQ ID NO: 141) |
| ICAM1 | QVQLVESGGGLVQPGGSLRLSCAASGSISSLYVMGWYRQAPG KQRELVADITSSGSIYYVDSLKGRFTISRDNARSTVYLQMNSLEP EDTAVYYCMAHVRQDSGSEYLTYWGQGTQVTVSS (SEQ ID NO: 142) |
| ICAM1 | NVDLVFLFDGSMSLQPDEFQKILDFMKDVMKKLSNTSYQFAAV QFSTSYKTEFDFSDYVKWKDPDALLKHVKHMLLLTNTFGAINYV ATEVFREELGARPDATKVLIIITDGEATDSGNIDAAKDIIRYIIGIGK HSQTKESQETLHKFASKPASEFVKILDTGEKLKDLFTELQKKIYVIE GTSKQDLT (SEQ ID NO: 143) |
| Aminopeptidase P | DVVMTQTPSSLSASRGDRVTISCSASQAISKYLNWYQQKPDGTV KLLINYTSRLHSGVPSRFSGSGSGTDYSLTISNLEPEDIATYYCQQY NKLPYTFGGGTKLEIKGGGGSGGGGSGGGGSEVQLQQSGAELM KSGASVKISCKATGYTFSSYWIEWIKQRPGHGLEWIGEILPGSGST NYNEKFKGKATVTTDTSSNTAYMQFSSLTSEDSAVYYCARWYDG HFDYWGQGTTLTVSSTS (SEQ ID NO: 144) |

TABLE 7-continued

Exemplary Targeting domains

| Target | Sequence |
|---|---|
| CD177 | DFYKPMPNLRIT (SEQ ID NO: 145) |
| CD177 | LQIQSWSSSP (SEQ ID NO: 146) |
| CD177 | FPLETSHMSAPL (SEQ ID NO: 147) |
| CD177 | KFPDLDSRRLPHMSL (SEQ ID NO: 148) |
| P-selectin | KYIKFKHDYNILEFNDGTFE (SEQ ID NO: 149) |
| P-selectin | EWVDV (SEQ ID NO: 150) |
| P-selectin | DVEWVDVA (SEQ ID NO: 151) |
| E-selectin | DITWDQLWDLMK (SEQ ID NO: 152) |
| PcrV | EVQLVESGGGLVQPGGSLRLSCAASGSTLDYYAIGWFRQAPG KEREGVSCTSNSGSTYYGGSVKGRFTASRDNAKNTVYLQMNSLR PEDTAVYYCVATIGCATLGGTLDVQRYYYRGQGTQVTVSS (SEQ ID NO: 153) |
| Flagellin | QVQLQESGGGLVQAGGSLTLSCAASGRTFSNYAMGWFRQAP GKEREFVAMISWNGENTYYADSVKGRFTISRDNAKNTVYLQM NSLKPEDTAVYYCAVRILSGWYDRPDEYGYWGQGTQVTVSS (SEQ ID NO: 154) |
| IRGD | CRGDKGPDC (SEQ ID NO: 155) Disulfide bond between cysteines |
| ADAM10 | EMQLVESGGGLVQTGGSLRLSCAASGRTFTSYCVGWWRQAP GKERDVVAAITRGSNSTDYVDSVKGRFTISRDNAENTVYLQ MNSLKPEDTAVYYCAADINCRNLYTGRPEYWGQGTQVTVSS (SEQ ID NO: 188) |
| ADAM10 | EVQLVESGGGLVQAGGSLRLSCAASERIFSTYFMGWFRQAP GKEREFVAFISGNGGSTDYADSVKGRFAISRDNVKNTLYLQ MSSLKPDDTAVYYCAVAGRQIKSTWDYWGQGTQVTVSS (SEQ ID NO: 189) |
| ADAM10 | EVQLVESGGGLVQAGGSLRLSCARSGRISNINIMSWYRQAP GKTRDMVAAIIGDSTNYADSVKGRFTISRDNAKNTVHLQMN RLKPEDTGVYYCNIPGVDWGQGTQVTVSS (SEQ ID NO: 190) |
| ADAM10 | EVQLVESGGGLVQAGGSLRLSCARSGRISNINIMAWYRQAP GKTRDMVAAIIGDSTNYADSVKGRFTISRDNAKNTVYLHMN RLKPEDTGVYYCKISGVDWGQGTQVTVSS (SEQ ID NO: 191) |
| ADAM10 | KVQLVESGGGLVQAGGSLRLSCAASGNIFINNAVGWYRQAP GKQREMVAAMLSGGSTNYADSVKGRFTISRDNAKNTVYLQM NSLKPEDTAVYYCNVQVNGTWARWGQGTQVTVSS (SEQ ID NO: 192) |

The fusion proteins may be made via any suitable technique, including chemical synthesis. In some embodiments of the linear fusion proteins, the fusion protein may be genetically encodable and can be expressed using standard recombinant techniques.

The disclosure further comprises nucleic acids encoding a genetically encodable fusion protein, expression vectors comprising a nucleic acid encoding the fusion protein operatively linked to a suitable regulatory sequence, and host cells comprising the nucleic acids and/or the expression vector. The nucleic acid may comprise RNA or DNA, and may comprise additional sequences useful for promoting expression and/or purification of the encoded protein, including but not limited to polyA sequences, modified Kozak sequences. "Expression vectors" includes vectors that operatively link a nucleic acid coding region or gene to any control sequences capable of effecting expression of the gene product. "Control sequences" operably linked to the nucleic acid sequences of the invention are nucleic acid sequences capable of effecting the expression of the nucleic acid molecules. The control sequences need not be contiguous with the nucleic acid sequences, so long as they function to direct the expression thereof. Thus, for example, intervening untranslated yet transcribed sequences can be present between a promoter sequence and the nucleic acid sequences and the promoter sequence can still be considered "operably linked" to the coding sequence. Other such control sequences include, but are not limited to, polyadenylation signals, termination signals, and ribosome binding sites. Such expression vectors include but are not limited to, plasmid and viral-based expression vectors. The control sequence used to drive expression of the disclosed nucleic acid sequences in a mammalian system may be constitutive (driven by any of a variety of promoters, including but not limited to, CMV, SV40, RSV, actin, EF) or inducible (driven by any of a number of inducible promoters including, but not limited to, tetracycline, ecdysone, steroid-responsive). The expression vector must be replicable in the host organisms either as an episome or by integration into host chromosomal DNA. In various embodiments, the expression vector may comprise a plasmid, viral-based vector (including but not limited to a retroviral vector or oncolytic virus), or any other suitable expression vector. The host cells can be transiently or stably engineered to incorporate the expression vector, using techniques including but not limited to bacterial transformations, calcium phosphate co-precipitation, electroporation, or liposome mediated-, DEAE dextran mediated-, polycationic mediated-, or viral mediated transfection. (See, for example, *Molecular Cloning: A Laboratory Manual* (Sambrook, et al., 1989, Cold Spring Harbor Laboratory Press); *Culture of Animal Cells: A Manual of Basic Technique*, $2^{nd}$ Ed. (R. I. Freshney. 1987. Liss, Inc. New York, NY)). A method of producing a polypeptide according to the invention is an additional part of the invention. The method comprises the steps of (a) culturing a host according to this aspect of the invention under conditions conducive to the expression of the fusion protein, and (b) optionally, recovering the expressed fusion protein.

In various non-limiting embodiments, the fusion protein comprises the structure selected from the fusion proteins listed in Table 8 (SEQ ID No: 156-170 and 193-204, wherein any detectable labels are optional.

TABLE 8

Examples of final fusion proteins

| Fusion protein | Sequence |
|---|---|
| ABD-(EEG)6-S1-(D)Pex | GLKEAKEKAIEELKKAGITSDYYFDLINKAKTVEGVNALKDEILKAHHHHHH SPSTPPTPSPSTPPEEGEEGEEGEEGEEGEEGPLGVRGKLVPRGC-(DBCO-Maleimide)-Azidoacetyl-GiGkflkkakkfGkafvkilkk-CONH2 (SEQ ID NO: 156) Chemically linked at Cys-Maleimide and DBCO-azide |
| (ABD)2-(EEG)6-S12-(D)Pex | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGPLGLRSWGC-(DBCO-Maleimide)-Azidoacetyl-GiGkflkkakkfGkafvkilkk-CONH2 (SEQ ID NO: 157) Chemically linked at Cys-Maleimide and DBCO-azide |
| (ABD)2-(EEG)6-S12-(D)Pex-Cy7 | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGPLGLRSWGC-(DBCO-Maleimide)-Azidoacetyl-GiGkflkkakkfGkafvkilkk-K(Cy7)-CONH2 (SEQ ID NO: 158) Chemically linked at Cys-Maleimide and DBCO-azide |
| (ABD)2-(EEG)6-S12-S12-POL7080 | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGC-(DBCO-Maleimide)-Cyclo-(K(Azidoacetyl-GPLGLRSWGPLGLRSW-)-W-I-(Dab)-(Orn)-(Dab)-(Dab)-W-(Dab)-(Dab)-A-S-p-P) (SEQ ID NO: 159) Chemically linked at Cys-Maleimide and DBCO-azide |
| (ABD)2-(EEG)6-S12-S6-POL7080 | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGC-(DBCO-Maleimide)-Cyclo-(T-W-I-(Dab(Azidoacetyl-GPLGLRSWG-Nle(O-Bzl)-Met(O)2-Oic-Abu-))-(Orn)-(Dab)-(Dab)-W-(Dab)-(Dab)-A-S-p-P) (SEQ ID NO: 160) Chemically linked at Cys-Maleimide and DBCO-azide |
| (ABD)2-(EEG)6-S12-S12-Colistin | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGC-(DBCO-Maleimide)-6-methyloctanoic acid-K(Azidoacetyl-GPLGLRSWGPLGLRSW-)-Dab-Thr-Dab-(Dab-Dab-(D-Leu)-Leu-Dab-Dab-Thr) (SEQ ID NO: 161) Chemically linked at Cys-Maleimide and DBCO-azide |
| (ABD)2-(EEG)6-S12-S6-Colistin | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGC-(DBCO-Maleimide)-6-methyloctanoic acid-Dab(Azidoacetyl-GPLGLRSWG-Nle(O-Bzl)-Met(O)2-Oic-Abu-)-Thr-Dab-(Dab-Dab-(D-Leu)-Leu-Dab-Dab-Thr) (SEQ ID NO: 162) Chemically linked at Cys-Maleimide and DBCO-azide |
| (ABD)2-(EEG)6-S12-Biphenyl-Macolacin | GLKEAKEKAIEELKKAGITSDYYFDLINKAKTVEGVNALKDEILKAGGGGSG GGGSGGGGSLKEAKEKAIEELKKAGITSDYYFDLINKAKTVEGVNALKDEIL KAHHHHHHSPSTPPTPSPSTPPEEGEEGEEGEEGEEGEEGC-(DBCO-Maleimide)-Biphenyl-4-carboxylic acid-K(Azidoacetyl-GPLGLRSWGPLGLRSW-)-Dab-Thr-(D-Ser)-(Dab-Dab-(D-Leu)- |

TABLE 8-continued

Examples of final fusion proteins

| Fusion protein | Sequence |
|---|---|
| | Ile-Dab-Dab-Leu) (SEQ ID NO: 163)<br>Chemically linked at Cys-Maleimide and DBCO-azide |
| (ABD)2-<br>(EEG)6-S12-<br>S6-Biphenyl-<br>Macolacin | GLKEAKEKAIEELKKAGITSDYYFDLINKAKTVEGVNALKDEILKAGGGGSG<br>GGGSGGGGSLKEAKEKAIEELKKAGITSDYYFDLINKAKTVEGVNALKDEIL<br>KAHHHHHHSPSTPPTPSPSTPPEEGEEGEEGEEGEEGEEGC-(DBCO-<br>Maleimide)-Biphenyl-4-carboxylic acid-<br>Dab(Azidoacetyl-GPLGLRSWG-Nle(O-Bzl)-Met(O)2-Oic-<br>Abu-)-Thr-(D-Ser)-(Dab-Dab-(D-Leu)-Ile-Dab-Dab-Leu)<br>(SEQ ID NO: 164)<br>Chemically linked at Cys-Maleimide and DBCO-azide |
| DFY-(ABD)2-<br>(EEG)6-S12-<br>S12-POL7080 | GDFYKPMPNLRITGGGGSLKEAKEKAIEELKKAGITSDYYFDLINKA<br>KTVEGVNALKDEILKAGGGGSGGGGSGGGGSLKEAKEKAIEELKKAGITS<br>DYYFDLINKAKTVEGVNALKDEILKAHHHHHHSPSTPPTPSPSTPPEEGEE<br>GEEGEEGEEGEEGC-(DBCO-Maleimide)-Cyclo-<br>(K(Azidoacetyl-GPLGLRSWGPLGLRSW-)-W-I-(Dab)-(Orn)-<br>(Dab)-(Dab)-W-(Dab)-(Dab)-A-S-p-P) (SEQ ID NO: 165)<br>Chemically linked at Cys-Maleimide and DBCO-azide |
| (DFY)2-<br>(ABD)2-<br>(EEG)6-S12-<br>S12-POL7080 | GDFYKPMPNLRITGGGGSDFYKPMPNLRITGGGGSLKEAKEKAIEELKKA<br>GITSDYYFDLINKAKTVEGVNALKDEILKAGGGGSGGGGSGGGGSLKEAK<br>EKAIEELKKAGITSDYYFDLINKAKTVEGVNALKDEILKAHHHHHHSPSTPP<br>TPSPSTPPEEGEEGEEGEEGEEGC-(DBCO-Maleimide)-Cyclo-<br>(K(Azidoacetyl-GPLGLRSWGPLGLRSW-)-W-I-(Dab)-(Orn)-<br>(Dab)-(Dab)-W-(Dab)-(Dab)-A-S-p-P) (SEQ ID NO: 166)<br>Chemically linked at Cys-Maleimide and DBCO-azide |
| (DFY-ABD)2-<br>(EEG)6-S12-<br>S12-POL7080 | GDFYKPMPNLRITGGGGSLKEAKEKAIEELKKAGITSDYYFDLINKAKTVEG<br>VNALKDEILKAGGGGSDFYKPMPNLRITGGGGSLKEAKEKAIEELKKAGITS<br>DYYFDLINKAKTVEGVNALKDEILKAHHHHHHSPSTPPTPSPSTPPEEGEEG<br>EEGEEGEEGEEGC-(DBCO-Maleimide)-Cyclo-(K(Azidoacetyl-<br>GPLGLRSWGPLGLRSW-)-W-I-(Dab)-(Orn)-(Dab)-(Dab)-W-<br>(Dab)-(Dab)-A-S-p-P) (SEQ ID NO: 167)<br>Chemically linked at Cys-Maleimide and DBCO-azide |
| DFY-(ABD)2-<br>(EEG)6-S12-<br>S6-Colistin | GDFYKPMPNLRITGGGGSLKEAKEKAIEELKKAGITSDYYFDLINKA<br>KTVEGVNALKDEILKAGGGGSGGGGSGGGGSLKEAKEKATEELKKAGITS<br>DYYFDLINKAKTVEGVNALKDEILKAHHHHHHSPSTPPTPSPSTPPEEGEE<br>GEEGEEGEEGEEGC-(DBCO-Maleimide)-6-methyloctanoic<br>acid-Dab(Azidoacetyl-GPLGLRSWGPLGLRSW-Nle(O-Bzl)-<br>Met(O)2-Oic-Abu-)-Thr-Dab-(Dab-Dab-(D-Leu)-Leu-Dab-<br>Dab-Thr) (SEQ ID NO: 168)<br>Chemically linked at Cys-Maleimide and DBCO-azide |
| (DFY)2-<br>(ABD)2-<br>(EEG)6-S12-<br>S6-Colistin | GDFYKPMPNLRITGGGGSDFYKPMPNLRITGGGGSLKEAKEKAIEELKKA<br>GITSDYYFDLINKAKTVEGVNALKDEILKAGGGGSGGGGSGGGGSLKEAK<br>EKAIEELKKAGITSDYYFDLINKAKTVEGVNALKDEILKAHHHHHHSPSTPP<br>TPSPSTPPEEGEEGEEGEEGEEGC-(DBCO-Maleimide)-6-<br>methyloctanoic acid-Dab(Azidoacetyl-<br>GPLGLRSWGPLGLRSW-Nle(O-Bzl)-Met(O)2-Oic-Abu-)-Thr-<br>Dab-(Dab-Dab-(D-Leu)-Leu-Dab-Dab-Thr) (SEQ ID NO:<br>169)<br>Chemically linked at Cys-Maleimide and DBCO-azide |
| (DFY-ABD)2-<br>(EEG)6-S12-<br>S6-Colistin | GDFYKPMPNLRITGGGGSLKEAKEKAIEELKKAGITSDYYFDLINKAKTVEG<br>VNALKDEILKAGGGGSDFYKPMPNLRITGGGGSLKEAKEKAIEELKKAGITS<br>DYYFDLINKAKTVEGVNALKDEILKAHHHHHHSPSTPPTPSPSTPPEEGEEG<br>EEGEEGEEGEEGC-(DBCO-Maleimide)-6-methyloctanoic<br>acid-Dab(Azidoacetyl-GPLGLRSWGPLGLRSW-Nle(O-Bzl)-<br>Met(O)2-Oic-Abu-)-Thr-Dab-(Dab-Dab-(D-Leu)-Leu-Dab-<br>Dab-Thr) (SEQ ID NO: 170)<br>Chemically linked at Cys-Maleimide and DBCO-azide |
| (ABD)2-<br>(EEG)6-S74-<br>S74-POL7080 | GLKEAKEKAIEELKKAGITSDYYFDLINKAKTVEGVNALKDEILKAGGGGSG<br>GGGSGGGGSLKEAKEKAIEELKKAGITSDYYFDLINKAKTVEGVNALKDEIL<br>KAHHHHHHSPSTPPTPSPSTPPEEGEEGEEGEEGEEGEEGC-(DBCO-<br>Maleimide)-Cyclo-(K(Azidoacetyl-GPRAEALSPRAEALS-)-W-<br>I-(Dab)-(Orn)-(Dab)-(Dab)-W-(Dab)-(Dab)-A-S-p-P)<br>(SEQ ID NO: 193)<br>Chemically linked at Cys-Maleimide and DBCO-azide |
| (ABD)2-<br>(EEG)6-S75-<br>S75-POL7080 | GLKEAKEKAIEELKKAGITSDYYFDLINKAKTVEGVNALKDEILKAGGGGSG<br>GGGSGGGGSLKEAKEKAIEELKKAGITSDYYFDLINKAKTVEGVNALKDEIL<br>KAHHHHHHSPSTPPTPSPSTPPEEGEEGEEGEEGEEGEEGC-(DBCO- |

TABLE 8-continued

Examples of final fusion proteins

| Fusion protein | Sequence |
|---|---|
| | Maleimide)-Cyclo-(K(Azidoacetyl-GPRAEALTPRAEALT-)-W-I-(Dab)-(Orn)-(Dab)-(Dab)-W-(Dab)-(Dab)-A-S-p-P) (SEQ ID NO: 194) Chemically linked at Cys-Maleimide and DBCO-azide |
| VHH1-(ABD)2-(EEG)6-S75-POL7080 | EMQLVESGGGLVQTGGSLRLSCAASGRTFTSYCVGWWRQAPGKERDVVAAITRGSNSTDYVDSVKGRFTISRDNAENTVYLQMNSLKPEDTAVYYCAADINCRNLYTGRPEYWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-Cyclo-(K(Azidoacetyl-GPRAEALT-)-W-I-(Dab)-(Orn)-(Dab)-(Dab)-W-(Dab)-(Dab)-A-S-p-P) (SEQ ID NO: 195) Chemically linked at Cys-Maleimide and DBCO-azide |
| VHH2-(ABD)2-(EEG)6-S75-POL7080 | EVQLVESGGGLVQAGGSLRLSCAASERIFSTYFMGWFRQAPGKEREFVAFISGNGGSTDYADSVKGRFAISRDNVKNTLYLQMSSLKPDDTAVYYCAVAGRQIKSTWDYWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-Cyclo-(K(Azidoacetyl-GPRAEALT-)-W-I-(Dab)-(Orn)-(Dab)-(Dab)-W-(Dab)-(Dab)-A-S-p-P) (SEQ ID NO: 196) Chemically linked at Cys-Maleimide and DBCO-azide |
| VHH3-(ABD)2-(EEG)6-S75-POL7080 | EVQLVESGGGLVQAGGSLRLSCARSGRISNINIMSWYRQAPGKTRDMVAAIIGDSTNYADSVKGRFTISRDNAKNTVHLQMNRLKPEDTGVYYCNIPGVDWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-Cyclo-(K(Azidoacetyl-GPRAEALT-)-W-I-(Dab)-(Orn)-(Dab)-(Dab)-W-(Dab)-(Dab)-A-S-p-P) (SEQ ID NO: 197) Chemically linked at Cys-Maleimide and DBCO-azide |
| VHH4-(ABD)2-(EEG)6-S75-POL7080 | EVQLVESGGGLVQAGGSLRLSCARSGRISNINIMAWYRQAPGKTRDMVAAIIGDSTNYADSVKGRFTISRDNAKNTVYLHMNRLKPEDTGVYYCKISGVDWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-Cyclo-(K(Azidoacetyl-GPRAEALT-)-W-I-(Dab)-(Orn)-(Dab)-(Dab)-W-(Dab)-(Dab)-A-S-p-P) (SEQ ID NO: 198) Chemically linked at Cys-Maleimide and DBCO-azide |
| VHH5-(ABD)2-(EEG)6-S75-POL7080 | KVQLVESGGGLVQAGGSLRLSCAASGNIFINNAVGWYRQAPGKQREMVAAMLSGGSTNYADSVKGRFTISRDNAKNTVYLQMNSLKPEDTAVYYCNVQVNGTWARWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-Cyclo-(K(Azidoacetyl-GPRAEALT-)-W-I-(Dab)-(Orn)-(Dab)-(Dab)-W-(Dab)-(Dab)-A-S-p-P) (SEQ ID NO: 199) Chemically linked at Cys-Maleimide and DBCO-azide |
| VHH1-(ABD)2-(EEG)6-S75-Colistin | EMQLVESGGGLVQTGGSLRLSCAASGRTFTSYCVGWWRQAPGKERDVVAAITRGSNSTDYVDSVKGRFTISRDNAENTVYLQMNSLKPEDTAVYYCAADINCRNLYTGRPEYWGQGTQVTVSSGGGGSGGGGSGGGGSLKEAKEKAIEELKKAGITSDYYFDLINKAKTVEGVNALKDEILKAGGGGSGGGGSGGGGSLKEAKEKAIEELKKAGITSDYYFDLINKAKTVEGVNALKDEILKAHHHHHHSPSTPPTPSPSTPPEEGEEGEEGEEGEEGEEGC-(DBCO-Maleimide)-6-methyloctanoic acid-Dab(Azidoacetyl- |

TABLE 8-continued

Examples of final fusion proteins

| Fusion protein | Sequence |
|---|---|
| | GPRAEALT-)-Thr-Dab-(Dab-Dab-(D-Leu)-Leu-Dab-Dab-Thr)<br>(SEQ ID NO: 200)<br>Chemically linked at Cys-Maleimide and DBCO-azide |
| VHH2-(ABD)2-<br>(EEG)6-S75-<br>Colistin | EVQLVESGGGLVQAGGSLRLSCAASERIFSTYFMGWFRQAP<br>GKEREFVAFISGNGGSTDYADSVKGRFAISRDNVKNTLYLQ<br>MSSLKPDDTAVYYCAVAGRQIKSTWDYWGQGTQVTVSS<br>GGGGSGGGGSGGGGSLKEAKEKAIEELKKAGITSDYYFDLI<br>NKAKTVEGVNALKDEILKAGGGGSGGGGSGGGGSLKEAKEK<br>AIEELKKAGITSDYYFDLINKAKTVEGVNALKDEILKAHHH<br>HHHSPSTPPTPSPSTPPEEGEEGEEGEEGEEGEEGC-(DBCO-<br>Maleimide)-6-methyloctanoic acid-Dab(Azidoacetyl-<br>GPRAEALT-)-Thr-Dab-(Dab-Dab-(D-Leu)-Leu-Dab-Dab-Thr)<br>(SEQ ID NO: 201)<br>Chemically linked at Cys-Maleimide and DBCO-azide |
| VHH3-(ABD)2-<br>(EEG)6-S75-<br>Colistin | EVQLVESGGGLVQAGGSLRLSCARSGRISNINIMSWYRQAP<br>GKTRDMVAAIIGDSTNYADSVKGRFTISRDNAKNTVHLQMN<br>RLKPEDTGVYYCNIPGVDWGQGTQVTVSS<br>GGGGSGGGGSGGGGSLKEAKEKAIEELKKAGITSDYYFDLI<br>NKAKTVEGVNALKDEILKAGGGGSGGGGSGGGGSLKEAKEK<br>AIEELKKAGITSDYYFDLINKAKTVEGVNALKDEILKAHHH<br>HHHSPSTPPTPSPSTPPEEGEEGEEGEEGEEGEEGC-(DBCO-<br>Maleimide)-6-methyloctanoic acid-Dab(Azidoacetyl-<br>GPRAEALT-)-Thr-Dab-(Dab-Dab-(D-Leu)-Leu-Dab-Dab-Thr)<br>(SEQ ID NO: 202)<br>Chemically linked at Cys-Maleimide and DBCO-azide |
| VHH4-(ABD)2-<br>(EEG)6-S75-<br>Colistin | EVQLVESGGGLVQAGGSLRLSCARSGRISNINIMAWYRQAP<br>GKTRDMVAAIIGDSTNYADSVKGRFTISRDNAKNTVYLHMN<br>RLKPEDTGVYYCKISGVDWGQGTQVTVSS<br>GGGGSGGGGSGGGGSLKEAKEKAIEELKKAGITSDYYFDLI<br>NKAKTVEGVNALKDEILKAGGGGSGGGGSGGGGSLKEAKEK<br>AIEELKKAGITSDYYFDLINKAKTVEGVNALKDEILKAHHH<br>HHHSPSTPPTPSPSTPPEEGEEGEEGEEGEEGEEGC-(DBCO-<br>Maleimide)-6-methyloctanoic acid-Dab(Azidoacetyl-<br>GPRAEALT-)-Thr-Dab-(Dab-Dab-(D-Leu)-Leu-Dab-Dab-Thr)<br>(SEQ ID NO: 203)<br>Chemically linked at Cys-Maleimide and DBCO-azide |
| VHH5-(ABD)2-<br>(EEG)6-S75-<br>Colistin | KVQLVESGGGLVQAGGSLRLSCAASGNIFINNAVGWYRQAP<br>GKQREMVAAMLSGGSTNYADSVKGRFTISRDNAKNTVYLQM<br>NSLKPEDTAVYYCNVQVNGTWARWGQGTQVTVSS<br>GGGGSGGGGSGGGGSLKEAKEKAIEELKKAGITSDYYFDLI<br>NKAKTVEGVNALKDEILKAGGGGSGGGGSGGGGSLKEAKEK<br>AIEELKKAGITSDYYFDLINKAKTVEGVNALKDEILKAHHH<br>HHHSPSTPPTPSPSTPPEEGEEGEEGEEGEEGEEGC-(DBCO-<br>Maleimide)-6-methyloctanoic acid-Dab(Azidoacetyl-<br>GPRAEALT-)-Thr-Dab-(Dab-Dab-(D-Leu)-Leu-Dab-Dab-Thr)<br>(SEQ ID NO: 204)<br>Chemically linked at Cys-Maleimide and DBCO-azide |

In one embodiment, the fusion protein comprises the structure of (ABD)2-(EEG)6-S12-(D)Pex (SEQ ID NO:157), (ABD)2-(EEG)6-S12-(D)Pex-Cy7 (SEQ ID NO:158), (ABD)2-(EEG)6-S12-S12-POL7080 (SEQ ID NO:159), or (ABD)2-(EEG)6-S12-S12-Colistin (SEQ ID NO:161).

In another embodiment, the disclosure provides compositions, comprising a plurality of fusion proteins according to any embodiment or embodiments herein. Such compositions may comprise fusion proteins having the same therapeutic peptide or different therapeutic peptides, or the same fusion protein or different fusion proteins (with the same or different therapeutic peptides). In various embodiments, the plurality of fusion proteins comprise 2, 3, 4, 5, 6, 7, 8, 9, 10, or more different therapeutic peptides in total. This embodiment is useful for therapeutic peptide combination that is synergistic in activity.

In another embodiment, the compositions further comprises a pharmaceutically acceptable carrier. Such pharmaceutical compositions of the disclosure can be used, for example, in the methods of the disclosure described herein. The pharmaceutical compositions may further comprise (a) a lyoprotectant; (b) a surfactant; (c) a bulking agent; (d) a tonicity adjusting agent; (e) a stabilizer; (f) a preservative and/or (g) a buffer. In some embodiments, the buffer in the pharmaceutical composition is a Tris buffer, a histidine buffer, a phosphate buffer, a citrate buffer or an acetate buffer. The pharmaceutical composition may also include a lyoprotectant, e.g. sucrose, sorbitol or trehalose. In certain embodiments, the pharmaceutical composition includes a preservative e.g. benzalkonium chloride, benzethonium, chlorohexidine, phenol, m-cresol, benzyl alcohol, methylparaben, propylparaben, chlorobutanol, o-cresol, p-cresol, chlorocresol, phenylmercuric nitrate, thimerosal, benzoic acid, and various mixtures thereof. In other embodiments, the pharmaceutical composition includes a bulking agent, like glycine. In yet other embodiments, the pharmaceutical composition includes a surfactant e.g., polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste, or a combination thereof. The pharmaceutical composition may also include a tonicity adjusting agent, e.g., a compound that renders the formulation substantially isotonic or isoosmotic with human blood. Exemplary tonicity adjusting agents include sucrose, sorbitol, glycine, methionine, mannitol, dextrose, inositol, sodium chloride, arginine and arginine hydrochloride. In other embodiments, the pharmaceutical composition additionally includes a stabilizer, e.g., a molecule which, when combined with a protein of interest substantially prevents or reduces chemical and/or physical instability of the protein of interest in lyophilized or liquid form. Exemplary stabilizers include sucrose, sorbitol, glycine, inositol, sodium chloride, methionine, arginine, and arginine hydrochloride.

The fusion protein(s) may be the sole active agent in the pharmaceutical compositions, or the compositions may further comprise one or more other active agents suitable for an intended use.

In another embodiment, the disclosure provides methods for treating a microbial infection in a subject, comprising administering to the subject an amount effective to treat the microbial infection of the fusion protein, composition, nucleic acid, expression vector, or host cell of any embodiment or combination of embodiments herein, particularly when the therapeutic peptide comprises an anti-microbial peptide.

As used herein, "treat" or "treating" means accomplishing one or more of the following: (a) reducing the severity of the disorder; (b) limiting or preventing development of symptoms characteristic of the disorder(s) being treated; (c) inhibiting worsening of symptoms characteristic of the disorder(s) being treated; (d) limiting or preventing recurrence of the disorder(s) in patients that have previously had the disorder(s); and (e) limiting or preventing recurrence of symptoms in patients that were previously symptomatic for the disorder(s).

The subject may be any subject that has a relevant disorder. In one embodiment, the subject is a mammal, including but not limited to humans, dogs, cats, horses, cattle, etc.

The methods may be used to treat any microbial infection that an AMP in the fusion protein has activity against, and at the site of which the linker will be susceptible to cleavage. In one embodiment, the microbial infection comprises a bacterial infection. In one such embodiment, the linker is susceptible to cleavage by a protease produced by the bacterial that is the cause/a cause of the infection or a protease produced by host cells in response to infection. In various non-limiting embodiments, the bacterial infection comprises one or more of pneumonia, a soft tissue infection, and endocarditis.

In another embodiment, the disclosure provides method for treating a cancer in a subject, comprising administering to the subject an amount effective to treat cancer of the fusion protein, composition, nucleic acid, expression vector, or host cell of any embodiment or combination of embodiments herein, particularly when the therapeutic peptide comprises an anti-cancer therapeutic. In one such embodiment, the methods may be used to treat cancer that a therapeutic peptide in the fusion protein has activity against, and at the site of which the linker will be susceptible to cleavage. In one such embodiment, the linker is susceptible to cleavage by a protease produced by cancer and stromal cells in tumor microenvironment.

Examples

A. General Purposes

We report design and development of activatable therapeutic peptide using antimicrobial peptide (AMP) as a model therapeutic peptide. As a specific example, we demonstrate development of a pro-AMP therapeutic based on albumin-binding domain (ABD)-AMP conjugate which is long-circulating with a masked biological activity that can be activated upon cleavage of the cleavable linker (FIG. 1). Comparing to a free AMP administration, the optimized ABD-AMP conjugate enhances delivery of active AMP to target diseased (infected) organ while lowering exposure of active AMP in other off-target organs (liver, kidneys, and spleen). Additionally, a targeting domain could be added to enhance on-target activation of the conjugate. This shift in biodistribution of active AMP with the conjugate formulation leads to improved safety profile of AMP supporting its systemic application.

B. Technical Description

Figure 2:
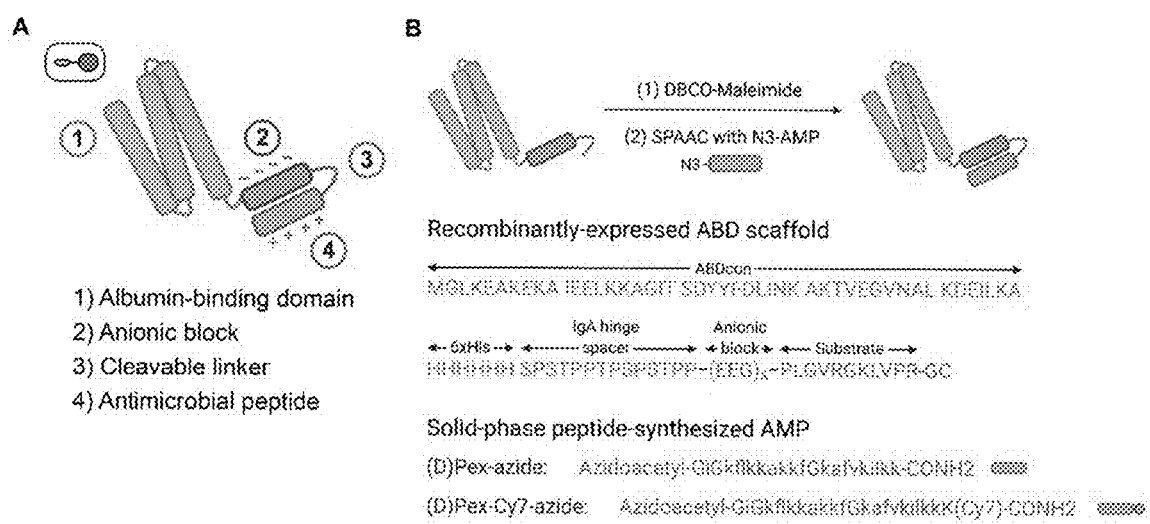
FIG. 2. Design and synthesis of activatable AMP. (A) Components of the therapeutic (1) half-life extension domain (e.g. albumin-binding domain), (2) anionic block, (3) cleavable linker, and (4) therapeutic payload (AMP). (B) Synthesis of ABD-AMP conjugate (from top to bottom SEQ ID NO: 171, 104, 133).

The novel activatable AMP therapeutics exemplified herein comprise 4 components in tandem; (1) half-life extension domain (including but not limited to albumin-binding domain (ABD) and Fc), (2) anionic block, (3) cleavable linker (e.g. protease substrate), and (4) therapeutic payload (e.g. AMPs ((D)Pexiganan, (D)CAMEL0, Tachyplesin I, POL7080, and colistin)) (FIG. 2A). ABD associates with serum albumin following systemic administration, increasing effective size of the conjugate beyond renal filtration threshold leading to improved circulation time. Anionic block neutralizes cationic charge of AMPs to reduce liver sequestration of AMPs. Both albumin association and charge neutralization also confer activity masking on the AMPs. Cleavable linker facilitates conditional release of the AMPs upon specific trigger such as dysregulated proteases at the site of infection. Additional components such as targeting domain and imaging probe may be included to further increase functionality of the therapeutics (e.g. enhanced conjugate activation). For a specific example, ABD-AMP conjugate was formulated by site-specific conjugation of a chemically synthesized AMP to a recombinantly expressed carrier domain (ABD-anionic block-cleavable linker) via a small molecule cross linker (DBCO-Maleimide) (FIG. 2B).

Figure 3:
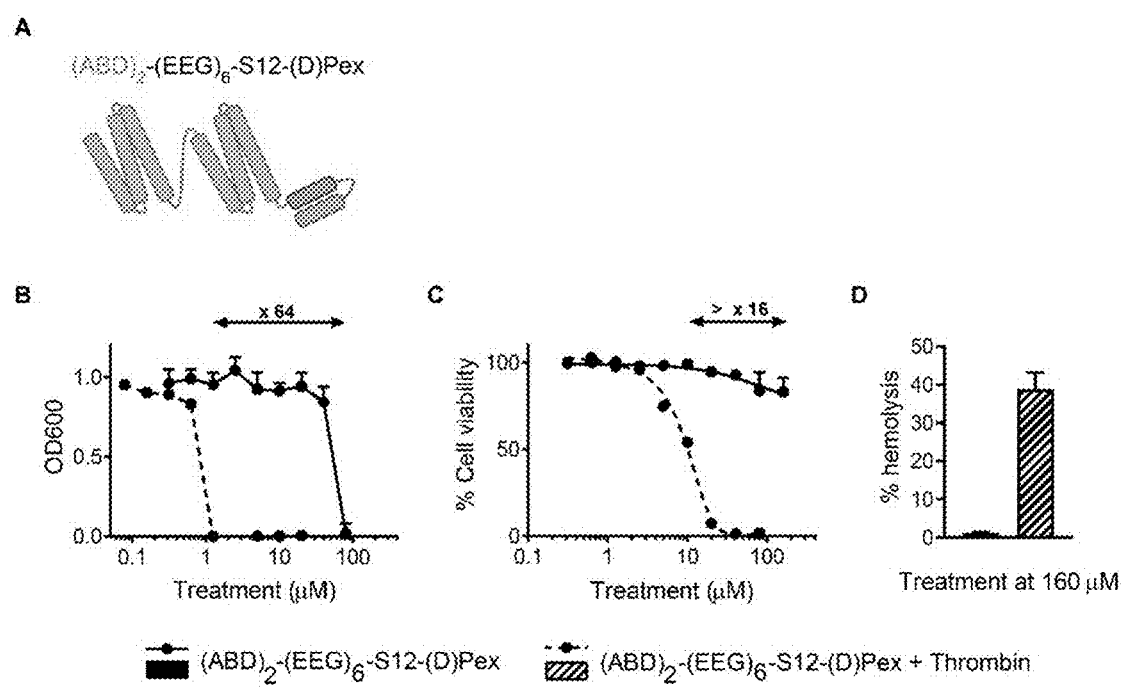
FIG. 3. In vitro evaluation of a model ABD-AMP conjugate. (A) Schematic of $(ABD)_2$-$(EEG)_6$-S12-(D)Pex. (B) Antibacterial assay on PAO1 treated with conjugate with and without thrombin pre-cleavage. OD600 indicates extent of bacteria viability. (C) MTS-based mammalian toxicity evaluation of L929 fibroblasts. (D) Hemolysis assay on mouse red blood cells.

To verify activity masking of our therapeutics, we evaluated antibacterial activity of our model ABD-AMP conjugate candidate $((ABD)_2-(EEG)_6-S12-(D)Pex)$ (FIG. 3A) with and without thrombin pre-activation on *Pseudomonas aeruginosa* PAO1. The intact conjugate exhibits 64 fold higher minimum inhibitory concentration (MIC) (defined as the lowest treatment concentration that fully inhibits bacteria growth), indicating efficient activity masking (FIG. 3B). Similarly, we verified that our intact conjugate could effectively mask mammalian toxicity on L929 fibroblasts (FIG. 3C) and hemolysis (FIG. 3D). Overall, formulating AMP as an ABD-AMP conjugate provides an activity mask that can be activated with cleavage of the cleavable linker.

Figure 4:
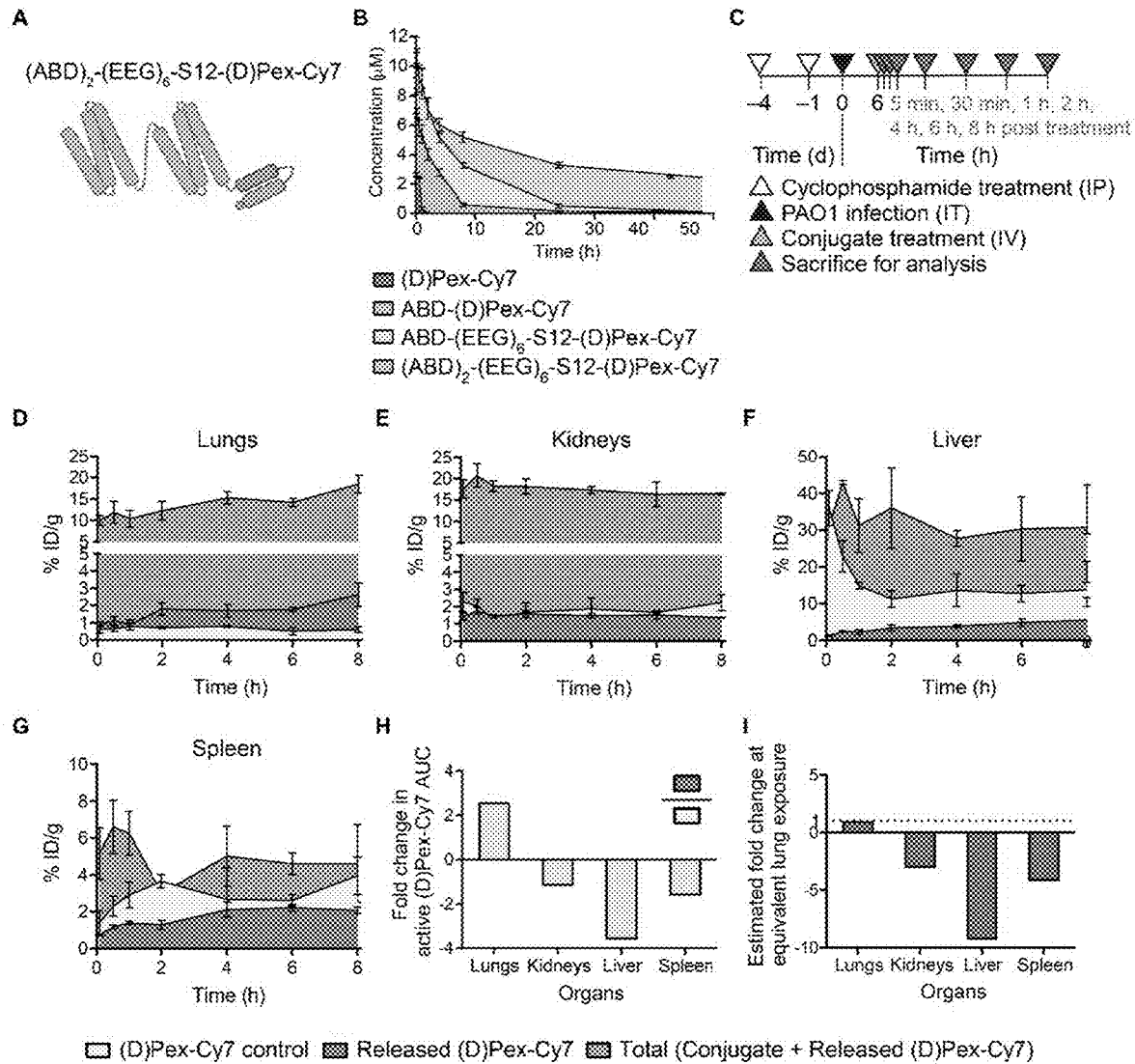
FIG. 4. In vivo pharmacokinetic and biodistribution evaluations of a model ABD-AMP conjugate. (A) Schematic of $(ABD)_2$-$(EEG)_6$-S12-(D)Pex-Cy7. (B) Pharmacokinetics of ABD-AMP-Cy7 conjugate and a free AMP-Cy7 control. (C) Experimental timeline for time-lapse biodistribution and conjugate activation evaluation in a PAO1 lung infection model. Quantification of intact and active AMP contents in (D) lungs, (E) kidneys, (F) liver, and (G) spleen at different time points. (H) Fold change in AUC of active (D)Pex-Cy7 of the conjugate group versus free AMP control group. (I) Estimated fold change at equivalent lung exposure of active AMP content.

Next, we comprehensively characterized our model ABD-AMP conjugate $((ABD)_2-(EEG)_6-S12-(D)Pex-Cy7)$ (FIG. 4A) in vivo in regard to pharmacokinetics and time-lapse biodistribution and activation in different organs. $(ABD)_2$-$(EEG)_6$-S12-(D)Pex-Cy7 exhibited significantly prolonged circulation time (91-fold increase in area-under-the-concentration-time curve (AUC)) compared to the free (D)Pex-Cy7 control (FIG. 4B). To study time-lapse biodistribution and conjugate activation in an infection context, we first infected mice with PAO1 via intratracheal instillation (IT) (FIG. 4C). The conjugate or free AMP control were intravenously (IV) administered 6 h post infection. The mice were euthanized at different time points, and organs were harvested and homogenized for quantification of conjugate and released AMP contents via SDS-PAGE analysis. We observed a time-dependent increase in active (D)Pex-Cy7 of the conjugate in the infected lungs whereas the free (D)Pex-Cy7 control group showed a steadily lower level of AMP which further declined at later time points (FIG. 4D). There is no significant difference in active AMP levels in the kidneys (FIG. 4E). In the liver and spleen, the levels of active AMP of conjugate are lower than those of the free AMP treatment groups, indicating less exposure of active AMP for the conjugate formulation in these organs (FIGS. 4F and G). When quantifying AUC fold difference in exposure of active AMP in different organs, our conjugate delivered 2.6 fold higher active AMP to the lungs compared to free AMP control while simultaneously reducing exposure to kidneys, liver, and spleen by 1.2, 3.6, and 1.6 fold, respectively (FIG. 4H). Alternatively, when estimating at the equivalent lung exposure of active AMP, our conjugate reduced exposure of active AMP to kidneys, liver, and spleen by 3.1, 9.3, and 4.2 fold, respectively (FIG. 4I). Hence, we demonstrated that formulating AMP as an ABD-AMP conjugate increases in vivo circulation time and improves on-target activation of active AMP while minimizing its exposure in other off-target organs.

Figure 5:
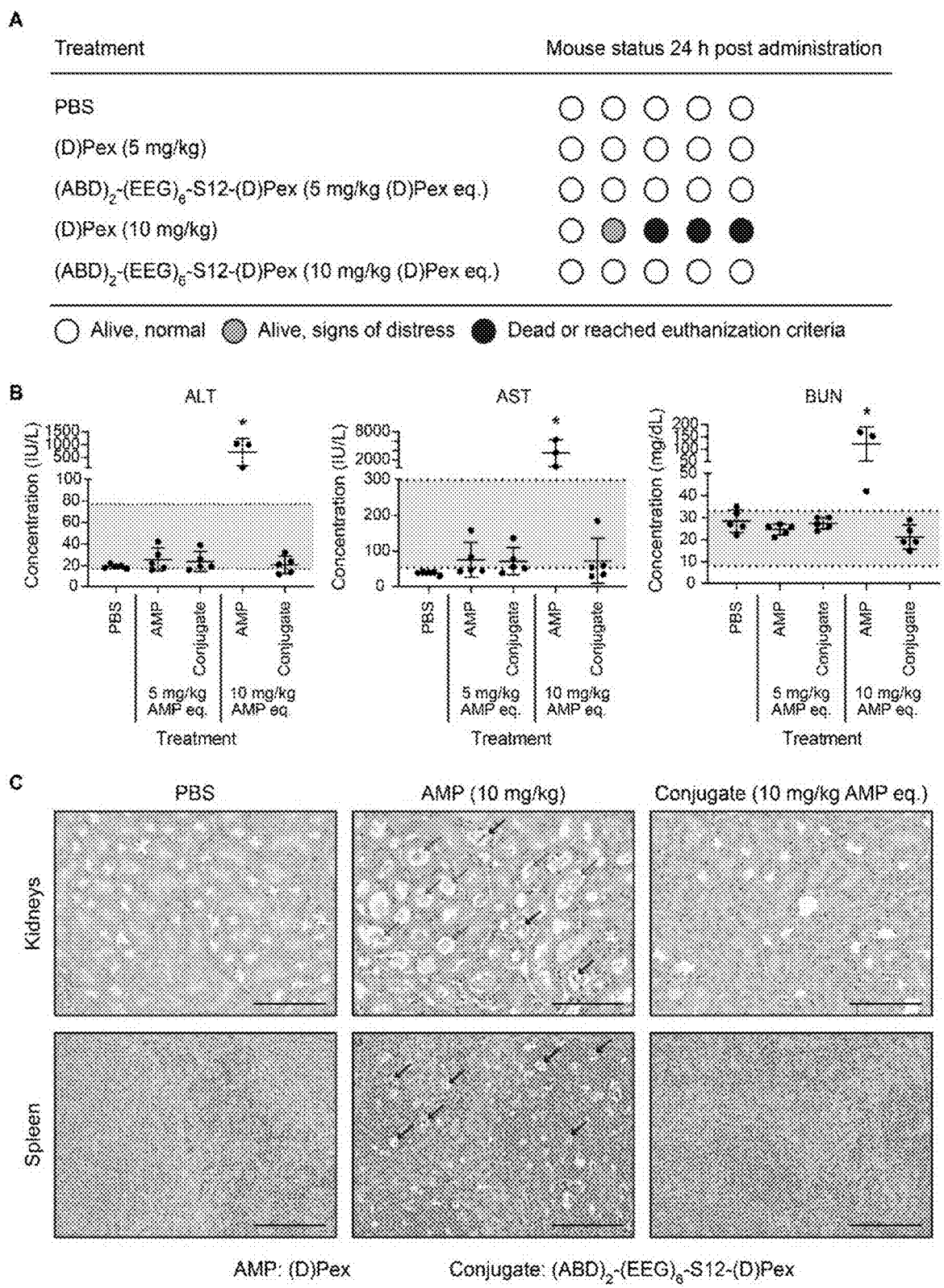
FIG. 5. In vivo toxicity evaluation of a model ABD-AMP conjugate. (A) Treatment groups and their body conditions. (B) Serum chemistry analysis of ALT, AST, and BUN. (C) H&E staining of spleen and kidneys sections. Arrows indicate protein casts or apoptotic bodies.

Given a favorable biodistribution profile of ABD-AMP conjugate, we next evaluated if our conjugate could improve safety profile of AMP. We performed toxicity evaluation in mice following intravenous treatments with free AMP (D)Pex or conjugate (ABD)$_2$-(EEG)$_6$-S12-(D)Pex at 5 and 10 mg/kg AMP equivalent doses (FIG. 5A). Mice were observed for 24 h before euthanasia to collect serum and organs for analysis unless significant morbidity was observed that necessitated earlier euthanasia. Our conjugate was well tolerated up to the highest dose tested with no signs of distress (FIG. 5A). On the contrary, mice treated with 10 mg/kg (D)Pex showed evident signs of distress, and 3 out of 5 mice did not survive to the end point. In regard to serum chemistry analysis, mice treated with (D)Pex (10 mg/kg) had elevated serum levels of alanine aminotransferase (ALT), aspartate aminotransferase (AST) and blood nitrogen urea (BUN) exceeding the reference range, indicating liver and kidney malfunctions in those mice (FIG. 5B). In contrast, mice treated with the conjugate at the same equivalent AMP dose had ALT, AST, and BUN levels within the normal reference range. When evaluating H&E staining of organ sections, significant damage was observed in kidneys and spleen of mice treated with (D)Pex at 10 mg/kg (FIG. 5C). In the kidneys of the (D)Pex-treated mice, protein casts and apoptotic epithelial cells were observed in the renal tubule spaces which were also dilated. In the spleens of the (D)Pex-treated mice, patches of apoptotic lymphocytes were observed. These pathological features were not observed in mice treated with the conjugate at the equivalent AMP dose. Altogether, our conjugate formulation effectively improves safety profile of AMP following systemic administration.

Figure 6:
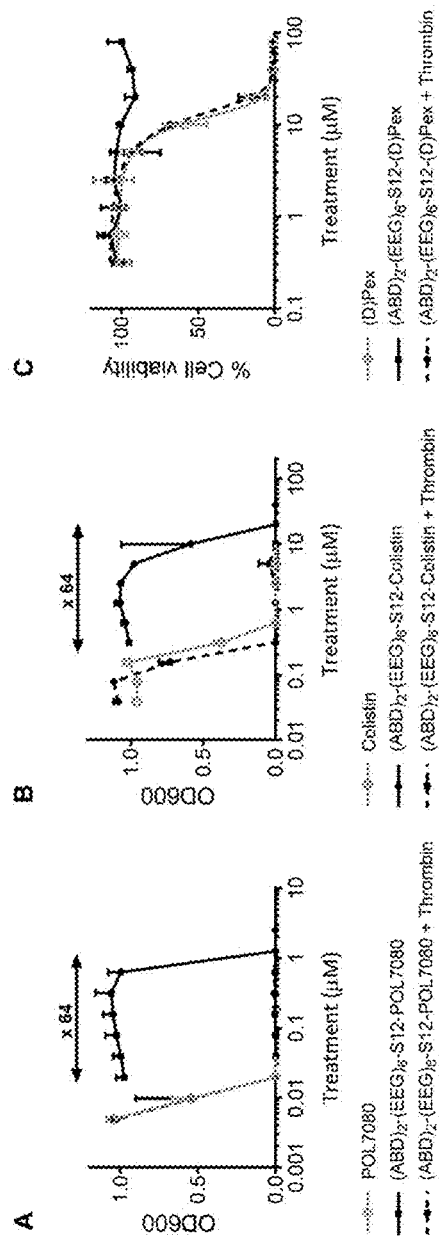
FIG. 6. Evaluation of activity masking for alternative AMPs and alternative application. Antibacterial assay on PAO1 treated with (A) $(ABD)_2$-$(EEG)_{6-512}$-POL7080 and (B) $(ABD)_2$-$(EEG)_6$-S12-Colistin with and without thrombin pre-cleavage. OD600 indicates extent of bacteria viability. (C) Evaluation of anticancer activity masking of $(ABD)_2$-$(EEG)_6$-S12-(D)Pex on HepG2 cell line by an MTS assay.

To ensure broad application across different therapeutic peptides, we formulated additional AMPS (POL7080 and colistin) into ABD-AMP conjugates and evaluated the extent of activity masking. A 64-fold activity masking was similarly observed for both peptides in term of antibacterial activity on PAO1 (FIGS. 6A and B) confirming robust activity masking of AMPS across diverse secondary structures. Given that several AMPS are widely explored for anticancer property capitalizing on higher negative charge of cancer cell membrane, we determined whether ABD-AMP conjugate formulation could be utilized in the cancer context. Cell toxicity assay of (ABD)$_2$-(EEG)$_6$-S12-(D)Pex was performed on human hepatocellular carcinoma cell line HepG2 (FIG. 6C). As similarly observed in the antibacterial activity assay, the intact conjugate was natively inactive and the cell toxicity was only restored upon activation by target protease (Thrombin). Altogether, ABD-AMP conjugate platform represents a generalizable platform for formulating diverse activatable therapeutic peptides for different disease applications with aberrant protease microenvironment such as microbial infection and cancer.

Figure 7:
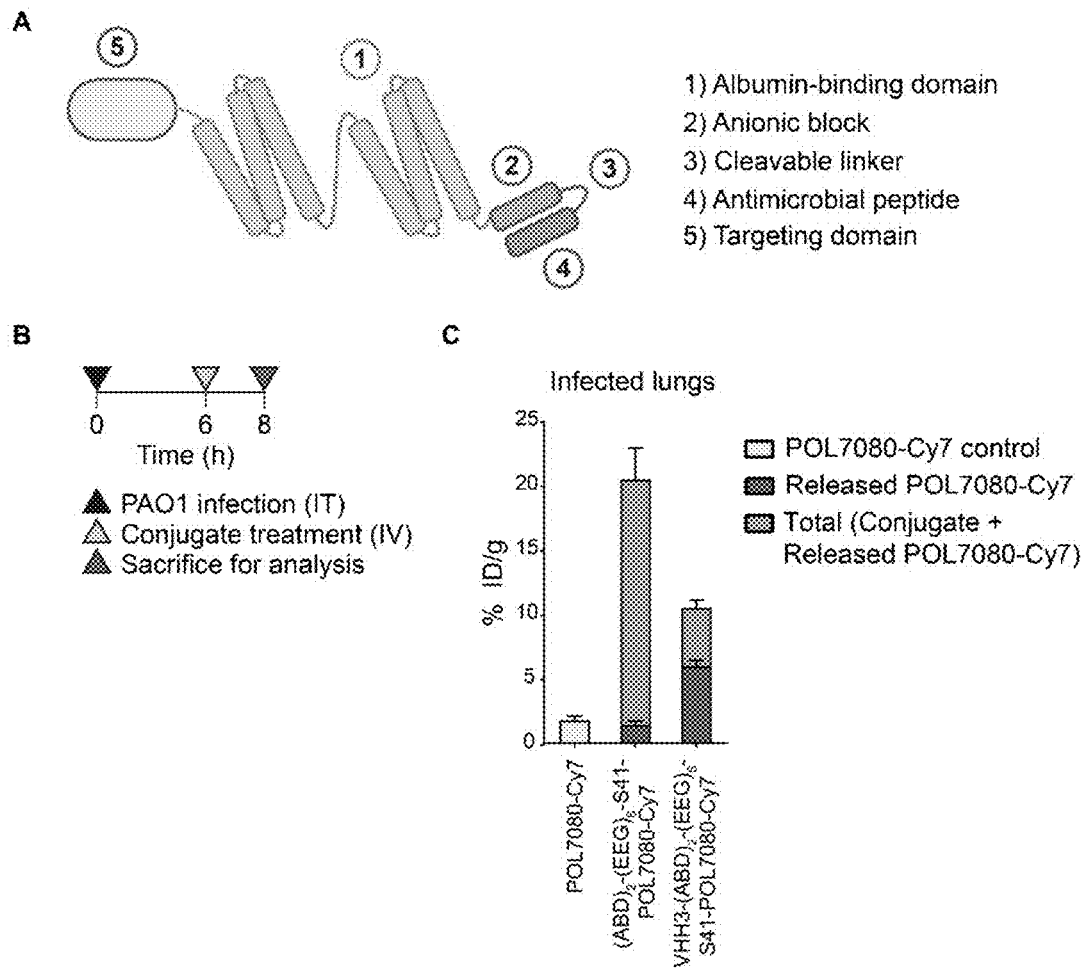
FIG. 7. Biodistribution of a targeted ABD-AMP conjugate. (A) Components of the targeted therapeutic (1) half-life extension domain (e.g. albumin-binding domain), (2) anionic block, (3) cleavable linker, (4) therapeutic payload (AMP), and (5) targeting domain. (B) Experimental timeline biodistribution and conjugate activation evaluation in a PAO1 lung infection model. (C) Quantification of intact and active AMP contents in the infected lungs for the targeted conjugate VHH3-$(ABD)_2$-$(EEG)_6$-POL7080-Cy7, the non-targeted control, and the free POL7080-Cy7 control.

Finally, we provided an example of a targeted ABD-AMP conjugate where a targeting domain is fused to the N-terminus of the construct to promote engagement in the infected microenvironment (FIG. 7A). Specifically, we formulated an LptD inhibitor POL7080 (a model AMP) as VHH3-(ABD)$_2$-(EEG)$_6$-S41-POL7080-Cy7 where VHH3 encodes a nanobody that targets ADAM10 protease abundantly expressed at the infection site. A biodistribution study of the targeted conjugate was performed in a non-neutropenic PAO1 lung infection model to evaluate the amount of intact and released AMPs at the infection site (FIG. 7B). Remarkably, the targeted conjugate increased the amount of released POL7080-Cy7 in the infected lungs by 3.3 fold compared to the free POL7080-Cy7 control group while the non-targeted conjugate had a similar level of released POL7080-Cy7 as the control group. In summary, incorporation of a targeting domain could provide a further improvement in functionalities of the conjugate as illustrated by the enhanced conjugate activation for the ADAM10-targeted conjugate. Generally, alternative targets (e.g. immune cell targets (Ly6G, Ly6C, CD177, CD11b, CD11c, CD8) or other proteases (Neutrophil elastase, matrix metalloprotienases, ADAMs, fibroblast activation protein)) could be suitably employed in different disease contexts.

C. Conclusions

We designed and developed a platform for formulating activatable therapeutic peptides. Our model construct (ABD-AMP conjugate) exhibits robust activity masking that can be liberated upon cleavage of the cleavable linker. Following systemic administration, the conjugate selectively delivers active AMP to target infected organ while minimizing exposure in other off-target organs leading to improved safety profile of the conjugate. The formulation will increase utility of AMPs for systemic application by increasing circulation time, improving target organ bioavailability and preventing off-target organ toxicity.

D. Advantages and Improvements Over Existing Methods, Devices, or Materials

Long circulation. AMPS are typically small in size (<5 kDa) and cationic. Hence, they are rapidly cleared off the body either via kidney filtration and/or liver sequestration. Our formulation provides a charge stealth on AMP which reduces liver sequestration while simultaneously increasing its effective size via albumin association to reduce renal filtration. No existing formulation has capitalized on both cationic charge neutralization and steric albumin association in a single conjugate to formulate a pro-AMP therapeutic.

On-target delivery to diseased (infection) organ. Conditional release of AMP upon cleavage of cleavable linker provides an opportunity to tune release profile via optimization of the linker.

Reduction in off-target organ exposure. Our therapeutic conjugate is inherently inactive until activated. Optimization of cleavable linker ensures minimal activation in other off-target organs which leads to improved safety profile of systemically administered AMP.

REFERENCE

1. Global burden of bacterial antimicrobial resistance in 2019: a systematic analysis. *Lancet* (London, England) (2022), doi:10.1016/S0140-6736(21)02724-0.
2. N. Mookherjee, M. A. Anderson, H. P. Haagsman, D. J. Davidson, Antimicrobial host defence peptides: functions and clinical potential. *Nat. Rev. Drug Discov.* 19, 311-332 (2020).
3. C. D. Fjell, J. A. Hiss, R. E. W. Hancock, G. Schneider, Designing antimicrobial peptides: form follows function. *Nat. Rev. Drug Discov.* 11, 37-51 (2011).
4. M. Lei, A. Jayaraman, J. A. Van Deventer, K. Lee, Engineering Selectively Targeting Antimicrobial Peptides. *Annu. Rev. Biomed. Eng.* 23, 339-357 (2021).
5. B. H. Gan, J. Gaynord, S. M. Rowe, T. Deingruber, D. R. Spring, The multifaceted nature of antimicrobial peptides: current synthetic chemistry approaches and future directions. *Chem. Soc. Rev.* 50, 7820-7880 (2021).

We claim:
1. A fusion protein, comprising:
   (a) at least one X1 domain comprising a to a half-life extension polypeptide, wherein each X1 domain comprises the amino acid sequence (MG) LKEAKEKA IEELKKAGIT SDYYFDLINK AKTVEGVNAL KDEILKA (SEQ ID NO: 4), wherein the residues in parentheses are optional and may be present or absent, or wherein each X1 domain independently comprises the amino acid sequence LKEAKEKA IEELKKAGIT SDYYFDLINK AKTVEGVNAL KDEILKA (SEQ ID NO: 5);
   (b) at least one X2 domain comprising an anionic block, wherein each X2 domain comprises the amino acid sequence (EEG) x, wherein "x" is 1-20, 2-16, 3-12, 4-10, 5-8, 1-15, 1-10, 2-10, 3-10, 4-10, 5-10, 2-8, 3-8, 4-8, 5-8, 5-7, 1, 2, 3, 4, 5, 6, 7, 8, 9, or 10;
   (c) at least one X3 domain comprising a linker susceptible to cleavage at a site of disease, wherein each X3 domain comprises the amino acid sequence PLGLRSW (SEQ ID NO: 16); and
   (d) at least one X4 domain comprising a therapeutic peptide, wherein each X4 domain comprises the amino acid sequence GiGkflkkakkfGkafvkilkk (SEQ ID NO: 137); and/or GiGkflkkakkfGkafvkilkkK (SEQ ID NO: 138); and

```
SEQUENCE LISTING

Sequence total quantity: 204
SEQ ID NO: 1           moltype = AA  length = 46
FEATURE                Location/Qualifiers
REGION                 1..46
                       note = Synthetic
source                 1..46
                       mol_type = protein
                       organism = synthetic construct
SEQUENCE: 1
LAEAKVLANR ELDKYGVSDF YKRLINKAKT VEGVEALKLH ILAALP            46

SEQ ID NO: 2           moltype = AA  length = 46
FEATURE                Location/Qualifiers
REGION                 1..46
                       note = Synthetic
source                 1..46
                       mol_type = protein
                       organism = synthetic construct
SEQUENCE: 2
LAEAKVLANR ELDKYGVSDY YKNLIDNAKS AEGVKALIDE ILAALP            46

SEQ ID NO: 3           moltype = AA  length = 137
FEATURE                Location/Qualifiers
REGION                 1..137
                       note = Synthetic
source                 1..137
                       mol_type = protein
                       organism = synthetic construct
SEQUENCE: 3
ATVKSTYRGE EKQVDISKIK WVIRWGQHLA FKYDEGGGAA GYGWVSEKDA PKELLQMLEK  60
QGGGGSGGGG SGGGGSATVK STYRGEEKQV DISKIKWVIR WGQHLAFKYD EGGGAAGYGW  120
VSEKDAPKEL LQMLEKQ                                                137

SEQ ID NO: 4           moltype = AA  length = 47
FEATURE                Location/Qualifiers
REGION                 1..47
                       note = Synthetic
source                 1..47
                       mol_type = protein
                       organism = synthetic construct
SEQUENCE: 4
MGLKEAKEKA IEELKKAGIT SDYYFDLINK AKTVEGVNAL KDEILKA            47

SEQ ID NO: 5           moltype = AA  length = 45
FEATURE                Location/Qualifiers
REGION                 1..45
                       note = Synthetic
source                 1..45
                       mol_type = protein
                       organism = synthetic construct
SEQUENCE: 5
LKEAKEKAIE ELKKAGITSD YYFDLINKAK TVEGVNALKD EILKA              45

SEQ ID NO: 6           moltype = AA  length = 7
FEATURE                Location/Qualifiers
REGION                 1..7
                       note = Synthetic
SITE                   4
                       note = MISC_FEATURE - X is 4-iodo-L-phenylalanine
```

```
source              1..7
                    mol_type = protein
                    organism = synthetic construct
SEQUENCE: 6
PLGXGAR                                                              7

SEQ ID NO: 7        moltype = AA  length = 8
FEATURE             Location/Qualifiers
REGION              1..8
                    note = Synthetic
source              1..8
                    mol_type = protein
                    organism = synthetic construct
SEQUENCE: 7
RSLSRLTA                                                             8

SEQ ID NO: 8        moltype = AA  length = 5
FEATURE             Location/Qualifiers
REGION              1..5
                    note = Synthetic
source              1..5
                    mol_type = protein
                    organism = synthetic construct
SEQUENCE: 8
GLGRG                                                                5

SEQ ID NO: 9        moltype = AA  length = 5
FEATURE             Location/Qualifiers
REGION              1..5
                    note = Synthetic
source              1..5
                    mol_type = protein
                    organism = synthetic construct
SEQUENCE: 9
GAGLG                                                                5

SEQ ID NO: 10       moltype =   length =
SEQUENCE: 10
000

SEQ ID NO: 11       moltype = AA  length = 5
FEATURE             Location/Qualifiers
REGION              1..5
                    note = Synthetic
source              1..5
                    mol_type = protein
                    organism = synthetic construct
SEQUENCE: 11
LVPRG                                                                5

SEQ ID NO: 12       moltype = AA  length = 7
FEATURE             Location/Qualifiers
REGION              1..7
                    note = Synthetic
source              1..7
                    mol_type = protein
                    organism = synthetic construct
SEQUENCE: 12
PLGVRGK                                                              7

SEQ ID NO: 13       moltype = AA  length = 6
FEATURE             Location/Qualifiers
REGION              1..6
                    note = Synthetic
SITE                2
                    note = MISC_FEATURE - X is 3-cyclohexyl-L-alanine
SITE                4
                    note = MISC_FEATURE - X is S-methyl-L-cysteine
source              1..6
                    mol_type = protein
                    organism = synthetic construct
SEQUENCE: 13
PXGXHA                                                               6

SEQ ID NO: 14       moltype = AA  length = 8
FEATURE             Location/Qualifiers
REGION              1..8
                    note = Synthetic
source              1..8
```

```
                        mol_type = protein
                        organism = synthetic construct
SEQUENCE: 14
PVPLSLVM                                                          8

SEQ ID NO: 15           moltype = AA   length = 7
FEATURE                 Location/Qualifiers
REGION                  1..7
                        note = Synthetic
source                  1..7
                        mol_type = protein
                        organism = synthetic construct
SEQUENCE: 15
PVGLIGG                                                           7

SEQ ID NO: 16           moltype = AA   length = 7
FEATURE                 Location/Qualifiers
REGION                  1..7
                        note = Synthetic
source                  1..7
                        mol_type = protein
                        organism = synthetic construct
SEQUENCE: 16
PLGLRSW                                                           7

SEQ ID NO: 17           moltype = AA   length = 7
FEATURE                 Location/Qualifiers
REGION                  1..7
                        note = Synthetic
source                  1..7
                        mol_type = protein
                        organism = synthetic construct
SEQUENCE: 17
PQGIWGQ                                                           7

SEQ ID NO: 18           moltype = AA   length = 8
FEATURE                 Location/Qualifiers
REGION                  1..8
                        note = Synthetic
source                  1..8
                        mol_type = protein
                        organism = synthetic construct
SEQUENCE: 18
KPISLISS                                                          8

SEQ ID NO: 19           moltype = AA   length = 6
FEATURE                 Location/Qualifiers
REGION                  1..6
                        note = Synthetic
source                  1..6
                        mol_type = protein
                        organism = synthetic construct
SEQUENCE: 19
ILSRIV                                                            6

SEQ ID NO: 20           moltype = AA   length = 8
FEATURE                 Location/Qualifiers
REGION                  1..8
                        note = Synthetic
source                  1..8
                        mol_type = protein
                        organism = synthetic construct
SEQUENCE: 20
KPILFFRL                                                          8

SEQ ID NO: 21           moltype = AA   length = 7
FEATURE                 Location/Qualifiers
REGION                  1..7
                        note = Synthetic
source                  1..7
                        mol_type = protein
                        organism = synthetic construct
SEQUENCE: 21
KAFRRSG                                                           7

SEQ ID NO: 22           moltype = AA   length = 8
FEATURE                 Location/Qualifiers
REGION                  1..8
                        note = Synthetic
```

| | | |
|---|---|---|
| source | 1..8<br>mol_type = protein<br>organism = synthetic construct | |
| SEQUENCE: 22<br>RQRRALEK | | 8 |
| SEQ ID NO: 23<br>FEATURE<br>REGION | moltype = AA   length = 6<br>Location/Qualifiers<br>1..6<br>note = Synthetic | |
| source | 1..6<br>mol_type = protein<br>organism = synthetic construct | |
| SEQUENCE: 23<br>FSRPFR | | 6 |
| SEQ ID NO: 24<br>FEATURE<br>REGION | moltype = AA   length = 8<br>Location/Qualifiers<br>1..8<br>note = Synthetic | |
| source | 1..8<br>mol_type = protein<br>organism = synthetic construct | |
| SEQUENCE: 24<br>TTFYRRGA | | 8 |
| SEQ ID NO: 25<br>FEATURE<br>REGION | moltype = AA   length = 7<br>Location/Qualifiers<br>1..7<br>note = Synthetic | |
| source | 1..7<br>mol_type = protein<br>organism = synthetic construct | |
| SEQUENCE: 25<br>ARLYSRG | | 7 |
| SEQ ID NO: 26<br>FEATURE<br>REGION | moltype = AA   length = 7<br>Location/Qualifiers<br>1..7<br>note = Synthetic | |
| source | 1..7<br>mol_type = protein<br>organism = synthetic construct | |
| SEQUENCE: 26<br>KLRSSKQ | | 7 |
| SEQ ID NO: 27<br>FEATURE<br>REGION | moltype = AA   length = 9<br>Location/Qualifiers<br>1..9<br>note = Synthetic | |
| source | 1..9<br>mol_type = protein<br>organism = synthetic construct | |
| SEQUENCE: 27<br>TSVLMAAPQ | | 9 |
| SEQ ID NO: 28<br>FEATURE<br>REGION | moltype = AA   length = 6<br>Location/Qualifiers<br>1..6<br>note = Synthetic | |
| source | 1..6<br>mol_type = protein<br>organism = synthetic construct | |
| SEQUENCE: 28<br>VGPSQG | | 6 |
| SEQ ID NO: 29<br>FEATURE<br>REGION | moltype = AA   length = 6<br>Location/Qualifiers<br>1..6<br>note = Synthetic | |
| source | 1..6<br>mol_type = protein<br>organism = synthetic construct | |
| SEQUENCE: 29<br>VRFRST | | 6 |
| SEQ ID NO: 30<br>FEATURE<br>REGION | moltype = AA   length = 6<br>Location/Qualifiers<br>1..6 | |

```
                    note = Synthetic
source              1..6
                    mol_type = protein
                    organism = synthetic construct
SEQUENCE: 30
IQQRSL                                                                          6

SEQ ID NO: 31       moltype = AA  length = 6
FEATURE             Location/Qualifiers
REGION              1..6
                    note = Synthetic
source              1..6
                    mol_type = protein
                    organism = synthetic construct
SEQUENCE: 31
RQSRIV                                                                          6

SEQ ID NO: 32       moltype = AA  length = 6
FEATURE             Location/Qualifiers
REGION              1..6
                    note = Synthetic
source              1..6
                    mol_type = protein
                    organism = synthetic construct
SEQUENCE: 32
SQPRIV                                                                          6

SEQ ID NO: 33       moltype = AA  length = 4
FEATURE             Location/Qualifiers
REGION              1..4
                    note = Synthetic
source              1..4
                    mol_type = protein
                    organism = synthetic construct
SEQUENCE: 33
FPRS                                                                            4

SEQ ID NO: 34       moltype = AA  length = 7
FEATURE             Location/Qualifiers
REGION              1..7
                    note = Synthetic
SITE                5
                    note = MISC_FEATURE - X is L-homophenylalaine
source              1..7
                    mol_type = protein
                    organism = synthetic construct
SEQUENCE: 34
LAQAXRS                                                                         7

SEQ ID NO: 35       moltype = AA  length = 7
FEATURE             Location/Qualifiers
REGION              1..7
                    note = Synthetic
source              1..7
                    mol_type = protein
                    organism = synthetic construct
SEQUENCE: 35
LAQAFRS                                                                         7

SEQ ID NO: 36       moltype = AA  length = 6
FEATURE             Location/Qualifiers
REGION              1..6
                    note = Synthetic
source              1..6
                    mol_type = protein
                    organism = synthetic construct
SEQUENCE: 36
TRFYSR                                                                          6

SEQ ID NO: 37       moltype = AA  length = 6
FEATURE             Location/Qualifiers
REGION              1..6
                    note = Synthetic
source              1..6
                    mol_type = protein
                    organism = synthetic construct
SEQUENCE: 37
YVADAP                                                                          6
```

```
SEQ ID NO: 38            moltype = AA   length = 9
FEATURE                  Location/Qualifiers
REGION                   1..9
                         note = Synthetic
source                   1..9
                         mol_type = protein
                         organism = synthetic construct
SEQUENCE: 38
PLAQAVRSS                                                               9

SEQ ID NO: 39            moltype = AA   length = 7
FEATURE                  Location/Qualifiers
REGION                   1..7
                         note = Synthetic
source                   1..7
                         mol_type = protein
                         organism = synthetic construct
SEQUENCE: 39
LAQAVRS                                                                 7

SEQ ID NO: 40            moltype = AA   length = 7
FEATURE                  Location/Qualifiers
REGION                   1..7
                         note = Synthetic
source                   1..7
                         mol_type = protein
                         organism = synthetic construct
SEQUENCE: 40
LAQAFTS                                                                 7

SEQ ID NO: 41            moltype = AA   length = 7
FEATURE                  Location/Qualifiers
REGION                   1..7
                         note = Synthetic
source                   1..7
                         mol_type = protein
                         organism = synthetic construct
SEQUENCE: 41
LAAAVVS                                                                 7

SEQ ID NO: 42            moltype = AA   length = 7
FEATURE                  Location/Qualifiers
REGION                   1..7
                         note = Synthetic
source                   1..7
                         mol_type = protein
                         organism = synthetic construct
SEQUENCE: 42
KIEAVKS                                                                 7

SEQ ID NO: 43            moltype = AA   length = 8
FEATURE                  Location/Qualifiers
REGION                   1..8
                         note = Synthetic
source                   1..8
                         mol_type = protein
                         organism = synthetic construct
SEQUENCE: 43
PRAEALKG                                                                8

SEQ ID NO: 44            moltype = AA   length = 9
FEATURE                  Location/Qualifiers
REGION                   1..9
                         note = Synthetic
source                   1..9
                         mol_type = protein
                         organism = synthetic construct
SEQUENCE: 44
PRYEAYKMG                                                               9

SEQ ID NO: 45            moltype = AA   length = 7
FEATURE                  Location/Qualifiers
REGION                   1..7
                         note = Synthetic
source                   1..7
                         mol_type = protein
                         organism = synthetic construct
SEQUENCE: 45
PRYEAYK                                                                 7
```

```
SEQ ID NO: 46           moltype = AA   length = 8
FEATURE                 Location/Qualifiers
REGION                  1..8
                        note = Synthetic
source                  1..8
                        mol_type = protein
                        organism = synthetic construct
SEQUENCE: 46
PRAAAVKS                                                                 8

SEQ ID NO: 47           moltype = AA   length = 8
FEATURE                 Location/Qualifiers
REGION                  1..8
                        note = Synthetic
source                  1..8
                        mol_type = protein
                        organism = synthetic construct
SEQUENCE: 47
PTTSALKG                                                                 8

SEQ ID NO: 48           moltype = AA   length = 7
FEATURE                 Location/Qualifiers
REGION                  1..7
                        note = Synthetic
source                  1..7
                        mol_type = protein
                        organism = synthetic construct
SEQUENCE: 48
SLPVQDS                                                                  7

SEQ ID NO: 49           moltype = AA   length = 7
FEATURE                 Location/Qualifiers
REGION                  1..7
                        note = Synthetic
source                  1..7
                        mol_type = protein
                        organism = synthetic construct
SEQUENCE: 49
GLTLPVE                                                                  7

SEQ ID NO: 50           moltype = AA   length = 7
FEATURE                 Location/Qualifiers
REGION                  1..7
                        note = Synthetic
source                  1..7
                        mol_type = protein
                        organism = synthetic construct
SEQUENCE: 50
YKIEAVK                                                                  7

SEQ ID NO: 51           moltype = AA   length = 7
FEATURE                 Location/Qualifiers
REGION                  1..7
                        note = Synthetic
source                  1..7
                        mol_type = protein
                        organism = synthetic construct
SEQUENCE: 51
VHHQKLV                                                                  7

SEQ ID NO: 52           moltype = AA   length = 7
FEATURE                 Location/Qualifiers
REGION                  1..7
                        note = Synthetic
source                  1..7
                        mol_type = protein
                        organism = synthetic construct
SEQUENCE: 52
TNMKHMA                                                                  7

SEQ ID NO: 53           moltype = AA   length = 7
FEATURE                 Location/Qualifiers
REGION                  1..7
                        note = Synthetic
source                  1..7
                        mol_type = protein
                        organism = synthetic construct
SEQUENCE: 53
```

```
KTNMKHM                                                                              7

SEQ ID NO: 54           moltype = AA  length = 7
FEATURE                 Location/Qualifiers
REGION                  1..7
                        note = Synthetic
source                  1..7
                        mol_type = protein
                        organism = synthetic construct
SEQUENCE: 54
VVSTQLI                                                                              7

SEQ ID NO: 55           moltype = AA  length = 7
FEATURE                 Location/Qualifiers
REGION                  1..7
                        note = Synthetic
source                  1..7
                        mol_type = protein
                        organism = synthetic construct
SEQUENCE: 55
QETNRSF                                                                              7

SEQ ID NO: 56           moltype = AA  length = 7
FEATURE                 Location/Qualifiers
REGION                  1..7
                        note = Synthetic
source                  1..7
                        mol_type = protein
                        organism = synthetic construct
SEQUENCE: 56
GPARQYY                                                                              7

SEQ ID NO: 57           moltype = AA  length = 7
FEATURE                 Location/Qualifiers
REGION                  1..7
                        note = Synthetic
source                  1..7
                        mol_type = protein
                        organism = synthetic construct
SEQUENCE: 57
YGSLPQK                                                                              7

SEQ ID NO: 58           moltype = AA  length = 7
FEATURE                 Location/Qualifiers
REGION                  1..7
                        note = Synthetic
source                  1..7
                        mol_type = protein
                        organism = synthetic construct
SEQUENCE: 58
PPVAASS                                                                              7

SEQ ID NO: 59           moltype = AA  length = 6
FEATURE                 Location/Qualifiers
REGION                  1..6
                        note = Synthetic
source                  1..6
                        mol_type = protein
                        organism = synthetic construct
SEQUENCE: 59
RSANAK                                                                               6

SEQ ID NO: 60           moltype = AA  length = 4
FEATURE                 Location/Qualifiers
REGION                  1..4
                        note = Synthetic
source                  1..4
                        mol_type = protein
                        organism = synthetic construct
SEQUENCE: 60
GFLG                                                                                 4

SEQ ID NO: 61           moltype = AA  length = 5
FEATURE                 Location/Qualifiers
REGION                  1..5
                        note = Synthetic
source                  1..5
                        mol_type = protein
                        organism = synthetic construct
```

```
SEQUENCE: 61
LPETG                                                                            5

SEQ ID NO: 62          moltype = AA  length = 6
FEATURE                Location/Qualifiers
REGION                 1..6
                       note = Synthetic
source                 1..6
                       mol_type = protein
                       organism = synthetic construct
SEQUENCE: 62
RWARKK                                                                           6

SEQ ID NO: 63          moltype = AA  length = 4
FEATURE                Location/Qualifiers
REGION                 1..4
                       note = Synthetic
source                 1..4
                       mol_type = protein
                       organism = synthetic construct
SEQUENCE: 63
AAPV                                                                             4

SEQ ID NO: 64          moltype = AA  length = 6
FEATURE                Location/Qualifiers
REGION                 1..6
                       note = Synthetic
source                 1..6
                       mol_type = protein
                       organism = synthetic construct
SEQUENCE: 64
PLGLAR                                                                           6

SEQ ID NO: 65          moltype = AA  length = 8
FEATURE                Location/Qualifiers
REGION                 1..8
                       note = Synthetic
source                 1..8
                       mol_type = protein
                       organism = synthetic construct
SEQUENCE: 65
LSGRSDNH                                                                         8

SEQ ID NO: 66          moltype = AA  length = 8
FEATURE                Location/Qualifiers
REGION                 1..8
                       note = Synthetic
source                 1..8
                       mol_type = protein
                       organism = synthetic construct
SEQUENCE: 66
SGRSANAK                                                                         8

SEQ ID NO: 67          moltype = AA  length = 8
FEATURE                Location/Qualifiers
REGION                 1..8
                       note = Synthetic
source                 1..8
                       mol_type = protein
                       organism = synthetic construct
SEQUENCE: 67
VPLSLYSG                                                                         8

SEQ ID NO: 68          moltype = AA  length = 8
FEATURE                Location/Qualifiers
REGION                 1..8
                       note = Synthetic
source                 1..8
                       mol_type = protein
                       organism = synthetic construct
SEQUENCE: 68
HPVGLLAR                                                                         8

SEQ ID NO: 69          moltype = AA  length = 10
FEATURE                Location/Qualifiers
REGION                 1..10
                       note = Synthetic
source                 1..10
                       mol_type = protein
```

```
                                        organism = synthetic construct
SEQUENCE: 69
VHMPLGFLGP                                                                      10

SEQ ID NO: 71           moltype = AA   length = 5
FEATURE                 Location/Qualifiers
REGION                  1..5
                        note = Synthetic
source                  1..5
                        mol_type = protein
                        organism = synthetic construct
SEQUENCE: 70
PMAKK                                                                           5

SEQ ID NO: 71           moltype = AA   length = 4
FEATURE                 Location/Qualifiers
REGION                  1..4
                        note = Synthetic
source                  1..4
                        mol_type = protein
                        organism = synthetic construct
SEQUENCE: 71
GGGS                                                                            4

SEQ ID NO: 72           moltype = AA   length = 5
FEATURE                 Location/Qualifiers
REGION                  1..5
                        note = Synthetic
source                  1..5
                        mol_type = protein
                        organism = synthetic construct
SEQUENCE: 72
GGGGS                                                                           5

SEQ ID NO: 73           moltype = AA   length = 14
FEATURE                 Location/Qualifiers
REGION                  1..14
                        note = Synthetic
source                  1..14
                        mol_type = protein
                        organism = synthetic construct
SEQUENCE: 73
SPSTPPTPSP STPP                                                                 14

SEQ ID NO: 74           moltype = AA   length = 22
FEATURE                 Location/Qualifiers
REGION                  1..22
                        note = Synthetic
SITE                    2
                        note = MISC_FEATURE - D amino acid
REGION                  4..11
                        note = MISC_FEATURE - D amino acid
REGION                  13..22
                        note = MISC_FEATURE - D amino acid
source                  1..22
                        mol_type = protein
                        organism = synthetic construct
SEQUENCE: 74
GIGKFLKKAK KFGKAFVKIL KK                                                        22

SEQ ID NO: 75           moltype = AA   length = 15
FEATURE                 Location/Qualifiers
REGION                  1..15
                        note = Synthetic
REGION                  1..8
                        note = MISC_FEATURE - D amino acid
REGION                  10..15
                        note = MISC_FEATURE - D amino acid
source                  1..15
                        mol_type = protein
                        organism = synthetic construct
SEQUENCE: 75
KWKLFKKIGA VLKVL                                                                15

SEQ ID NO: 76           moltype = AA   length = 17
FEATURE                 Location/Qualifiers
REGION                  1..17
                        note = Synthetic
source                  1..17
```

```
                              mol_type = protein
                              organism = synthetic construct
SEQUENCE: 76
KWCFRVCYRG ICYRRCR                                                        17

SEQ ID NO: 77                 moltype = AA   length = 14
FEATURE                       Location/Qualifiers
REGION                        1..14
                              note = Synthetic
REGION                        1..14
                              note = MISC_FEATURE - D amino acid
source                        1..14
                              mol_type = protein
                              organism = synthetic construct
SEQUENCE: 77
KLAKLAKKLA KLAK                                                           14

SEQ ID NO: 78                 moltype = AA   length = 9
FEATURE                       Location/Qualifiers
REGION                        1..9
                              note = Synthetic
REGION                        1..9
                              note = MISC_FEATURE - D amino acid
source                        1..9
                              mol_type = protein
                              organism = synthetic construct
SEQUENCE: 78
RRRRRRRRR                                                                  9

SEQ ID NO: 79                 moltype = AA   length = 9
FEATURE                       Location/Qualifiers
REGION                        1..9
                              note = Synthetic
REGION                        1..9
                              note = MISC_FEATURE - D amino acid
REGION                        1..9
                              note = MISC_FEATURE - Amide-cyclized between N-terminal
                               amine and C-terminal carboxylic acid
source                        1..9
                              mol_type = protein
                              organism = synthetic construct
SEQUENCE: 79
RRRRRRRRR                                                                  9

SEQ ID NO: 80                 moltype = AA   length = 11
FEATURE                       Location/Qualifiers
REGION                        1..11
                              note = Synthetic
source                        1..11
                              mol_type = protein
                              organism = synthetic construct
SEQUENCE: 80
YGRKKRRQRR R                                                              11

SEQ ID NO: 81                 moltype = AA   length = 11
FEATURE                       Location/Qualifiers
REGION                        1..11
                              note = Synthetic
SITE                          1
                              note = MISC_FEATURE - D amino acid
REGION                        3..11
                              note = MISC_FEATURE - D amino acid
source                        1..11
                              mol_type = protein
                              organism = synthetic construct
SEQUENCE: 81
YGRKKRRQRR R                                                              11

SEQ ID NO: 82                 moltype = AA   length = 11
FEATURE                       Location/Qualifiers
REGION                        1..11
                              note = Synthetic
SITE                          1
                              note = MISC_FEATURE - D amino acid
REGION                        1..11
                              note = MISC_FEATURE - Amide-cyclized between N-terminal
                               amine and C-terminal carboxylic acid
REGION                        3..11
                              note = MISC_FEATURE - D amino acid
```

```
                                    -continued
source                  1..11
                        mol_type = protein
                        organism = synthetic construct
SEQUENCE: 82
YGRKKRRQRR R                                                         11

SEQ ID NO: 83           moltype = AA  length = 27
FEATURE                 Location/Qualifiers
REGION                  1..27
                        note = Synthetic
REGION                  2..7
                        note = MISC_FEATURE - D amino acid
REGION                  9..11
                        note = MISC_FEATURE - D amino acid
REGION                  13..27
                        note = MISC_FEATURE - D amino acid
source                  1..27
                        mol_type = protein
                        organism = synthetic construct
SEQUENCE: 83
GWTLNSAGYL LGKINLKALA ALAKKIL                                        27

SEQ ID NO: 84           moltype = AA  length = 11
FEATURE                 Location/Qualifiers
REGION                  1..11
                        note = Synthetic
SITE                    1
                        note = MISC_FEATURE - X is 6-methyloctanoic acid or
                         6-methylheptanoic acid
REGION                  1..5
                        note = MISC_FEATURE - Amide-cyclized between C-terminal
                         carboxylic acid and amine-side chain of Dab
SITE                    2
                        note = MISC_FEATURE - X is L-diaminobutyric acid
REGION                  4..6
                        note = MISC_FEATURE - X is L-diaminobutyric acid
SITE                    7
                        note = MISC_FEATURE - D amino acid
REGION                  9..10
                        note = MISC_FEATURE - X is L-diaminobutyric acid
source                  1..11
                        mol_type = protein
                        organism = synthetic construct
SEQUENCE: 84
XXTXXXLLXX T                                                         11

SEQ ID NO: 85           moltype = AA  length = 11
FEATURE                 Location/Qualifiers
REGION                  1..11
                        note = Synthetic
SITE                    1
                        note = MISC_FEATURE - X is 6-methyloctanoic acid or
                         6-methylheptanoic acid
REGION                  1..5
                        note = MISC_FEATURE - Amide-cyclized between C-terminal
                         carboxylic acid and amine-side chain of Dab
SITE                    2
                        note = MISC_FEATURE - X is L-diaminobutyric acid
REGION                  4..6
                        note = MISC_FEATURE - X is L-diaminobutyric acid
SITE                    7
                        note = MISC_FEATURE - D amino acid
REGION                  9..10
                        note = MISC_FEATURE - X is L-diaminobutyric acid
source                  1..11
                        mol_type = protein
                        organism = synthetic construct
SEQUENCE: 85
XXTXXXFLXX T                                                         11

SEQ ID NO: 86           moltype = AA  length = 11
FEATURE                 Location/Qualifiers
REGION                  1..11
                        note = Synthetic
SITE                    1
                        note = MISC_FEATURE - X is 6-methyloctanoic acid
REGION                  1..5
                        note = MISC_FEATURE - Amide-cyclized between C-terminal
                         carboxylic acid and amine-side chain of Dab
```

| | | |
|---|---|---|
| SITE | 2 | |
| | note = MISC_FEATURE - X is L-diaminobutyric acid | |
| SITE | 4 | |
| | note = MISC_FEATURE - D amino acid | |
| REGION | 5..6 | |
| | note = MISC_FEATURE - X is L-diaminobutyric acid | |
| SITE | 7 | |
| | note = MISC_FEATURE - D amino acid | |
| REGION | 9..10 | |
| | note = MISC_FEATURE - X is L-diaminobutyric acid | |
| source | 1..11 | |
| | mol_type = protein | |
| | organism = synthetic construct | |
| SEQUENCE: 86 | | |
| XXTSXXLIXX L | | 11 |
| | | |
| SEQ ID NO: 87 | moltype = AA  length = 11 | |
| FEATURE | Location/Qualifiers | |
| REGION | 1..11 | |
| | note = Synthetic | |
| SITE | 1 | |
| | note = MISC_FEATURE - X is Biphenyl-4-carboxylic acid | |
| REGION | 1..5 | |
| | note = MISC_FEATURE - Amide-cyclized between C-terminal carboxylic acid and amine-side chain of Dab | |
| SITE | 2 | |
| | note = MISC_FEATURE - X is L-diaminobutyric acid | |
| SITE | 4 | |
| | note = MISC_FEATURE - D amino acid | |
| REGION | 5..6 | |
| | note = MISC_FEATURE - X is L-diaminobutyric acid | |
| SITE | 7 | |
| | note = MISC_FEATURE - D amino acid | |
| REGION | 9..10 | |
| | note = MISC_FEATURE - X is L-diaminobutyric acid | |
| source | 1..11 | |
| | mol_type = protein | |
| | organism = synthetic construct | |
| SEQUENCE: 87 | | |
| XXTSXXLIXX L | | 11 |
| | | |
| SEQ ID NO: 88 | moltype = AA  length = 14 | |
| FEATURE | Location/Qualifiers | |
| REGION | 1..14 | |
| | note = Synthetic | |
| REGION | 1..14 | |
| | note = MISC_FEATURE - Amide-cyclized between N-terminal amine and C-terminal carboxylic acid | |
| SITE | 4 | |
| | note = MISC_FEATURE - X is L-diaminobutyric acid | |
| SITE | 5 | |
| | note = MISC_FEATURE - X is L-ornithine | |
| REGION | 6..7 | |
| | note = MISC_FEATURE - X is L-diaminobutyric acid | |
| REGION | 9..10 | |
| | note = MISC_FEATURE - X is L-diaminobutyric acid | |
| SITE | 10 | |
| | note = MISC_FEATURE - D amino acid | |
| source | 1..14 | |
| | mol_type = protein | |
| | organism = synthetic construct | |
| SEQUENCE: 88 | | |
| TWIXXXXWXX ASPP | | 14 |
| | | |
| SEQ ID NO: 89 | moltype = AA  length = 37 | |
| FEATURE | Location/Qualifiers | |
| REGION | 1..37 | |
| | note = Synthetic | |
| source | 1..37 | |
| | mol_type = protein | |
| | organism = synthetic construct | |
| SEQUENCE: 89 | | |
| LLGDFFRKSK EKIGKEFKRI VQRIKDFLRN LVPRTES | | 37 |
| | | |
| SEQ ID NO: 90 | moltype = AA  length = 37 | |
| FEATURE | Location/Qualifiers | |
| REGION | 1..37 | |
| | note = Synthetic | |
| REGION | 1..2 | |

```
                              note = MISC_FEATURE - D amino acid
REGION                        4..13
                              note = MISC_FEATURE - D amino acid
REGION                        15..37
                              note = MISC_FEATURE - D amino acid
source                        1..37
                              mol_type = protein
                              organism = synthetic construct
SEQUENCE: 90
LLGDFFRKSK EKIGKEFKRI VQRIKDFLRN LVPRTES                               37

SEQ ID NO: 91                 moltype = AA  length = 8
FEATURE                       Location/Qualifiers
REGION                        1..8
                              note = Synthetic
SITE                          7
                              note = MISC_FEATURE - X is diphenylalanine
source                        1..8
                              mol_type = protein
                              organism = synthetic construct
SEQUENCE: 91
KKWWKKXK                                                               8

SEQ ID NO: 92                 moltype = AA  length = 8
FEATURE                       Location/Qualifiers
REGION                        1..8
                              note = Synthetic
SITE                          7
                              note = MISC_FEATURE - X is D-diphenylalanine
SITE                          8
                              note = MISC_FEATURE - D amino acid
source                        1..8
                              mol_type = protein
                              organism = synthetic construct
SEQUENCE: 92
KKWWKKXK                                                               8

SEQ ID NO: 93                 moltype = AA  length = 25
FEATURE                       Location/Qualifiers
REGION                        1..25
                              note = Synthetic
DISULFID                      3..20
                              note = disulfide bond
source                        1..25
                              mol_type = protein
                              organism = synthetic construct
SEQUENCE: 93
FKCRRWQWRM KKLGAPSITC VRRAF                                            25

SEQ ID NO: 94                 moltype = AA  length = 25
FEATURE                       Location/Qualifiers
REGION                        1..25
                              note = Synthetic
REGION                        1..25
                              note = MISC_FEATURE - D amino acid
DISULFID                      3..20
                              note = disulfide bond
source                        1..25
                              mol_type = protein
                              organism = synthetic construct
SEQUENCE: 94
FKCRRWQWRM KKLGAPSITC VRRAF                                            25

SEQ ID NO: 95                 moltype = AA  length = 13
FEATURE                       Location/Qualifiers
REGION                        1..13
                              note = Synthetic
SITE                          1
                              note = MISC_FEATURE - N terminal Ac
SITE                          1
                              note = MISC_FEATURE - D amino acid
SITE                          13
                              note = MISC_FEATURE - D amino acid
source                        1..13
                              mol_type = protein
                              organism = synthetic construct
SEQUENCE: 95
ILKKWPWWPW RRK                                                         13
```

```
SEQ ID NO: 96            moltype = AA  length = 23
FEATURE                  Location/Qualifiers
REGION                   1..23
                         note = Synthetic
source                   1..23
                         mol_type = protein
                         organism = synthetic construct
SEQUENCE: 96
GIGKFLHSAK KFGKAFVGEI MNS                                              23

SEQ ID NO: 97            moltype = AA  length = 23
FEATURE                  Location/Qualifiers
REGION                   1..23
                         note = Synthetic
SITE                     2
                         note = MISC_FEATURE - D amino acid
REGION                   4..12
                         note = MISC_FEATURE - D amino acid
REGION                   14..17
                         note = MISC_FEATURE - D amino acid
REGION                   19..23
                         note = MISC_FEATURE - D amino acid
source                   1..23
                         mol_type = protein
                         organism = synthetic construct
SEQUENCE: 97
GIGKFLHSAK KFGKAFVGEI MNS                                              23

SEQ ID NO: 98            moltype = AA  length = 21
FEATURE                  Location/Qualifiers
REGION                   1..21
                         note = Synthetic
source                   1..21
                         mol_type = protein
                         organism = synthetic construct
SEQUENCE: 98
RAGLQFPVGR LLRRLLRRLL R                                                21

SEQ ID NO: 99            moltype = AA  length = 21
FEATURE                  Location/Qualifiers
REGION                   1..21
                         note = Synthetic
REGION                   1..2
                         note = MISC_FEATURE - D amino acid
REGION                   4..8
                         note = MISC_FEATURE - D amino acid
REGION                   10..21
                         note = MISC_FEATURE - D amino acid
source                   1..21
                         mol_type = protein
                         organism = synthetic construct
SEQUENCE: 99
RAGLQFPVGR LLRRLLRRLL R                                                21

SEQ ID NO: 100           moltype = AA  length = 39
FEATURE                  Location/Qualifiers
REGION                   1..39
                         note = Synthetic
source                   1..39
                         mol_type = protein
                         organism = synthetic construct
SEQUENCE: 100
RRRPRPPYLP RPRPPPFFPP RLPPRIPPGF PPRFPPRFP                              39

SEQ ID NO: 101           moltype = AA  length = 10
FEATURE                  Location/Qualifiers
REGION                   1..10
                         note = Synthetic
source                   1..10
                         mol_type = protein
                         organism = synthetic construct
SEQUENCE: 101
KFRKAFKRFF                                                             10

SEQ ID NO: 102           moltype = AA  length = 26
FEATURE                  Location/Qualifiers
REGION                   1..26
                         note = Synthetic
source                   1..26
```

```
                          mol_type = protein
                          organism = synthetic construct
SEQUENCE: 102
TAADMQGVVT DGMASGLDKD YLKPDD                                                  26

SEQ ID NO: 103            moltype = AA   length = 11
FEATURE                   Location/Qualifiers
REGION                    1..11
                          note = Synthetic
SITE                      3
                          note = MISC_FEATURE - D amino acid
SITE                      7
                          note = MISC_FEATURE - X is D-2-naphthylalanine
SITE                      9
                          note = MISC_FEATURE - X is L-4-fluorophenylalanine
SITE                      10
                          note = MISC_FEATURE - X is D-norleucine
source                    1..11
                          mol_type = protein
                          organism = synthetic construct
SEQUENCE: 103
WTARRRXRXX Q                                                                  11

SEQ ID NO: 104            moltype = AA   length = 22
FEATURE                   Location/Qualifiers
REGION                    1..22
                          note = Synthetic
SITE                      1
                          note = MISC_FEATURE - Azidoacetyl linked
SITE                      2
                          note = MISC_FEATURE - D amino acid
REGION                    4..12
                          note = MISC_FEATURE - D amino acid
REGION                    14..22
                          note = MISC_FEATURE - D amino acid
source                    1..22
                          mol_type = protein
                          organism = synthetic construct
SEQUENCE: 104
GIGKFLKKAK KFGKAFVKIL KK                                                      22

SEQ ID NO: 105            moltype = AA   length = 16
FEATURE                   Location/Qualifiers
REGION                    1..16
                          note = Synthetic
SITE                      1
                          note = MISC_FEATURE - Azidoacetyl linked
REGION                    2..9
                          note = MISC_FEATURE - D amino acid
REGION                    11..16
                          note = MISC_FEATURE - D amino acid
source                    1..16
                          mol_type = protein
                          organism = synthetic construct
SEQUENCE: 105
GKWKLFKKIG AVLKVL                                                             16

SEQ ID NO: 106            moltype = AA   length = 18
FEATURE                   Location/Qualifiers
REGION                    1..18
                          note = Synthetic
SITE                      1
                          note = MISC_FEATURE - Azidoacetyl linked
source                    1..18
                          mol_type = protein
                          organism = synthetic construct
SEQUENCE: 106
GKWCFRVCYR GICYRRCR                                                           18

SEQ ID NO: 107            moltype = AA   length = 14
FEATURE                   Location/Qualifiers
REGION                    1..14
                          note = Synthetic
SITE                      1
                          note = MISC_FEATURE - Azidoacetyl linked
REGION                    1..14
                          note = MISC_FEATURE - D amino acid
source                    1..14
                          mol_type = protein
```

```
                        organism = synthetic construct
SEQUENCE: 107
KLAKLAKKLA KLAK                                                              14

SEQ ID NO: 108          moltype = AA   length = 9
FEATURE                 Location/Qualifiers
REGION                  1..9
                        note = Synthetic
REGION                  1..9
                        note = MISC_FEATURE - D amino acid
SITE                    1
                        note = MISC_FEATURE - Azidoacetyl linked
source                  1..9
                        mol_type = protein
                        organism = synthetic construct
SEQUENCE: 108
RRRRRRRRR                                                                     9

SEQ ID NO: 109          moltype = AA   length = 10
FEATURE                 Location/Qualifiers
REGION                  1..10
                        note = Synthetic
SITE                    1
                        note = MISC_FEATURE - X is L-azidolysine
REGION                  1..10
                        note = MISC_FEATURE - Amide-cyclized between N-terminal
                         amine and C-terminal carboxylic acid
REGION                  2..10
                        note = MISC_FEATURE - D amino acid
source                  1..10
                        mol_type = protein
                        organism = synthetic construct
SEQUENCE: 109
XRRRRRRRRR                                                                   10

SEQ ID NO: 110          moltype = AA   length = 11
FEATURE                 Location/Qualifiers
REGION                  1..11
                        note = Synthetic
SITE                    1
                        note = MISC_FEATURE - D amino acid
SITE                    1
                        note = MISC_FEATURE - Azidoacetyl linked
REGION                  3..11
                        note = MISC_FEATURE - D amino acid
source                  1..11
                        mol_type = protein
                        organism = synthetic construct
SEQUENCE: 110
YGRKKRRQRR R                                                                 11

SEQ ID NO: 111          moltype = AA   length = 12
FEATURE                 Location/Qualifiers
REGION                  1..12
                        note = Synthetic
SITE                    1
                        note = MISC_FEATURE - X is L-azidolysine
REGION                  1..12
                        note = MISC_FEATURE - Amide-cyclized between N-terminal
                         amine and C-terminal carboxylic acid
SITE                    2
                        note = MISC_FEATURE - D amino acid
REGION                  4..12
                        note = MISC_FEATURE - D amino acid
source                  1..12
                        mol_type = protein
                        organism = synthetic construct
SEQUENCE: 111
XYGRKKRRQR RR                                                                12

SEQ ID NO: 112          moltype = AA   length = 27
FEATURE                 Location/Qualifiers
REGION                  1..27
                        note = Synthetic
SITE                    1
                        note = MISC_FEATURE - Azidoacetyl linked
REGION                  2..7
                        note = MISC_FEATURE - D amino acid
REGION                  9..11
```

|  | note = MISC_FEATURE - D amino acid |
| --- | --- |
| REGION | 13..27 |
|  | note = MISC_FEATURE - D amino acid |
| source | 1..27 |
|  | mol_type = protein |
|  | organism = synthetic construct |

SEQUENCE: 112
GWTLNSAGYL LGKINLKALA ALAKKIL                                           27

| SEQ ID NO: 113 | moltype = AA   length = 12 |
| --- | --- |
| FEATURE | Location/Qualifiers |
| REGION | 1..12 |
|  | note = Synthetic |
| SITE | 1 |
|  | note = MISC_FEATURE - X is 6-methyloctanoic acid or 6-methylheptanoic acid |
| REGION | 1..6 |
|  | note = MISC_FEATURE - Amide-cyclized between C-terminal carboxylic acid and amine-side chain of Dab |
| SITE | 2 |
|  | note = MISC_FEATURE - X is L-azidolysine |
| SITE | 3 |
|  | note = MISC_FEATURE - X is L-diaminobutyric acid |
| REGION | 5..7 |
|  | note = MISC_FEATURE - X is L-diaminobutyric acid |
| SITE | 8 |
|  | note = MISC_FEATURE - D amino acid |
| REGION | 10..11 |
|  | note = MISC_FEATURE - X is L-diaminobutyric acid |
| source | 1..12 |
|  | mol_type = protein |
|  | organism = synthetic construct |

SEQUENCE: 113
XXXTXXXLLX XT                                                          12

| SEQ ID NO: 114 | moltype = AA   length = 12 |
| --- | --- |
| FEATURE | Location/Qualifiers |
| REGION | 1..12 |
|  | note = Synthetic |
| SITE | 1 |
|  | note = MISC_FEATURE - X is 6-methyloctanoic acid or 6-methylheptanoic acid |
| REGION | 1..6 |
|  | note = MISC_FEATURE - Amide-cyclized between C-terminal carboxylic acid and amine-side chain of Dab5 |
| REGION | 2..3 |
|  | note = MISC_FEATURE - chemically linked by Azidoacetyl and a cleavable linker |
| SITE | 3 |
|  | note = MISC_FEATURE - X is L-diaminobutyric acid |
| REGION | 5..7 |
|  | note = MISC_FEATURE - X is L-diaminobutyric acid |
| SITE | 8 |
|  | note = MISC_FEATURE - D amino acid |
| REGION | 10..11 |
|  | note = MISC_FEATURE - X is L-diaminobutyric acid |
| source | 1..12 |
|  | mol_type = protein |
|  | organism = synthetic construct |

SEQUENCE: 114
XKXTXXXLLX XT                                                          12

| SEQ ID NO: 115 | moltype = AA   length = 11 |
| --- | --- |
| FEATURE | Location/Qualifiers |
| REGION | 1..11 |
|  | note = Synthetic |
| SITE | 1 |
|  | note = MISC_FEATURE - X is 6-methyloctanoic acid or 6-methylheptanoic acid |
| REGION | 1..5 |
|  | note = MISC_FEATURE - Amide-cyclized between C-terminal carboxylic acid and amine-side chain of Dab4 |
| SITE | 2 |
|  | note = MISC_FEATURE - X is L-diaminobutyric acid linked to Azidoacetyl with a cleavable linker connected to one or more amino acid(s) with amine side chain |
| SITE | 4 |
|  | note = MISC_FEATURE - X is L-diaminobutyric acid linked to Azidoacetyl with a cleavable linker connected to one or |

```
                        more amino acid(s) with amine side chain
SITE                    5
                        note = MISC_FEATURE - X is L-diaminobutyric acid
SITE                    6
                        note = MISC_FEATURE - X is L-diaminobutyric acid linked to
                         Azidoacetyl with a cleavable linker connected to one or
                         more amino acid(s) with amine side chain
SITE                    7
                        note = MISC_FEATURE - D amino acid
REGION                  9..10
                        note = MISC_FEATURE - X is L-diaminobutyric acid linked to
                         Azidoacetyl with a cleavable linker connected to one or
                         more amino acid(s) with amine side chain
source                  1..11
                        mol_type = protein
                        organism = synthetic construct
SEQUENCE: 115
XXTXXXLLXX T                                                                        11

SEQ ID NO: 116          moltype = AA  length = 12
FEATURE                 Location/Qualifiers
REGION                  1..12
                        note = Synthetic
SITE                    1
                        note = MISC_FEATURE - X is 6-methyloctanoic acid
REGION                  1..6
                        note = MISC_FEATURE - Amide-cyclized between C-terminal
                         carboxylic acid and amine-side chain of Dab
SITE                    2
                        note = MISC_FEATURE - X is L-azidolysine
SITE                    3
                        note = MISC_FEATURE - X is L-diaminobutyric acid
REGION                  5..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
                        mol_type = protein
                        organism = synthetic construct
SEQUENCE: 116
XXXTXXXFLX XT                                                                       12

SEQ ID NO: 117          moltype = AA  length = 12
FEATURE                 Location/Qualifiers
REGION                  1..12
                        note = Synthetic
SITE                    1
                        note = MISC_FEATURE - X is 6-methyloctanoic acid or
                         6-methylheptanoic acid
REGION                  1..6
                        note = MISC_FEATURE - Amide-cyclized between C-terminal
                         carboxylic acid and amine-side chain of Dab
SITE                    2
                        note = MISC_FEATURE - linked to Azidoacetyl with a
                         cleavable linker
SITE                    3
                        note = MISC_FEATURE - X is L-diaminobutyric acid
REGION                  5..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
                        mol_type = protein
                        organism = synthetic construct
SEQUENCE: 117
XKXTXXXFLX XT                                                                       12

SEQ ID NO: 118          moltype = AA  length = 11
FEATURE                 Location/Qualifiers
REGION                  1..11
                        note = Synthetic
SITE                    1
                        note = MISC_FEATURE - X is 6-methyloctanoic acid or
                         6-methylheptanoic acid
REGION                  1..5
```

```
                        note = MISC_FEATURE - X is L-diaminobutyric acid
                         Amide-cyclized between C-terminal carboxylic acid and
                         amine-side chain of Dab
SITE                    2
                        note = MISC_FEATURE - X is L-diaminobutyric acid linked to
                         Azidoacetyl with a cleavable linker connected to one or
                         more amino acid(s) with amine side chain
SITE                    4
                        note = MISC_FEATURE - X is L-diaminobutyric acid linked to
                         Azidoacetyl with a cleavable linker connected to one or
                         more amino acid(s) with amine side chain
SITE                    5
                        note = MISC_FEATURE - X is L-diaminobutyric acid
SITE                    6
                        note = MISC_FEATURE - X is L-diaminobutyric acid linked to
                         Azidoacetyl with a cleavable linker connected to one or
                         more amino acid(s) with amine side chain
SITE                    6
                        note = MISC_FEATURE - D amino acid
REGION                  9..10
                        note = MISC_FEATURE - X is L-diaminobutyric acid linked to
                         Azidoacetyl with a cleavable linker connected to one or
                         more amino acid(s) with amine side chain
source                  1..11
                        mol_type = protein
                        organism = synthetic construct
SEQUENCE: 118
XXTXXXFLXX T                                                                    11

SEQ ID NO: 119          moltype = AA  length = 12
FEATURE                 Location/Qualifiers
REGION                  1..12
                        note = Synthetic
SITE                    1
                        note = MISC_FEATURE - X is 6-methyloctanoic acid
REGION                  1..6
                        note = MISC_FEATURE - Amide-cyclized between C-terminal
                         carboxylic acid and amine-side chain of Dab
SITE                    2
                        note = MISC_FEATURE - X is L-azidolysine
SITE                    3
                        note = MISC_FEATURE - X is L-diaminobutyric acid
SITE                    5
                        note = MISC_FEATURE - D amino acid
REGION                  6..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
                        mol_type = protein
                        organism = synthetic construct
SEQUENCE: 119
XXXTSXXLIX XL                                                                   12

SEQ ID NO: 120          moltype = AA  length = 12
FEATURE                 Location/Qualifiers
REGION                  1..12
                        note = Synthetic
SITE                    1
                        note = MISC_FEATURE - X is 6-methyloctanoic acid
REGION                  1..6
                        note = MISC_FEATURE - Amide-cyclized between C-terminal
                         carboxylic acid and amine-side chain of Dab
SITE                    2
                        note = MISC_FEATURE - linked to Azidoacetyl with a
                         cleavable linker
SITE                    3
                        note = MISC_FEATURE - X is L-diaminobutyric acid
SITE                    5
                        note = MISC_FEATURE - D amino acid
REGION                  6..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
```

```
SEQUENCE: 120
XKXTSXXLIX XL                                                              12

SEQ ID NO: 121         moltype = AA  length = 11
FEATURE                Location/Qualifiers
REGION                 1..11
                       note = Synthetic
SITE                   1
                       note = MISC_FEATURE - X is 6-methyloctanoic acid
REGION                 1..5
                       note = MISC_FEATURE - Amide-cyclized between C-terminal
                        carboxylic acid and amine-side chain of Dab
SITE                   2
                       note = MISC_FEATURE - X is L-diaminobutyric acid linked to
                        Azidoacetyl with a cleavable linker connected to one or
                        more amino acid(s) with amine side chain
SITE                   4
                       note = MISC_FEATURE - D amino acid
SITE                   5
                       note = MISC_FEATURE - X is L-diaminobutyric acid
SITE                   6
                       note = MISC_FEATURE - X is L-diaminobutyric acid linked to
                        Azidoacetyl with a cleavable linker connected to one or
                        more amino acid(s) with amine side chain
SITE                   7
                       note = MISC_FEATURE - D amino acid
REGION                 9..10
                       note = MISC_FEATURE - X is L-diaminobutyric acid linked to
                        Azidoacetyl with a cleavable linker connected to one or
                        more amino acid(s) with amine side chain
source                 1..11
                       mol_type = protein
                       organism = synthetic construct
SEQUENCE: 121
XXTSXXLIXX L                                                               11

SEQ ID NO: 122         moltype = AA  length = 12
FEATURE                Location/Qualifiers
REGION                 1..12
                       note = Synthetic
SITE                   1
                       note = MISC_FEATURE - X is Biphenyl-4-carboxylic acid
REGION                 1..6
                       note = MISC_FEATURE - Amide-cyclized between C-terminal
                        carboxylic acid and amine-side chain of Dab
SITE                   2
                       note = MISC_FEATURE - X is L-azidolysine
SITE                   3
                       note = MISC_FEATURE - X is L-diaminobutyric acid
SITE                   5
                       note = MISC_FEATURE - D amino acid
REGION                 6..7
                       note = MISC_FEATURE - X is L-diaminobutyric acid
SITE                   8
                       note = MISC_FEATURE - D amino acid
REGION                 10..11
                       note = MISC_FEATURE - X is L-diaminobutyric acid
source                 1..12
                       mol_type = protein
                       organism = synthetic construct
SEQUENCE: 122
XXXTSXXLIX XL                                                              12

SEQ ID NO: 123         moltype = AA  length = 12
FEATURE                Location/Qualifiers
REGION                 1..12
                       note = Synthetic
REGION                 1..6
                       note = MISC_FEATURE - Amide-cyclized between C-terminal
                        carboxylic acid and amine-side chain of Dab
SITE                   1
                       note = MISC_FEATURE - X is Biphenyl-4-carboxylic acid
SITE                   2
                       note = MISC_FEATURE - linked to Azidoacetyl linked to a
                        cleavable linker
SITE                   3
                       note = MISC_FEATURE - X is L-diaminobutyric acid
```

| | | |
|---|---|---|
| SITE | 5 | |
| | note = MISC_FEATURE - D amino acid | |
| REGION | 6..7 | |
| | note = MISC_FEATURE - X is L-diaminobutyric acid | |
| SITE | 8 | |
| | note = MISC_FEATURE - D amino acid | |
| REGION | 10..11 | |
| | note = MISC_FEATURE - X is L-diaminobutyric acid | |
| source | 1..12 | |
| | mol_type = protein | |
| | organism = synthetic construct | |
| SEQUENCE: 123 | | |
| XKXTSXXLIX XL | | 12 |
| | | |
| SEQ ID NO: 124 | moltype = AA  length = 11 | |
| FEATURE | Location/Qualifiers | |
| REGION | 1..11 | |
| | note = Synthetic | |
| SITE | 1 | |
| | note = MISC_FEATURE - X is Biphenyl-4-carboxylic acid | |
| REGION | 1..5 | |
| | note = MISC_FEATURE - Amide-cyclized between C-terminal carboxylic acid and amine-side chain of Dab | |
| SITE | 2 | |
| | note = MISC_FEATURE - X is L-diaminobutyric acid linked to Azidoacetyl linked to a cleavable linker connected to one or more amino acid(s) with amine side chain | |
| SITE | 4 | |
| | note = MISC_FEATURE - D amino acid | |
| SITE | 5 | |
| | note = MISC_FEATURE - X is L-diaminobutyric acid | |
| SITE | 6 | |
| | note = MISC_FEATURE - X is L-diaminobutyric acid linked to Azidoacetyl linked to a cleavable linker connected to one or more amino acid(s) with amine side chain | |
| SITE | 7 | |
| | note = MISC_FEATURE - D amino acid | |
| REGION | 9..10 | |
| | note = MISC_FEATURE - X is L-diaminobutyric acid linked to Azidoacetyl linked to a cleavable linker connected to one or more amino acid(s) with amine side chain | |
| source | 1..11 | |
| | mol_type = protein | |
| | organism = synthetic construct | |
| SEQUENCE: 124 | | |
| XXTSXXLIXX L | | 11 |
| | | |
| SEQ ID NO: 125 | moltype = AA  length = 14 | |
| FEATURE | Location/Qualifiers | |
| REGION | 1..14 | |
| | note = Synthetic | |
| SITE | 1 | |
| | note = MISC_FEATURE - X is L-azidolysine | |
| REGION | 1..14 | |
| | note = MISC_FEATURE - Amide-cyclized between N-terminal amine and C-terminal carboxylic acid | |
| SITE | 4 | |
| | note = MISC_FEATURE - X is L-diaminobutyric acid | |
| SITE | 5 | |
| | note = MISC_FEATURE - X is L-ornithine | |
| REGION | 6..7 | |
| | note = MISC_FEATURE - X is L-diaminobutyric acid | |
| REGION | 9..10 | |
| | note = MISC_FEATURE - X is L-diaminobutyric acid | |
| SITE | 13 | |
| | note = MISC_FEATURE - D amino acid | |
| source | 1..14 | |
| | mol_type = protein | |
| | organism = synthetic construct | |
| SEQUENCE: 125 | | |
| XWIXXXXWXX ASPP | | 14 |
| | | |
| SEQ ID NO: 126 | moltype = AA  length = 14 | |
| FEATURE | Location/Qualifiers | |
| REGION | 1..14 | |
| | note = Synthetic | |
| SITE | 1 | |
| | note = MISC_FEATURE - linked to Azidoacetyl linked with a cleavable linker | |

| | | |
|---|---|---|
| REGION | 1..14 | |
| | note = MISC_FEATURE - Amide-cyclized between N-terminal amine and C-terminal carboxylic acid | |
| SITE | 4 | |
| | note = MISC_FEATURE - X is L-diaminobutyric acid | |
| SITE | 5 | |
| | note = MISC_FEATURE - X is L-ornithine | |
| REGION | 6..7 | |
| | note = MISC_FEATURE - X is L-diaminobutyric acid | |
| REGION | 9..10 | |
| | note = MISC_FEATURE - X is L-diaminobutyric acid | |
| SITE | 13 | |
| | note = MISC_FEATURE - D amino acid | |
| source | 1..14 | |
| | mol_type = protein | |
| | organism = synthetic construct | |
| SEQUENCE: 126 | | |
| KWIXXXXWXX ASPP | | 14 |
| | | |
| SEQ ID NO: 127 | moltype = AA  length = 14 | |
| FEATURE | Location/Qualifiers | |
| REGION | 1..14 | |
| | note = Synthetic | |
| REGION | 1..14 | |
| | note = MISC_FEATURE - Amide-cyclized between N-terminal amine and C-terminal carboxylic acid | |
| SITE | 4 | |
| | note = MISC_FEATURE - X is L-diaminobutyric acid linked to Azidoacetyl and a cleavable linker connected to one or more amino acid(s) with amine side chain | |
| SITE | 5 | |
| | note = MISC_FEATURE - X is L-ornithine linked to Azidoacetyl and a cleavable linker connected to one or more amino acid(s) with amine side chain | |
| REGION | 6..7 | |
| | note = MISC_FEATURE - X is L-diaminobutyric acid linked to Azidoacetyl and a cleavable linker connected to one or more amino acid(s) with amine side chain | |
| REGION | 9..10 | |
| | note = MISC_FEATURE - X is L-diaminobutyric acid linked to Azidoacetyl and a cleavable linker connected to one or more amino acid(s) with amine side chain | |
| SITE | 13 | |
| | note = MISC_FEATURE - D amino acid | |
| source | 1..14 | |
| | mol_type = protein | |
| | organism = synthetic construct | |
| SEQUENCE: 127 | | |
| TWIXXXXWXX ASPP | | 14 |
| | | |
| SEQ ID NO: 128 | moltype = AA  length = 14 | |
| FEATURE | Location/Qualifiers | |
| REGION | 1..14 | |
| | note = Synthetic | |
| SITE | 1 | |
| | note = MISC_FEATURE - linked to (Cy7) | |
| SITE | 4 | |
| | note = MISC_FEATURE - X is L-diaminobutyric acid | |
| SITE | 5 | |
| | note = MISC_FEATURE - X is L-ornithine | |
| REGION | 6..7 | |
| | note = MISC_FEATURE - X is L-diaminobutyric acid | |
| REGION | 9..10 | |
| | note = MISC_FEATURE - X is L-diaminobutyric acid | |
| SITE | 13 | |
| | note = MISC_FEATURE - D amino acid | |
| source | 1..14 | |
| | mol_type = protein | |
| | organism = synthetic construct | |
| SEQUENCE: 128 | | |
| KWIXXXXWXX ASPP | | 14 |
| | | |
| SEQ ID NO: 129 | moltype = AA  length = 14 | |
| FEATURE | Location/Qualifiers | |
| REGION | 1..14 | |
| | note = Synthetic | |
| SITE | 1 | |
| | note = MISC_FEATURE - X is L-azidolysine | |
| SITE | 4 | |

```
                        note = MISC_FEATURE - X is L-diaminobutyric acid
SITE                    5
                        note = MISC_FEATURE - X is L-ornithine
REGION                  6..7
                        note = MISC_FEATURE - X is L-diaminobutyric acid
REGION                  9..10
                        note = MISC_FEATURE - X is L-diaminobutyric acid
SITE                    11
                        note = MISC_FEATURE - linked to (Cy7)
SITE                    13
                        note = MISC_FEATURE - D amino acid
source                  1..14
                        mol_type = protein
                        organism = synthetic construct
SEQUENCE: 129
XWIXXXXWXX KSPP                                                                   14

SEQ ID NO: 130          moltype = AA  length = 12
FEATURE                 Location/Qualifiers
REGION                  1..12
                        note = Synthetic
SITE                    1
                        note = MISC_FEATURE - X is 6-methyloctanoic acid or
                         6-methylheptanoic acid
REGION                  1..6
                        note = MISC_FEATURE - Amide-cyclized between C-terminal
                         carboxylic acid and amine-side chain of Dab
SITE                    2
                        note = MISC_FEATURE - X is L-azidolysine
SITE                    3
                        note = MISC_FEATURE - X is L-diaminobutyric acid
SITE                    4
                        note = MISC_FEATURE - linked to (Cy7)
REGION                  5..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
                        mol_type = protein
                        organism = synthetic construct
SEQUENCE: 130
XXXKXXXLLX XT                                                                     12

SEQ ID NO: 131          moltype = AA  length = 12
FEATURE                 Location/Qualifiers
REGION                  1..12
                        note = Synthetic
SITE                    1
                        note = MISC_FEATURE - X is 6-methyloctanoic acid or
                         6-methylheptanoic acid
REGION                  1..6
                        note = MISC_FEATURE - Amide-cyclized between C-terminal
                         carboxylic acid and amine-side chain of Dab
SITE                    2
                        note = MISC_FEATURE - X is L-azidolysine
SITE                    3
                        note = MISC_FEATURE - X is L-diaminobutyric acid
SITE                    4
                        note = MISC_FEATURE - linked to (Cy7)
REGION                  5..7
                        note = MISC_FEATURE - X is L-diaminobutyric acid
SITE                    8
                        note = MISC_FEATURE - D amino acid
REGION                  10..11
                        note = MISC_FEATURE - X is L-diaminobutyric acid
source                  1..12
                        mol_type = protein
                        organism = synthetic construct
SEQUENCE: 131
XXXKXXXFLX XT                                                                     12

SEQ ID NO: 132          moltype = AA  length = 12
FEATURE                 Location/Qualifiers
REGION                  1..12
                        note = Synthetic
SITE                    1
                        note = MISC_FEATURE - X is 6-methyloctanoic acid
```

| | | |
|---|---|---|
| REGION | 1..6 | |
| | note = MISC_FEATURE - Amide-cyclized between C-terminal carboxylic acid and amine-side chain of Dab | |
| SITE | 2 | |
| | note = MISC_FEATURE - X is L-azidolysine | |
| SITE | 3 | |
| | note = MISC_FEATURE - X is L-diaminobutyric acid | |
| SITE | 4 | |
| | note = MISC_FEATURE - linked to (Cy7) | |
| SITE | 5 | |
| | note = MISC_FEATURE - D amino acid | |
| REGION | 6..7 | |
| | note = MISC_FEATURE - X is L-diaminobutyric acid | |
| SITE | 8 | |
| | note = MISC_FEATURE - D amino acid | |
| REGION | 10..11 | |
| | note = MISC_FEATURE - X is L-diaminobutyric acid | |
| source | 1..12 | |
| | mol_type = protein | |
| | organism = synthetic construct | |
| SEQUENCE: 132 | | |
| XXXKSXXLIX XL | | 12 |
| | | |
| SEQ ID NO: 133 | moltype = AA  length = 23 | |
| FEATURE | Location/Qualifiers | |
| REGION | 1..23 | |
| | note = Synthetic | |
| SITE | 1 | |
| | note = MISC_FEATURE - Azidoacetyl linked | |
| SITE | 2 | |
| | note = MISC_FEATURE - D amino acid | |
| REGION | 4..12 | |
| | note = MISC_FEATURE - D amino acid | |
| REGION | 14..22 | |
| | note = MISC_FEATURE - D amino acid | |
| SITE | 23 | |
| | note = MISC_FEATURE - linked to (Cy7) | |
| source | 1..23 | |
| | mol_type = protein | |
| | organism = synthetic construct | |
| SEQUENCE: 133 | | |
| GIGKFLKKAK KFGKAFVKIL KKK | | 23 |
| | | |
| SEQ ID NO: 134 | moltype = AA  length = 16 | |
| FEATURE | Location/Qualifiers | |
| REGION | 1..16 | |
| | note = Synthetic | |
| SITE | 1 | |
| | note = MISC_FEATURE - Azidoacetyl linked | |
| REGION | 2..15 | |
| | note = MISC_FEATURE - D amino acid | |
| SITE | 16 | |
| | note = MISC_FEATURE - linked to (Cy7) | |
| source | 1..16 | |
| | mol_type = protein | |
| | organism = synthetic construct | |
| SEQUENCE: 134 | | |
| GKLAKLAKKL AKLAKK | | 16 |
| | | |
| SEQ ID NO: 135 | moltype = AA  length = 20 | |
| FEATURE | Location/Qualifiers | |
| REGION | 1..20 | |
| | note = Synthetic | |
| SITE | 1 | |
| | note = MISC_FEATURE - Azidoacetyl linked | |
| DISULFID | 4..17 | |
| | note = disulfide bond | |
| DISULFID | 8..13 | |
| | note = disulfide bond | |
| SITE | 20 | |
| | note = MISC_FEATURE - linked to (Cy7) | |
| source | 1..20 | |
| | mol_type = protein | |
| | organism = synthetic construct | |
| SEQUENCE: 135 | | |
| GKWCFRVCYR GICYRRCRGK | | 20 |
| | | |
| SEQ ID NO: 136 | moltype = AA  length = 10 | |
| FEATURE | Location/Qualifiers | |

```
REGION              1..10
                    note = Synthetic
REGION              1..9
                    note = MISC_FEATURE - D amino acid
SITE                1
                    note = MISC_FEATURE - Azidoacetyl linked
REGION              1..10
                    note = MISC_FEATURE - link to (Cy7)
REGION              9..10
                    note = MISC_FEATURE - Ahx linked
source              1..10
                    mol_type = protein
                    organism = synthetic construct
SEQUENCE: 136
RRRRRRRRRK                                                                       10

SEQ ID NO: 137      moltype = AA  length = 22
FEATURE             Location/Qualifiers
REGION              1..22
                    note = Synthetic
SITE                2
                    note = MISC_FEATURE - D amino acid
REGION              4..12
                    note = MISC_FEATURE - D amino acid
REGION              14..22
                    note = MISC_FEATURE - D amino acid
source              1..22
                    mol_type = protein
                    organism = synthetic construct
SEQUENCE: 137
GIGKFLKKAK KFGKAFVKIL KK                                                         22

SEQ ID NO: 138      moltype = AA  length = 23
FEATURE             Location/Qualifiers
REGION              1..23
                    note = Synthetic
SITE                2
                    note = MISC_FEATURE - D amino acid
REGION              4..12
                    note = MISC_FEATURE - D amino acid
REGION              14..21
                    note = MISC_FEATURE - D amino acid
source              1..23
                    mol_type = protein
                    organism = synthetic construct
SEQUENCE: 138
GIGKFLKKAK KFGKAFVKIL KKK                                                        23

SEQ ID NO: 139      moltype = AA  length = 14
FEATURE             Location/Qualifiers
REGION              1..14
                    note = Synthetic
REGION              1..14
                    note = MISC_FEATURE - Amide-cyclized between N-terminal
                     amine and C-terminal carboxylic acid
SITE                4
                    note = MISC_FEATURE - X is L-diaminobutyric acid
SITE                5
                    note = MISC_FEATURE - X is L-ornithine
REGION              6..7
                    note = MISC_FEATURE - X is L-diaminobutyric acid
REGION              9..10
                    note = MISC_FEATURE - X is L-diaminobutyric acid
SITE                13
                    note = MISC_FEATURE - D amino acid
source              1..14
                    mol_type = protein
                    organism = synthetic construct
SEQUENCE: 139
TWIXXXXWXX ASPP                                                                  14

SEQ ID NO: 140      moltype = AA  length = 11
FEATURE             Location/Qualifiers
REGION              1..11
                    note = Synthetic
SITE                1
                    note = MISC_FEATURE - X is 6-methyloctanoic acid
SITE                2
                    note = MISC_FEATURE - X is L-diaminobutyric acid
```

| | | |
|---|---|---|
| REGION | 4..6 | |
| | note = MISC_FEATURE - X is L-diaminobutyric acid | |
| SITE | 7 | |
| | note = MISC_FEATURE - D amino acid | |
| REGION | 9..10 | |
| | note = MISC_FEATURE - X is L-diaminobutyric acid | |
| source | 1..11 | |
| | mol_type = protein | |
| | organism = synthetic construct | |

SEQUENCE: 140
XXTXXXLLXX T                                                            11

| | | |
|---|---|---|
| SEQ ID NO: 141 | moltype = AA   length = 16 | |
| FEATURE | Location/Qualifiers | |
| REGION | 1..16 | |
| | note = Synthetic | |
| source | 1..16 | |
| | mol_type = protein | |
| | organism = synthetic construct | |

SEQUENCE: 141
FEGFSFLAFE DFVSSI                                                       16

| | | |
|---|---|---|
| SEQ ID NO: 142 | moltype = AA   length = 121 | |
| FEATURE | Location/Qualifiers | |
| REGION | 1..121 | |
| | note = Synthetic | |
| source | 1..121 | |
| | mol_type = protein | |
| | organism = synthetic construct | |

SEQUENCE: 142
QVQLVESGGG LVQPGGSLRL SCAASGSISS LYVMGWYRQA PGKQRELVAD ITSSGSIYYV    60
DSLKGRFTIS RDNARSTVYL QMNSLEPEDT AVYYCMAHVR QDSGSEYLTY WGQGTQVTVS   120
S                                                                  121

| | | |
|---|---|---|
| SEQ ID NO: 143 | moltype = AA   length = 190 | |
| FEATURE | Location/Qualifiers | |
| REGION | 1..190 | |
| | note = Synthetic | |
| source | 1..190 | |
| | mol_type = protein | |
| | organism = synthetic construct | |

SEQUENCE: 143
NVDLVFLFDG SMSLQPDEFQ KILDFMKDVM KKLSNTSYQF AAVQFSTSYK TEFDFSDYVK    60
WKDPDALLKH VKHMLLLTNT FGAINYVATE VFREELGARP DATKVLIIIT DGEATDSGNI   120
DAAKDIIRYI IGIGKHSQTK ESQETLHKFA SKPASEFVKI LDTGEKLKDL FTELQKKIYV   180
IEGTSKQDLT                                                         190

| | | |
|---|---|---|
| SEQ ID NO: 144 | moltype = AA   length = 241 | |
| FEATURE | Location/Qualifiers | |
| REGION | 1..241 | |
| | note = Synthetic | |
| source | 1..241 | |
| | mol_type = protein | |
| | organism = synthetic construct | |

SEQUENCE: 144
DVVMTQTPSS LSASRGDRVT ISCSASQAIS KYLNWYQQKP DGTVKLLINY TSRLHSGVPS    60
RFSGSGSGTD YSLTISNLEP EDIATYYCQQ YNKLPYTFGG GTKLEIKGGG GSGGGGSGGG   120
GSEVQLQQSG AELMKSGASV KISCKATGYT FSSYWIEWIK QRPGHGLEWI GEILPGSGST   180
NYNEKFKGKA TVTTDTSSNT AYMQFSSLTS EDSAVYYCAR WYDGHFDYWG QGTTLTVSST   240
S                                                                  241

| | | |
|---|---|---|
| SEQ ID NO: 145 | moltype = AA   length = 12 | |
| FEATURE | Location/Qualifiers | |
| REGION | 1..12 | |
| | note = Synthetic | |
| source | 1..12 | |
| | mol_type = protein | |
| | organism = synthetic construct | |

SEQUENCE: 145
DFYKPMPNLR IT                                                           12

| | | |
|---|---|---|
| SEQ ID NO: 146 | moltype = AA   length = 10 | |
| FEATURE | Location/Qualifiers | |
| REGION | 1..10 | |
| | note = Synthetic | |
| source | 1..10 | |
| | mol_type = protein | |
| | organism = synthetic construct | |

SEQUENCE: 146

```
LQIQSWSSSP                                                             10

SEQ ID NO: 147         moltype = AA   length = 12
FEATURE                Location/Qualifiers
REGION                 1..12
                       note = Synthetic
source                 1..12
                       mol_type = protein
                       organism = synthetic construct
SEQUENCE: 147
FPLETSHMSA PL                                                          12

SEQ ID NO: 148         moltype = AA   length = 15
FEATURE                Location/Qualifiers
REGION                 1..15
                       note = Synthetic
source                 1..15
                       mol_type = protein
                       organism = synthetic construct
SEQUENCE: 148
KFPDLDSRRL PHMSL                                                       15

SEQ ID NO: 149         moltype = AA   length = 20
FEATURE                Location/Qualifiers
REGION                 1..20
                       note = Synthetic
source                 1..20
                       mol_type = protein
                       organism = synthetic construct
SEQUENCE: 149
KYIKFKHDYN ILEFNDGTFE                                                  20

SEQ ID NO: 150         moltype = AA   length = 5
FEATURE                Location/Qualifiers
REGION                 1..5
                       note = Synthetic
source                 1..5
                       mol_type = protein
                       organism = synthetic construct
SEQUENCE: 150
EWVDV                                                                  5

SEQ ID NO: 151         moltype = AA   length = 8
FEATURE                Location/Qualifiers
REGION                 1..8
                       note = Synthetic
source                 1..8
                       mol_type = protein
                       organism = synthetic construct
SEQUENCE: 151
DVEWVDVA                                                               8

SEQ ID NO: 152         moltype = AA   length = 12
FEATURE                Location/Qualifiers
REGION                 1..12
                       note = Synthetic
source                 1..12
                       mol_type = protein
                       organism = synthetic construct
SEQUENCE: 152
DITWDQLWDL MK                                                          12

SEQ ID NO: 153         moltype = AA   length = 126
FEATURE                Location/Qualifiers
REGION                 1..126
                       note = Synthetic
source                 1..126
                       mol_type = protein
                       organism = synthetic construct
SEQUENCE: 153
EVQLVESGGG LVQPGGSLRL SCAASGSTLD YYAIGWFRQA PGKEREGVSC TSNSGSTYYG      60
GSVKGRFTAS RDNAKNTVYL QMNSLRPEDT AVYYCVATIG CATLGGTLDV QRYYRGQGT      120
QVTVSS                                                                126

SEQ ID NO: 154         moltype = AA   length = 124
FEATURE                Location/Qualifiers
REGION                 1..124
                       note = Synthetic
source                 1..124
```

```
                        mol_type = protein
                        organism = synthetic construct
SEQUENCE: 154
QVQLQESGGG LVQAGGSLTL SCAASGRTFS NYAMGWFRQA PGKEREFVAM ISWNGENTYY    60
ADSVKGRFTI SRDNAKNTVY LQMNSLKPED TAVYYCAVRI LSGWYDRPDE YGYWGQGTQV   120
TVSS                                                                124

SEQ ID NO: 155          moltype = AA  length = 9
FEATURE                 Location/Qualifiers
REGION                  1..9
                        note = Synthetic
DISULFID                1..9
                        note = disulfide bond
source                  1..9
                        mol_type = protein
                        organism = synthetic construct
SEQUENCE: 155
CRGDKGPDC                                                             9

SEQ ID NO: 156          moltype = AA  length = 119
FEATURE                 Location/Qualifiers
REGION                  1..119
                        note = Synthetic
REGION                  97..98
                        note = MISC_FEATURE - Chemically linked by a
                        (DBCO-Maleimide)-Azidoacetyl
SITE                    99
                        note = MISC_FEATURE - D amino acid
REGION                  101..109
                        note = MISC_FEATURE - D amino acid
REGION                  111..118
                        note = MISC_FEATURE - D amino acid
source                  1..119
                        mol_type = protein
                        organism = synthetic construct
SEQUENCE: 156
GLKEAKEKAI EELKKAGITS DYYFDLINKA KTVEGVNALK DEILKAHHHH HHSPSTPPTP    60
SPSTPPEEGE EGEEGEEGEE GEEGPLGVRG KLVPRGCGIG KFLKKAKKFG KAFVKILKK    119

SEQ ID NO: 157          moltype = AA  length = 175
FEATURE                 Location/Qualifiers
REGION                  1..175
                        note = Synthetic
REGION                  153..154
                        note = MISC_FEATURE - Chemically linked by a
                        (DBCO-Maleimide)-Azidoacetyl
SITE                    155
                        note = MISC_FEATURE - D amino acid
REGION                  157..165
                        note = MISC_FEATURE - D amino acid
REGION                  167..175
                        note = MISC_FEATURE - D amino acid
source                  1..175
                        mol_type = protein
                        organism = synthetic construct
SEQUENCE: 157
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGPLGLRS WGCGIGKFLK KAKKFGKAFV KILKK        175

SEQ ID NO: 158          moltype = AA  length = 176
FEATURE                 Location/Qualifiers
REGION                  1..176
                        note = Synthetic
REGION                  153..154
                        note = MISC_FEATURE - Chemically linked
                        -(DBCO-Maleimide)-Azidoacetyl
SITE                    155
                        note = MISC_FEATURE - D amino acid
REGION                  157..165
                        note = MISC_FEATURE - D amino acid
REGION                  167..175
                        note = MISC_FEATURE - D amino acid
SITE                    176
                        note = MISC_FEATURE - linked to (Cy7)
source                  1..176
                        mol_type = protein
                        organism = synthetic construct
SEQUENCE: 158
```

```
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGPLGLRS WGCGIGKFLK KAKKFGKAFV KILKKK       176

SEQ ID NO: 159          moltype = AA  length = 175
FEATURE                 Location/Qualifiers
REGION                  1..175
                        note = Synthetic
REGION                  145..146
                        note = MISC_FEATURE - chemically linked DBCO-Maleimide)
REGION                  146..147
                        note = MISC_FEATURE - chemically linked Azidoacetyl
SITE                    165
                        note = MISC_FEATURE - X is L-diaminobutyric acid
SITE                    166
                        note = MISC_FEATURE - X is L-ornithine
REGION                  167..168
                        note = MISC_FEATURE - X is L-diaminobutyric acid
REGION                  170..171
                        note = MISC_FEATURE - X is L-diaminobutyric acid
SITE                    174
                        note = MISC_FEATURE - D amino acid
source                  1..175
                        mol_type = protein
                        organism = synthetic construct
SEQUENCE: 159
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGCKGPLG LRSWGPLGLR SWWIXXXXWX XASPP        175

SEQ ID NO: 160          moltype = AA  length = 172
FEATURE                 Location/Qualifiers
REGION                  1..172
                        note = Synthetic
SITE                    145
                        note = MISC_FEATURE - chemically linked DBCO-Maleimide
SITE                    149
                        note = MISC_FEATURE - chemically linked Azidoacetyl
SITE                    149
                        note = MISC_FEATURE - X is L-diaminobutyric acid
REGION                  150..151
                        note = MISC_FEATURE - chemically linked Azidoacetyl
SITE                    159
                        note = MISC_FEATURE - X is 6-benzyloxy-L-norleucine
SITE                    160
                        note = MISC_FEATURE - X is L-methionine sulfone
SITE                    161
                        note = MISC_FEATURE - X is octahydroindole-2-carboxylic Acid
SITE                    162
                        note = MISC_FEATURE - X is L-2-aminobutyric acid
SITE                    163
                        note = MISC_FEATURE - X is L-ornithine
REGION                  164..165
                        note = MISC_FEATURE - X is L-diaminobutyric acid
REGION                  167..168
                        note = MISC_FEATURE - X is L-diaminobutyric acid
SITE                    171
                        note = MISC_FEATURE - D amino acid
source                  1..172
                        mol_type = protein
                        organism = synthetic construct
SEQUENCE: 160
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGCTWIXG PLGLRSWGXX XXXXXWXXAS PP           172

SEQ ID NO: 161          moltype = AA  length = 173
FEATURE                 Location/Qualifiers
REGION                  1..173
                        note = Synthetic
REGION                  145..146
                        note = MISC_FEATURE - chemically linked by DBCO-Maleimide
SITE                    146
                        note = MISC_FEATURE - X is 6-methyloctanoic acid
REGION                  147..148
                        note = MISC_FEATURE - chemmically linked by Azidoacetyl
SITE                    164
                        note = MISC_FEATURE - X is L-diaminobutyric acid
REGION                  166..168
```

|  |  |
|---|---|
|  | note = MISC_FEATURE - X is L-diaminobutyric acid |
| SITE | 169 |
|  | note = MISC_FEATURE - D amino acid |
| REGION | 171..172 |
|  | note = MISC_FEATURE - X is L-diaminobutyric acid |
| source | 1..173 |
|  | mol_type = protein |
|  | organism = synthetic construct |

SEQUENCE: 161

```
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGCXKGPL GLRSWGPLGL RSWXTXXXLL XXT          173
```

|  |  |
|---|---|
| SEQ ID NO: 162 | moltype = AA   length = 176 |
| FEATURE | Location/Qualifiers |
| REGION | 1..176 |
|  | note = Synthetic |
| REGION | 145..146 |
|  | note = MISC_FEATURE - chemically linked by DBCO-Maleimide |
| SITE | 146 |
|  | note = MISC_FEATURE - X is 6-methyloctanoic acid |
| REGION | 147..148 |
|  | note = MISC_FEATURE - chemically linked by Azidoacetyl |
| SITE | 147 |
|  | note = MISC_FEATURE - X is L-diaminobutyric acid |
| SITE | 164 |
|  | note = MISC_FEATURE - X is 6-benzyloxy-L-norleucine |
| SITE | 165 |
|  | note = MISC_FEATURE - X is L-methionine sulfone |
| SITE | 166 |
|  | note = MISC_FEATURE - X is octahydroindole-2-carboxylic Acid |
| SITE | 167 |
|  | note = MISC_FEATURE - X is L-2-aminobutyric acid |
| REGION | 169..171 |
|  | note = MISC_FEATURE - X is L-diaminobutyric acid |
| SITE | 172 |
|  | note = MISC_FEATURE - D amino acid |
| REGION | 174..175 |
|  | note = MISC_FEATURE - X is L-diaminobutyric acid |
| source | 1..176 |
|  | mol_type = protein |
|  | organism = synthetic construct |

SEQUENCE: 162

```
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGCXXGPL GLRSWGPLGL RSWXXXXTXX XLLXXT       176
```

|  |  |
|---|---|
| SEQ ID NO: 163 | moltype = AA   length = 173 |
| FEATURE | Location/Qualifiers |
| REGION | 1..173 |
|  | note = Synthetic |
| REGION | 145..146 |
|  | note = MISC_FEATURE - chemically linked by DBCO-Maleimide |
| SITE | 146 |
|  | note = MISC_FEATURE - X is Biphenyl-4-carboxylic acid |
| REGION | 147..148 |
|  | note = MISC_FEATURE - chemically linked by Azidoacetyl |
| SITE | 164 |
|  | note = MISC_FEATURE - X is L-diaminobutyric acid |
| SITE | 166 |
|  | note = MISC_FEATURE - D amino acid |
| REGION | 167..168 |
|  | note = MISC_FEATURE - X is L-diaminobutyric acid |
| SITE | 169 |
|  | note = MISC_FEATURE - D amino acid |
| REGION | 171..172 |
|  | note = MISC_FEATURE - X is L-diaminobutyric acid |
| source | 1..173 |
|  | mol_type = protein |
|  | organism = synthetic construct |

SEQUENCE: 163

```
GLKEAKEKAI EELKKAGITS DYYFDLINKA KTVEGVNALK DEILKAGGGG SGGGGSGGGG    60
SLKEAKEKAI EELKKAGITS DYYFDLINKA KTVEGVNALK DEILKAHHHH HHSPSTPPTP   120
SPSTPPEEGE EGEEGEEGEE GEEGCXKGPL GLRSWGPLGL RSWXTSXXLI XXL          173
```

|  |  |
|---|---|
| SEQ ID NO: 164 | moltype = AA   length = 169 |
| FEATURE | Location/Qualifiers |
| REGION | 1..169 |
|  | note = Synthetic |

```
REGION              145..146
                    note = MISC_FEATURE - chemically linked by DBCO-Maleimide
SITE                146
                    note = MISC_FEATURE - X is Biphenyl-4-carboxylic acid
REGION              147..148
                    note = MISC_FEATURE - chemically linked by Azidoacetyl
SITE                147
                    note = MISC_FEATURE - X is L-diaminobutyric acid
SITE                157
                    note = MISC_FEATURE - X is 6-benzyloxy-L-norleucine
SITE                158
                    note = MISC_FEATURE - X is L-methionine sulfone
SITE                159
                    note = MISC_FEATURE - X is octahydroindole-2-carboxylic Acid
SITE                160
                    note = MISC_FEATURE - X is L-2-aminobutyric acid
SITE                162
                    note = MISC_FEATURE - D amino acid
REGION              163..164
                    note = MISC_FEATURE - X is L-diaminobutyric acid
SITE                165
                    note = MISC_FEATURE - D amino acid
REGION              167..168
                    note = MISC_FEATURE - X is L-diaminobutyric acid
source              1..169
                    mol_type = protein
                    organism = synthetic construct
SEQUENCE: 164
GLKEAKEKAI EELKKAGITS DYYFDLINKA KTVEGVNALK DEILKAGGGG SGGGGSGGGG   60
SLKEAKEKAI EELKKAGITS DYYFDLINKA KTVEGVNALK DEILKAHHHH HHSPSTPPTP  120
SPSTPPEEGE EGEEGEEGEE GEEGCXXGPL GLRSWGXXXX TSXXLIXXL              169

SEQ ID NO: 165      moltype = AA  length = 193
FEATURE             Location/Qualifiers
REGION              1..193
                    note = Synthetic
REGION              163..164
                    note = MISC_FEATURE - chemcially linked by DBCO-Maleimide
REGION              164..165
                    note = MISC_FEATURE - chemcially linked by Azidoacetyl
SITE                182
                    note = MISC_FEATURE - X is L-diaminobutyric acid
SITE                183
                    note = MISC_FEATURE - X is L-ornithine
REGION              184..185
                    note = MISC_FEATURE - X is L-diaminobutyric acid
REGION              187..188
                    note = MISC_FEATURE - X is L-diaminobutyric acid
SITE                192
                    note = MISC_FEATURE - D amino acid
source              1..193
                    mol_type = protein
                    organism = synthetic construct
SEQUENCE: 165
GDFYKPMPNL RITGGGGSLK EAKEKAIEEL KKAGITSDYY FDLINKAKTV EGVNALKDEI   60
LKAGGGGSGG GGSGGGGSLK EAKEKAIEEL KKAGITSDYY FDLINKAKTV EGVNALKDEI  120
LKAHHHHHHS PSTPPTPSPS TPPEEGEEGE EGEEGEEGEE GCKGPLGLRS WGPLGLRSWW  180
IXXXXWXXAS SPP                                                    193

SEQ ID NO: 166      moltype = AA  length = 209
FEATURE             Location/Qualifiers
REGION              1..209
                    note = Synthetic
REGION              179..180
                    note = MISC_FEATURE - chemically linked by DBCO-Maleimide
REGION              180..181
                    note = MISC_FEATURE - chemically linked by Azidoacetyl
SITE                199
                    note = MISC_FEATURE - X is L-diaminobutyric acid
SITE                200
                    note = MISC_FEATURE - X is L-ornithine
REGION              201..202
                    note = MISC_FEATURE - X is L-diaminobutyric acid
REGION              204..205
                    note = MISC_FEATURE - X is L-diaminobutyric acid
SITE                208
                    note = MISC_FEATURE - D amino acid
source              1..209
                    mol_type = protein
```

```
                        organism = synthetic construct
SEQUENCE: 166
GDFYKPMPNL RITGGGGSDF YKPMPNLRIT GGGGSLKEAK EKAIEELKKA GITSDYYFDL    60
INKAKTVEGV NALKDEILKA GGGGSGGGGS GGGGSLKEAK EKAIEELKKA GITSDYYFDL   120
INKAKTVEGV NALKDEILKA HHHHHHSPST PPTPSPSTPP EEGEEGEEGE EGEEGEEGCK   180
GPLGLRSWGP LGLRSWWIXX XXWXXASPP                                     209

SEQ ID NO: 167          moltype = AA  length = 198
FEATURE                 Location/Qualifiers
REGION                  1..198
                        note = Synthetic
SITE                    169
                        note = MISC_FEATURE - chemically linked by DBCO-Maleimide
REGION                  170..171
                        note = MISC_FEATURE - chemically linked by Azidoacetyl
SITE                    188
                        note = MISC_FEATURE - X is L-diaminobutyric acid
SITE                    189
                        note = MISC_FEATURE - X is L-ornithine
REGION                  190..191
                        note = MISC_FEATURE - X is L-diaminobutyric acid
REGION                  193..194
                        note = MISC_FEATURE - X is L-diaminobutyric acid
SITE                    197
                        note = MISC_FEATURE - D amino acid
source                  1..198
                        mol_type = protein
                        organism = synthetic construct
SEQUENCE: 167
GDFYKPMPNL RITGGGGSLK EAKEKAIEEL KKAGITSDYY FDLINKAKTV EGVNALKDEI    60
LKAGGGGSDF YKPMPNLRIT GGGGSLKEAK EKAIEELKKA GITSDYYFDL INKAKTVEGV   120
NALKDEILKA HHHHHHSPST PPTPSPSTPP EEGEEGEEGE EGEEGEEGCK PLGLRSWGPL   180
GLRSWWIXXX XWXXASPP                                                 198

SEQ ID NO: 168          moltype = AA  length = 193
FEATURE                 Location/Qualifiers
REGION                  1..193
                        note = Synthetic
REGION                  162..163
                        note = MISC_FEATURE - chemically linked by DBCO-Maleimide
SITE                    163
                        note = MISC_FEATURE - X is 6-methyloctanoic acid
REGION                  164..165
                        note = MISC_FEATURE - chemically linked by Azidoacetyl
SITE                    164
                        note = MISC_FEATURE - X is L-diaminobutyric acid
SITE                    181
                        note = MISC_FEATURE - X is 6-benzyloxy-L-norleucine
SITE                    182
                        note = MISC_FEATURE - X is L-methionine sulfone
SITE                    183
                        note = MISC_FEATURE - X is octahydroindole-2-carboxylic Acid
SITE                    184
                        note = MISC_FEATURE - X is L-2-aminobutyric acid
REGION                  186..188
                        note = MISC_FEATURE - X is L-diaminobutyric acid
SITE                    189
                        note = MISC_FEATURE - D amino acid
REGION                  191..192
                        note = MISC_FEATURE - X is L-diaminobutyric acid
source                  1..193
                        mol_type = protein
                        organism = synthetic construct
SEQUENCE: 168
GDFYKPMPNL RITGGGGSLK EAKEKAIEEL KKAGITSDYY FDLINKAKTV EGVNALKDEI    60
LKAGGGGSGG GGSGGGGSLK EAKEKAIEEL KKAGITSDYY FDLINKAKTV EGVNALKDEI   120
LKAHHHHHHS PSTPPTPSPS TPPEEGEEGE EGEEGEEGEE GCXXGPLGLR SWGPLGLRSW   180
XXXXTXXXLL XXT                                                      193

SEQ ID NO: 169          moltype = AA  length = 210
FEATURE                 Location/Qualifiers
REGION                  1..210
                        note = Synthetic
REGION                  179..180
                        note = MISC_FEATURE - chemically linked by DBCO-Maleimide
SITE                    180
                        note = MISC_FEATURE - X is 6-methyloctanoic acid
REGION                  181..182
                        note = MISC_FEATURE - chemically linked by Azidoacetyl
```

```
SITE                    181
                        note = MISC_FEATURE - X is L-diaminobutyric acid
SITE                    198
                        note = MISC_FEATURE - X is 6-benzyloxy-L-norleucine
SITE                    199
                        note = MISC_FEATURE - X is L-methionine sulfone
SITE                    200
                        note = MISC_FEATURE - X is octahydroindole-2-carboxylic Acid
SITE                    201
                        note = MISC_FEATURE - X is L-2-aminobutyric acid
REGION                  203..205
                        note = MISC_FEATURE - X is L-diaminobutyric acid
SITE                    206
                        note = MISC_FEATURE - D amino acid
REGION                  208..209
                        note = MISC_FEATURE - X is L-diaminobutyric acid
source                  1..210
                        mol_type = protein
                        organism = synthetic construct
SEQUENCE: 169
GDFYKPMPNL RITGGGGSDF YKPMPNLRIT GGGGSLKEAK EKAIEELKKA GITSDYYFDL    60
INKAKTVEGV NALKDEILKA GGGSGGGGS GGGGSLKEAK EKAIEELKKA GITSDYYFDL   120
INKAKTVEGV NALKDEILKA HHHHHHSPST PPTPSPSTPP EEGEEGEEGE EGEEGEEGCX   180
XGPLGLRSWG PLGLRSWXXX XTXXXLLXXT                                    210

SEQ ID NO: 170          moltype = AA   length = 199
FEATURE                 Location/Qualifiers
REGION                  1..199
                        note = Synthetic
REGION                  169..170
                        note = MISC_FEATURE - chemically linked by DBCO-Maleimide
SITE                    170
                        note = MISC_FEATURE - X is 6-methyloctanoic acid
REGION                  171..172
                        note = MISC_FEATURE - chemically linked by Azidoacetyl
SITE                    171
                        note = MISC_FEATURE - X is L-diaminobutyric acid
SITE                    188
                        note = MISC_FEATURE - X is 6-benzyloxy-L-norleucine
SITE                    189
                        note = MISC_FEATURE - X is L-methionine sulfone
SITE                    190
                        note = MISC_FEATURE - X is octahydroindole-2-carboxylic Acid
SITE                    191
                        note = MISC_FEATURE - X is L-2-aminobutyric acid
REGION                  193..194
                        note = MISC_FEATURE - X is L-diaminobutyric acid
SITE                    195
                        note = MISC_FEATURE - D amino acid
REGION                  197..198
                        note = MISC_FEATURE - X is L-diaminobutyric acid
source                  1..199
                        mol_type = protein
                        organism = synthetic construct
SEQUENCE: 170
GDFYKPMPNL RITGGGGSLK EAKEKAIEEL KKAGITSDYY FDLINKAKTV EGVNALKDEI    60
LKAGGGGSDF YKPMPNLRIT GGGGSLKEAK EKAIEELKKA GITSDYYFDL INKAKTVEGV   120
NALKDEILKA HHHHHHSPST PPTPSPSTPP EEGEEGEEGE EGEEGEEGCX XGPLGLRSWG   180
PLGLRSWXXX XTXXLLXXT                                                 199

SEQ ID NO: 171          moltype = AA   length = 11
FEATURE                 Location/Qualifiers
REGION                  1..11
                        note = Synthetic
source                  1..11
                        mol_type = protein
                        organism = synthetic construct
SEQUENCE: 171
PLGVRGKLVP R                                                          11

SEQ ID NO: 172          moltype =   length =
SEQUENCE: 172
000

SEQ ID NO: 173          moltype = AA   length = 7
FEATURE                 Location/Qualifiers
source                  1..7
                        mol_type = protein
                        organism = synthetic construct
```

```
SEQUENCE: 173
PRAEALK                                                                          7

SEQ ID NO: 174          moltype = AA  length = 6
FEATURE                 Location/Qualifiers
source                  1..6
                        mol_type = protein
                        organism = synthetic construct
SEQUENCE: 174
PRAEAL                                                                           6

SEQ ID NO: 175          moltype = AA  length = 6
FEATURE                 Location/Qualifiers
source                  1..6
                        mol_type = protein
                        organism = synthetic construct
SEQUENCE: 175
RAEALK                                                                           6

SEQ ID NO: 176          moltype = AA  length = 7
FEATURE                 Location/Qualifiers
source                  1..7
                        mol_type = protein
                        organism = synthetic construct
SEQUENCE: 176
PRAEALS                                                                          7

SEQ ID NO: 177          moltype = AA  length = 7
FEATURE                 Location/Qualifiers
source                  1..7
                        mol_type = protein
                        organism = synthetic construct
SEQUENCE: 177
PRAEALT                                                                          7

SEQ ID NO: 178          moltype = AA  length = 7
FEATURE                 Location/Qualifiers
source                  1..7
                        mol_type = protein
                        organism = synthetic construct
SEQUENCE: 178
PRAEALA                                                                          7

SEQ ID NO: 179          moltype = AA  length = 7
FEATURE                 Location/Qualifiers
source                  1..7
                        mol_type = protein
                        organism = synthetic construct
SEQUENCE: 179
PRAEALV                                                                          7

SEQ ID NO: 180          moltype = AA  length = 7
FEATURE                 Location/Qualifiers
source                  1..7
                        mol_type = protein
                        organism = synthetic construct
SEQUENCE: 180
PRAEALP                                                                          7

SEQ ID NO: 181          moltype = AA  length = 7
FEATURE                 Location/Qualifiers
source                  1..7
                        mol_type = protein
                        organism = synthetic construct
SEQUENCE: 181
PRAEALY                                                                          7

SEQ ID NO: 182          moltype = AA  length = 7
FEATURE                 Location/Qualifiers
source                  1..7
                        mol_type = protein
                        organism = synthetic construct
SEQUENCE: 182
PRAAALK                                                                          7

SEQ ID NO: 183          moltype = AA  length = 7
FEATURE                 Location/Qualifiers
source                  1..7
                        mol_type = protein
```

```
                        organism = synthetic construct
SEQUENCE: 183
PTTSALT                                                                  7

SEQ ID NO: 184          moltype = AA  length = 6
FEATURE                 Location/Qualifiers
source                  1..6
                        mol_type = protein
                        organism = synthetic construct
SEQUENCE: 184
SAQAVV                                                                   6

SEQ ID NO: 185          moltype = AA  length = 7
FEATURE                 Location/Qualifiers
source                  1..7
                        mol_type = protein
                        organism = synthetic construct
SEQUENCE: 185
VFRMLSV                                                                  7

SEQ ID NO: 186          moltype = AA  length = 7
FEATURE                 Location/Qualifiers
source                  1..7
                        mol_type = protein
                        organism = synthetic construct
SEQUENCE: 186
PYSARLA                                                                  7

SEQ ID NO: 187          moltype = AA  length = 6
FEATURE                 Location/Qualifiers
source                  1..6
                        mol_type = protein
                        organism = synthetic construct
SEQUENCE: 187
QYAYLT                                                                   6

SEQ ID NO: 188          moltype = AA  length = 123
FEATURE                 Location/Qualifiers
source                  1..123
                        mol_type = protein
                        organism = synthetic construct
SEQUENCE: 188
EMQLVESGGG LVQTGGSLRL SCAASGRTFT SYCVGWWRQA PGKERDVVAA ITRGSNSTDY        60
VDSVKGRFTI SRDNAENTVY LQMNSLKPED TAVYYCAADI NCRNLYTGRP EYWGQGTQVT       120
VSS                                                                    123

SEQ ID NO: 189          moltype = AA  length = 120
FEATURE                 Location/Qualifiers
source                  1..120
                        mol_type = protein
                        organism = synthetic construct
SEQUENCE: 189
EVQLVESGGG LVQAGGSLRL SCAASERIFS TYFMGWFRQA PGKEREFVAF ISGNGGSTDY        60
ADSVKGRFAI SRDNVKNTLY LQMSSLKPDD TAVYYCAVAG RQIKSTWDYW GQGTQVTVSS       120

SEQ ID NO: 190          moltype = AA  length = 111
FEATURE                 Location/Qualifiers
source                  1..111
                        mol_type = protein
                        organism = synthetic construct
SEQUENCE: 190
EVQLVESGGG LVQAGGSLRL SCARSGRISN INIMSWYRQA PGKTRDMVAA IIGDSTNYAD        60
SVKGRFTISR DNAKNTVHLQ MNRLKPEDTG VYYCNIPGVD WGQGTQVTVS S                111

SEQ ID NO: 191          moltype = AA  length = 111
FEATURE                 Location/Qualifiers
source                  1..111
                        mol_type = protein
                        organism = synthetic construct
SEQUENCE: 191
EVQLVESGGG LVQAGGSLRL SCARSGRISN INIMAWYRQA PGKTRDMVAA IIGDSTNYAD        60
SVKGRFTISR DNAKNTVYLH MNRLKPEDTG VYYCKISGVD WGQGTQVTVS S                111

SEQ ID NO: 192          moltype = AA  length = 116
FEATURE                 Location/Qualifiers
source                  1..116
                        mol_type = protein
                        organism = synthetic construct
SEQUENCE: 192
```

```
KVQLVESGGG LVQAGGSLRL SCAASGNIFI NNAVGWYRQA PGKQREMVAA MLSGGSTNYA   60
DSVKGRFTIS RDNAKNTVYL QMNSLKPEDT AVYYCNVQVN GTWARWGQGT QVTVSS      116

SEQ ID NO: 193          moltype = AA  length = 174
FEATURE                 Location/Qualifiers
source                  1..174
                        mol_type = protein
                        organism = synthetic construct
REGION                  145..146
                        note = MISC_FEATURE chemically linked by DBCO-Maleimide
REGION                  146..147
                        note = MISC_FEATURE chemically linked by Azidoacetyl
SITE                    164
                        note = MISC_FEATURE X is L-diaminobutyric acid
SITE                    166..167
                        note = MISC_FEATURE  X is L-diaminobutyric acid
SITE                    169..170
                        note = MISC_FEATURE X is L-diaminobutyric acid
SITE                    165
                        note = MISC_FEATURE X is L-ornithine
SITE                    173
                        note = MISC_FEATURE D amino acid
SEQUENCE: 193
GLKEAKEKAI EELKKAGITS DYYFDLINKA KTVEGVNALK DEILKAGGGG SGGGGSGGGG   60
SLKEAKEKAI EELKKAGITS DYYFDLINKA KTVEGVNALK DEILKAHHHH HHSPSTPPPTP  120
SPSTPPEEGE EGEEGEEGEE GEEGCKGPRA EALSPRAEAL SWIXXXXWXX ASPP        174

SEQ ID NO: 194          moltype = AA  length = 173
FEATURE                 Location/Qualifiers
source                  1..173
                        mol_type = protein
                        organism = synthetic construct
REGION                  145..146
                        note = MISC_FEATURE chemically linked by DBCO-Maleimide
REGION                  146..147
                        note = MISC_FEATURE chemically linked by Azidoacetyl
SITE                    164
                        note = MISC_FEATURE X is L-diaminobutyric acid
SITE                    166..167
                        note = MISC_FEATURE X is L-diaminobutyric acid
SITE                    169..170
                        note = MISC_FEATURE X is L-diaminobutyric acid
SITE                    165
                        note = MISC_FEATURE X is L-ornithine
SITE                    173
                        note = MISC_FEATURE D amino acid
SEQUENCE: 194
GLKEAKEKAI EELKKAGITS DYYFDLINKA KTVEGVNALK DEILKAGGGG SGGGGSGGGG   60
SLKEAKEKAI EELKKAGITS DYYFDLINKA KTVEGVNALK DEILKAHHHH HHSPSTPPPTP  120
SPSTPPEEGE EGEEGEEGEE GEEGCKGPRA EALTPRAEAL TWIXXXWXXA SPP         173

SEQ ID NO: 195          moltype = AA  length = 303
FEATURE                 Location/Qualifiers
source                  1..303
                        mol_type = protein
                        organism = synthetic construct
REGION                  282..283
                        note = MISC_FEATURE chemically linked by DBCO-Maleimide
REGION                  283..284
                        note = MISC_FEATURE chemically linked by Azidoacetyl
SITE                    294
                        note = MISC_FEATURE X is  L-diaminobutyric acid
SITE                    296..297
                        note = MISC_FEATURE X is  L-diaminobutyric acid
SITE                    299..300
                        note = MISC_FEATURE X is  L-diaminobutyric acid
SITE                    295
                        note = MISC_FEATURE X is L-ornithine
SITE                    302
                        note = MISC_FEATURE D amino acid
SEQUENCE: 195
EMQLVESGGG LVQTGGSLRL SCAASGRTFT SYCVGWWRQA PGKERDVVAA ITRGSNSTDY   60
VDSVKGRFTI SRDNAENTVY LQMNSLKPED TAVYYCAADI NCRNLYTGRP EYWGQGTQVT  120
VSSGGGGSGG GGSGGGGSLK EAKEKAIEEL KKAGITSDYY FDLINKAKTV EGVNALKDEI  180
LKAGGGGSGG GGSGGGGSLK EAKEKAIEEL KKAGITSDYY FDLINKAKTV EGVNALKDEI  240
LKAHHHHHHS PSTPPTPSPS TPPEEGEEGE EGEEGEEGEE GCKGPRAEAL TWIXXXXWXA  300
SPP                                                                303

SEQ ID NO: 196          moltype = AA  length = 301
```

```
FEATURE                 Location/Qualifiers
source                  1..301
                        mol_type = protein
                        organism = synthetic construct
REGION                  279..280
                        note = MISC_FEATURE chemically linked by DBCO-Maleimide
REGION                  280..281
                        note = MISC_FEATURE chemically linked by Azidoacetyl
SITE                    291
                        note = MISC_FEATURE X is L-diaminobutyric acid
SITE                    293..294
                        note = MISC_FEATURE X is L-diaminobutyric acid
SITE                    296..297
                        note = MISC_FEATURE X is L-diaminobutyric acid
SITE                    292
                        note = MISC_FEATURE X is L-ornithine
SITE                    300
                        note = MISC_FEATURE D amino acid
SEQUENCE: 196
EVQLVESGGG LVQAGGSLRL SCAASERIFS TYFMGWFRQA PGKEREFVAF ISGNGGSTDY    60
ADSVKGRFAI SRDNVKNTLY LQMSSLKPDD TAVYYCAVAG RQIKSTWDYW GQGTQVTVSS   120
GGGGSGGGGS GGGGSLKEAK EKAIEELKKA GITSDYYFDL INKAKTVEGV NALKDEILKA   180
GGGGSGGGGS GGGGSLKEAK EKAIEELKKA GITSDYYFDL INKAKTVEGV NALKDEILKA   240
HHHHHHSPST PPTPSPSTPP EEGEEGEEGE EGEEGEEGCK GPRAEALTWI XXXXWXXASP   300
P                                                                  301

SEQ ID NO: 197          moltype = AA  length = 292
FEATURE                 Location/Qualifiers
source                  1..292
                        mol_type = protein
                        organism = synthetic construct
REGION                  270..271
                        note = MISC_FEATURE chemically linked by DBCO-Maleimide
REGION                  271..272
                        note = MISC_FEATURE chemically linked by Azidoacetyl
SITE                    282
                        note = MISC_FEATURE X is L-diaminobutyric acid
SITE                    284..285
                        note = MISC_FEATURE X is L-diaminobutyric acid
SITE                    287..288
                        note = MISC_FEATURE X is L-diaminobutyric acid
SITE                    283
                        note = MISC_FEATURE X is L-ornithine
SITE                    291
                        note = MISC_FEATURE D amino acid
SEQUENCE: 197
EVQLVESGGG LVQAGGSLRL SCARSGRISN INIMSWYRQA PGKTRDMVAA IIGDSTNYAD    60
SVKGRFTISR DNAKNTVHLQ MNRLKPEDTG VYYCNIPGVD WGQGTQVTVS SGGGGSGGGG   120
SGGGGSLKEA KEKAIEELKK AGITSDYYFD LINKAKTVEG VNALKDEILK AGGGGSGGGG   180
SGGGGSLKEA KEKAIEELKK AGITSDYYFD LINKAKTVEG VNALKDEILK AHHHHHHSPS   240
TPPTPSPSTP PEEGEEGEEG EEGEEGEEGC KGPRAEALTW IXXXXWXXAS PP           292

SEQ ID NO: 198          moltype = AA  length = 292
FEATURE                 Location/Qualifiers
source                  1..292
                        mol_type = protein
                        organism = synthetic construct
REGION                  270..271
                        note = MISC_FEATURE chemically linked by DBCO-Maleimide
REGION                  271..272
                        note = MISC_FEATURE chemically linked by Azidoacetyl
SITE                    282
                        note = MISC_FEATURE X is L-diaminobutyric acid
SITE                    284..285
                        note = MISC_FEATURE X is L-diaminobutyric acid
SITE                    287..288
                        note = MISC_FEATURE X is L-diaminobutyric acid
SITE                    283
                        note = MISC_FEATURE X is L-ornithine
SITE                    291
                        note = MISC_FEATURE D amino acid
SEQUENCE: 198
EVQLVESGGG LVQAGGSLRL SCARSGRISN INIMAWYRQA PGKTRDMVAA IIGDSTNYAD    60
SVKGRFTISR DNAKNTVYLH MNRLKPEDTG VYYCKISGVD WGQGTQVTVS SGGGGSGGGG   120
SGGGGSLKEA KEKAIEELKK AGITSDYYFD LINKAKTVEG VNALKDEILK AGGGGSGGGG   180
SGGGGSLKEA KEKAIEELKK AGITSDYYFD LINKAKTVEG VNALKDEILK AHHHHHHSPS   240
TPPTPSPSTP PEEGEEGEEG EEGEEGEEGC KGPRAEALTW IXXXXWXXAS PP           292

SEQ ID NO: 199          moltype = AA  length = 297
```

```
FEATURE                 Location/Qualifiers
source                  1..297
                        mol_type = protein
                        organism = synthetic construct
REGION                  275..276
                        note = MISC_FEATURE chemically linked by DBCO-Maleimide
REGION                  276..277
                        note = MISC_FEATURE chemically linked by Azidoacetyl
SITE                    287
                        note = MISC_FEATURE X is L-diaminobutyric acid
SITE                    289..290
                        note = MISC_FEATURE X is L-diaminobutyric acid
SITE                    292..293
                        note = MISC_FEATURE X is L-diaminobutyric acid
SITE                    288
                        note = MISC_FEATURE X is L-ornithine
SITE                    296
                        note = MISC_FEATURE D amino acid
SEQUENCE: 199
KVQLVESGGG LVQAGGSLRL SCAASGNIFI NNAVGWYRQA PGKQREMVAA MLSGGSTNYA   60
DSVKGRFTIS RDNAKNTVYL QMNSLKPEDT AVYYCNVQVN GTWARWGQGT QVTVSSGGGG  120
SGGGGSGGGG SLKEAKEKAI EELKKAGITS DYYFDLINKA KTVEGVNALK DEILKAGGGG  180
SGGGGSGGGG SLKEAKEKAI EELKKAGITS DYYFDLINKA KTVEGVNALK DEILKAHHHH  240
HHSPSTPPTP SPSTPPEEGE EGEEGEEGEE GEEGCKGPRA EALTWIXXXX WXXASPP     297

SEQ ID NO: 200          moltype = AA  length = 301
FEATURE                 Location/Qualifiers
source                  1..301
                        mol_type = protein
                        organism = synthetic construct
REGION                  282..283
                        note = MISC_FEATURE chemically linked by DBCO-Maleimide
REGION                  284..285
                        note = MISC_FEATURE chemically linked by Azidoacetyl
SITE                    283
                        note = MISC_FEATURE X is 6-methyloctanoic acid
SITE                    284
                        note = MISC_FEATURE X is L-diaminobutyric acid
SITE                    294..296
                        note = MISC_FEATURE X is L-diaminobutyric acid
SITE                    299..300
                        note = MISC_FEATURE X is L-diaminobutyric acid
SITE                    297
                        note = MISC_FEATURE D amino acid
SEQUENCE: 200
EMQLVESGGG LVQTGGSLRL SCAASGRTFT SYCVGWWRQA PGKERDVVAA ITRGSNSTDY   60
VDSVKGRFTI SRDNAENTVY LQMNSLKPED TAVYYCAADI NCRNLYTGRP EYWGQGTQVT  120
VSSGGGGSGG GGSGGGGSLK EAKEKAIEEL KKAGITSDYY FDLINKAKTV EGVNALKDEI  180
LKAGGGGSGG GGSGGGGSLK EAKEKAIEEL KKAGITSDYY FDLINKAKTV EGVNALKDEI  240
LKAHHHHHHS PSTPPTPSPS TPPEEGEEGE EGEEGEEGEE GCXXGPRAEA LTTXXXLLXX  300
T                                                                 301

SEQ ID NO: 201          moltype = AA  length = 298
FEATURE                 Location/Qualifiers
source                  1..298
                        mol_type = protein
                        organism = synthetic construct
REGION                  279..280
                        note = MISC_FEATURE chemically linked by DBCO-Maleimide
REGION                  281..282
                        note = MISC_FEATURE chemically linked by Azidoacetyl
SITE                    280
                        note = MISC_FEATURE X is 6-methyloctanoic acid
SITE                    291..293
                        note = MISC_FEATURE X is L-diaminobutyric acid
SITE                    281
                        note = MISC_FEATURE X is L-diaminobutyric acid
SITE                    296..297
                        note = MISC_FEATURE X is L-diaminobutyric acid
SITE                    294
                        note = MISC_FEATURE D amino acid
SEQUENCE: 201
EVQLVESGGG LVQAGGSLRL SCAASERIFS TYFMGWFRQA PGKEREFVAF ISGNGGSTDY   60
ADSVKGRFAI SRDNVKNTLY LQMSSLKPDD TAVYYCAVAG RQIKSTWDYW GQGTQVTVSS  120
GGGGSGGGGS GGGGSLKEAK EKAIEELKKA GITSDYYFDL INKAKTVEGV NALKDEILKA  180
GGGGSGGGGS GGGGSLKEAK EKAIEELKKA GITSDYYFDL INKAKTVEGV NALKDEILKA  240
HHHHHHSPST PPTPSPSTPP EEGEEGEEGE EGEEGEEGCX XGPRAEALTT XXXLLXXT    298

SEQ ID NO: 202          moltype = AA  length = 289
```

```
FEATURE                 Location/Qualifiers
source                  1..289
                        mol_type = protein
                        organism = synthetic construct
REGION                  270..271
                        note = MISC_FEATURE  chemically linked by DBCO-Maleimide
REGION                  272..273
                        note = MISC_FEATURE chemically linked by Azidoacetyl
SITE                    271
                        note = MISC_FEATURE  X is 6-methyloctanoic acid
SITE                    272
                        note = MISC_FEATURE X is L-diaminobutyric acid
SITE                    282..284
                        note = MISC_FEATURE X is L-diaminobutyric acid
SITE                    287..288
                        note = MISC_FEATURE X is L-diaminobutyric acid
SITE                    285
                        note = MISC_FEATURE D amino acid
SEQUENCE: 202
EVQLVESGGG LVQAGGSLRL SCARSGRISN INIMSWYRQA PGKTRDMVAA IIGDSTNYAD    60
SVKGRFTISR DNAKNTVHLQ MNRLKPEDTG VYYCNIPGVD WGQGTQVTVS SGGGGSGGGG   120
SGGGGSLKEA KEKAIEELKK AGITSDYYFD LINKAKTVEG VNALKDEILK AGGGGSGGGG   180
SGGGGSLKEA KEKAIEELKK AGITSDYYFD LINKAKTVEG VNALKDEILK AHHHHHHSPS   240
TPPTPSPSTP PEEGEEGEEG EEGEEGEEGC XXGPRAEALT TXXXLLXXT              289

SEQ ID NO: 203          moltype = AA  length = 289
FEATURE                 Location/Qualifiers
source                  1..289
                        mol_type = protein
                        organism = synthetic construct
REGION                  270..271
                        note = MISC_FEATURE chemically linked by DBCO-Maleimide
REGION                  272..273
                        note = MISC_FEATURE chemically linked by Azidoacetyl
SITE                    271
                        note = MISC_FEATURE X is 6-methyloctanoic acid
SITE                    272
                        note = MISC_FEATURE X is L-diaminobutyric acid
SITE                    282..284
                        note = MISC_FEATURE X is L-diaminobutyric acid
SITE                    287..288
                        note = MISC_FEATURE X is L-diaminobutyric acid
SITE                    285
                        note = MISC_FEATURE D amino acid
SEQUENCE: 203
EVQLVESGGG LVQAGGSLRL SCARSGRISN INIMAWYRQA PGKTRDMVAA IIGDSTNYAD    60
SVKGRFTISR DNAKNTVYLH MNRLKPEDTG VYYCKISGVD WGQGTQVTVS SGGGGSGGGG   120
SGGGGSLKEA KEKAIEELKK AGITSDYYFD LINKAKTVEG VNALKDEILK AGGGGSGGGG   180
SGGGGSLKEA KEKAIEELKK AGITSDYYFD LINKAKTVEG VNALKDEILK AHHHHHHSPS   240
TPPTPSPSTP PEEGEEGEEG EEGEEGEEGC XXGPRAEALT TXXXLLXXT              289

SEQ ID NO: 204          moltype = AA  length = 294
FEATURE                 Location/Qualifiers
source                  1..294
                        mol_type = protein
                        organism = synthetic construct
REGION                  275..276
                        note = MISC_FEATURE chemically linked by DBCO-Maleimide
REGION                  277..278
                        note = MISC_FEATURE chemically linked by Azidoacetyl
SITE                    276
                        note = MISC_FEATURE X is 6-methyloctanoic acid
SITE                    277
                        note = MISC_FEATURE X is L-diaminobutyric acid
SITE                    287..289
                        note = MISC_FEATURE X is L-diaminobutyric acid
SITE                    292..293
                        note = MISC_FEATURE X is L-diaminobutyric acid
SITE                    290
                        note = MISC_FEATURE D amino acid
SEQUENCE: 204
KVQLVESGGG LVQAGGSLRL SCAASGNIFI NNAVGWYRQA PGKQREMVAA MLSGGSTNYA    60
DSVKGRFTIS RDNAKNTVYL QMNSLKPEDT AVYYCNVQVN GTWARWGQGT QVTVSSGGGG   120
SGGGGSGGGG SLKEAKEKAI EELKKAGITS DYYFDLINKA KTVEGVNALK DEILKAGGGG   180
SGGGGSGGGG SLKEAKEKAI EELKKAGITS DYYFDLINKA KTVEGVNALK DEILKAHHHH   240
HHSPSTPPTP SPSTPPEEGE EGEEGEEGEE GEEGCXXGPR AEALTTXXXL LXXT          294
```